United States Patent
Sugimoto et al.

(10) Patent No.: US 9,965,833 B2
(45) Date of Patent: May 8, 2018

(54) OPTICAL SYSTEM CHARACTERISTIC DATA STORING DEVICE, METHOD, AND PROGRAM FOR IMAGE RESTORATION FILTERING

(71) Applicant: FUJIFILM Corporation, Tokyo (JP)

(72) Inventors: Masahiko Sugimoto, Saitama (JP); Kenkichi Hayashi, Saitama (JP); Yousuke Naruse, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 233 days.

(21) Appl. No.: 14/921,020

(22) Filed: Oct. 23, 2015

(65) Prior Publication Data

US 2016/0098819 A1    Apr. 7, 2016

Related U.S. Application Data

(63) Continuation of application No. PCT/JP2014/061379, filed on Apr. 23, 2014.

(30) Foreign Application Priority Data

Apr. 26, 2013  (JP) ................................. 2013-094294

(51) Int. Cl.
*G06K 9/40* (2006.01)
*G06T 5/00* (2006.01)
(Continued)

(52) U.S. Cl.
CPC .......... *G06T 5/001* (2013.01); *G06F 17/3028* (2013.01); *G06T 5/10* (2013.01);
(Continued)

(58) Field of Classification Search
CPC ....... G06T 5/001; G06T 5/10; H04N 5/23206; H04N 5/23209; H04N 5/23229;
(Continued)

(56) References Cited

U.S. PATENT DOCUMENTS

2010/0079615 A1* 4/2010 Hatakeyama .......... H04N 9/045
348/223.1
2010/0328480 A1* 12/2010 Kikuchi ............... H04N 5/3572
348/222.1
(Continued)

FOREIGN PATENT DOCUMENTS

JP    2010-35177 A    2/2010
JP    2011-10214 A    1/2011
(Continued)

OTHER PUBLICATIONS

"Optical Transfer Function", Wikipedia.com, Feb. 17, 2012, <https://web.archive.org/web/20120217025143/https://en.wikipedia.org/wiki/Optical_transfer_function>, p. 1-4.*
(Continued)

*Primary Examiner* — Andrew Moyer
*Assistant Examiner* — Timothy Choi
(74) *Attorney, Agent, or Firm* — Birch, Stewart, Kolasch & Birch, LLP

(57) ABSTRACT

Disclosed is a technique capable of efficiently storing and retaining characteristic data (a restoration filter or the like) of an optical system used for a restoration process in a storage unit with limited storage capacity in consideration of the degree of image restoration. An image processing device includes a characteristic data storage unit 42 which is capable of storing characteristic data of a plurality of types of optical systems, and a restoration processing unit which subjects source image data to a restoration process using a restoration filter based on a point spread function of an optical system to acquire recovered image data. In case where storing new characteristic data in the characteristic data storage unit, characteristic data which is stored in the characteristic data storage unit 42 is controlled based on a (Continued)

restoration evaluation value which is allocated to characteristic data according to the type of optical system.

29 Claims, 32 Drawing Sheets

(51) Int. Cl.
| | | |
|---|---|---|
| H04N 5/232 | (2006.01) | |
| H04N 9/04 | (2006.01) | |
| H04N 17/00 | (2006.01) | |
| G06F 17/30 | (2006.01) | |
| G06T 5/10 | (2006.01) | |

(52) U.S. Cl.
CPC ..... *H04N 5/23206* (2013.01); *H04N 5/23209* (2013.01); *H04N 5/23229* (2013.01); *H04N 5/23241* (2013.01); *H04N 5/23245* (2013.01); *H04N 9/045* (2013.01); *H04N 17/002* (2013.01)

(58) Field of Classification Search
CPC ........... H04N 5/23241; H04N 5/23245; H04N 9/045; H04N 17/002; H04N 2101/00; G06F 17/3028
See application file for complete search history.

(56) References Cited

U.S. PATENT DOCUMENTS

| 2011/0128422 | A1* | 6/2011 | Nagata | H04N 9/045 348/241 |
| 2012/0189226 | A1* | 7/2012 | Okada | G06T 5/003 382/260 |
| 2012/0320240 | A1* | 12/2012 | Kano | H04N 5/3572 348/241 |
| 2014/0218557 | A1* | 8/2014 | Ebe | H04N 5/2351 348/222.1 |

FOREIGN PATENT DOCUMENTS

| JP | 2011-119874 A | 6/2011 |
| JP | 2012-156714 A | 8/2012 |
| JP | 2012-216947 A | 11/2012 |

OTHER PUBLICATIONS

International Search Report, issued in PCT/JP2014/061379, dated Jul. 15, 2014.
Written Opinion of the International Searching Authority, issued in PCT/JP2014/061379, dated Jul. 15, 2014.
Chinese Office Action and Search Report for corresponding Chinese Application No. 201480023523.6, dated Jan. 9, 2018, with an English translation of the Office Action.

* cited by examiner

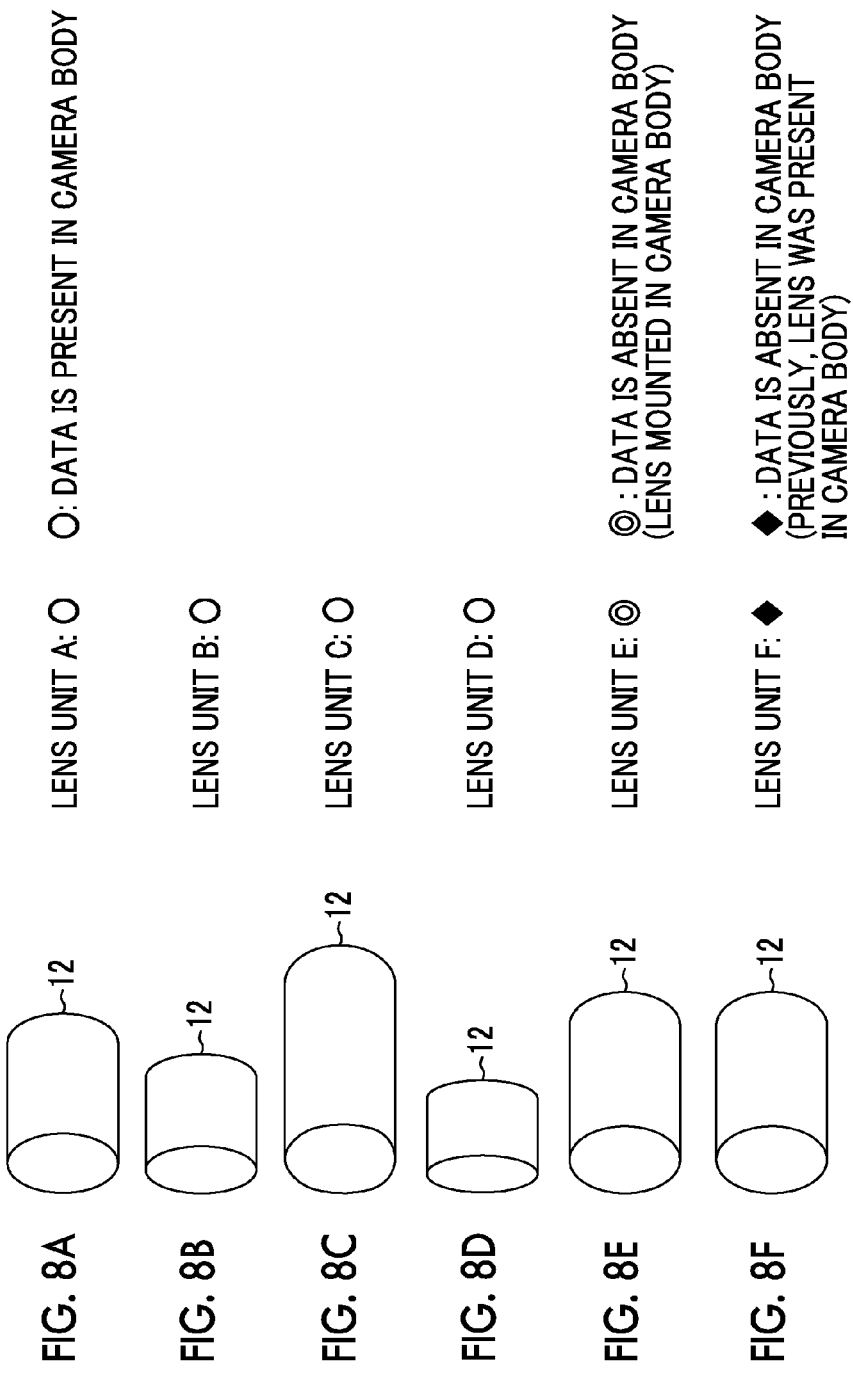

FIG. 11A

LENS UNIT MEMORY 24

| LENS UNIT E | 40 |

CHARACTERISTIC DATA STORAGE UNIT ~42

| LENS TYPE (OPTICAL SYSTEM TYPE) | RESTORATION EVALUATION VALUE (RESTORATION EFFECT) |
|---|---|
| LENS UNIT A | 100 |
| LENS UNIT B | 80 |
| LENS UNIT C | 60 |
| LENS UNIT D | 50 |

FIG. 11B

CHARACTERISTIC DATA STORAGE UNIT ~42

| LENS TYPE (OPTICAL SYSTEM TYPE) | RESTORATION EVALUATION VALUE (RESTORATION EFFECT) |
|---|---|
| LENS UNIT A | 100 |
| LENS UNIT B | 80 |
| LENS UNIT C | 60 |
| LENS UNIT E | 40 |

FIG. 12A

LENS UNIT MEMORY 24

| LENS UNIT E | 90 |

CHARACTERISTIC DATA STORAGE UNIT 42

| LENS TYPE (OPTICAL SYSTEM TYPE) | RESTORATION EVALUATION VALUE (RESTORATION EFFECT) |
|---|---|
| LENS UNIT A | 100 |
| LENS UNIT B | 80 |
| LENS UNIT C | 60 |
| LENS UNIT D | 50 |

FIG. 12B

CHARACTERISTIC DATA STORAGE UNIT 42

| LENS TYPE (OPTICAL SYSTEM TYPE) | RESTORATION EVALUATION VALUE (RESTORATION EFFECT) |
|---|---|
| LENS UNIT A | 100 |
| LENS UNIT E | 90 |
| LENS UNIT B | 80 |
| LENS UNIT C | 60 |

| CHARACTERISTIC DATA STORAGE UNIT ||| |
|---|---|---|---|
| LENS TYPE (OPTICAL SYSTEM TYPE) | F VALUE (PHOTOGRAPHING CONDITION) | RESTORATION EVALUATION VALUE (RESTORATION EFFECT) | |
| LENS A | F16 | 100 | |
| LENS B | F16 | 90 | |
| LENS A | F8 | 80 | |
| LENS B | F8 | 70 | |
| LENS A | F4 | 60 | ⎫ |
| LENS A | F2 | 50 | ⎬ DELETE |
| LENS B | F4 | 50 | |
| LENS B | F2 | 40 | ⎭ |

FIG. 18C

| CHARACTERISTIC DATA STORAGE UNIT 42 ||| |
|---|---|---|---|
| LENS TYPE (OPTICAL SYSTEM TYPE) | F VALUE (PHOTOGRAPHING CONDITION) | RESTORATION EVALUATION VALUE (RESTORATION EFFECT) | |
| LENS A | F16 | 100 | |
| LENS B | F16 | 90 | |
| LENS A | F8 | 80 | |
| LENS B | F8 | 70 | |
| LENS C | F16 | 90 | ⎫ |
| LENS C | F8 | 80 | ⎬ ADD |
| LENS C | F4 | 70 | |
| LENS C | F2 | 60 | ⎭ |

FIG. 19A

| LENS C | F16 | 90 |
|---|---|---|
| LENS C | F8 | 80 |
| LENS C | F4 | 70 |

LENS UNIT MEMORY 24

42

| CHARACTERISTIC DATA STORAGE UNIT | | |
|---|---|---|
| LENS TYPE (OPTICAL SYSTEM TYPE) | F VALUE (PHOTOGRAPHING CONDITION) | RESTORATION EVALUATION VALUE (RESTORATION EFFECT) |
| LENS A | F16 | 100 |
| LENS A | F8 | 80 |
| LENS A | F4 | 60 |
| LENS A | F2 | 50 |
| LENS B | F16 | 90 |
| LENS B | F8 | 70 |
| LENS B | F4 | 50 |
| LENS B | F2 | 40 |

FIG. 19B

| | | 42 | | |
|---|---|---|---|---|
| CHARACTERISTIC DATA STORAGE UNIT ||||||
| LENS TYPE (OPTICAL SYSTEM TYPE) | F VALUE (PHOTOGRAPHING CONDITION) | RESTORATION EVALUATION VALUE |||
| | | EVALUATION VALUE | AVERAGE | MAXIMUM |
| LENS A | F16 | 100 | 72.5 | 100 |
| LENS A | F8 | 80 | | |
| LENS A | F4 | 60 | | |
| LENS A | F2 | 50 | | |
| LENS B | F16 | 90 | 62.5 | 90 |
| LENS B | F8 | 70 | | |
| LENS B | F4 | 50 | | |
| LENS B | F2 | 40 | | |

} DELETE

| CHARACTERISTIC DATA STORAGE UNIT ||||
| LENS TYPE (OPTICAL SYSTEM TYPE) | F VALUE (PHOTOGRAPHING CONDITION) | RESTORATION EVALUATION VALUE (RESTORATION EFFECT) | |
| --- | --- | --- | --- |
| LENS A | F16 | 100 | |
| LENS A | F8 | 80 | |
| LENS A | F4 | 60 | |
| LENS A | F2 | 50 | |
| LENS B | F16 | 90 | |
| LENS C | F16 | 90 | |
| LENS C | F8 | 80 | ADD |
| LENS C | F4 | 70 | |

OPTICAL SYSTEM CHARACTERISTIC DATA STORING DEVICE, METHOD, AND PROGRAM FOR IMAGE RESTORATION FILTERING

CROSS-REFERENCE TO RELATED APPLICATIONS

This application is a Continuation of PCT International Application No. PCT/JP2014/061379 filed on Apr. 23, 2014, which claims priority under 35 U.S.C § 119(a) to Patent Application No. 2013-094294 filed in Japan on Apr. 26, 2013, all of which are hereby expressly incorporated by reference into the present application.

BACKGROUND OF THE INVENTION

1. Field of the Invention

The present invention relates to an image processing device, an image capture device, an image processing method, and a program for a restoration process based on a point spread function.

2. Description of the Related Art

In an object image photographed through an image capture optical system, a so-called point spread phenomenon in which a point object has minute spread due to the influence of diffraction, aberration, or the like caused by the image capture optical system may be observed. A function representing a response to a point light source of an optical system is called a point spread function (PSF), and is known as a parameter responsible for resolution deterioration (blurring) of a photographic image.

The photographic image deteriorated in image quality due to the point spread phenomenon can be recovered in image quality through a point image restoration process based on the PSF. The point image restoration process is a process in which a deterioration characteristic (point image characteristic) caused by aberration or the like of a lens (optical system) is determined in advance, and point spread of the photographic image is cancelled through an image process using a restoration filter (recovery filter) according to the point image characteristic.

Various methods for the point image restoration process have been suggested, and for example, JP2011-10214A discloses an example of an image recovery algorithm based on the PSF. In the image recovery algorithm, a recovery filter is created on a lens side, and data to be transmitted and received between a lens and a camera is a recovery filter corresponding to a photographing parameter, whereby reduction in the amount of communication data is achieved.

JP2010-35177A discloses an image capture device which enables automatic evaluation of a photographic image. In this image capture device, image quality (exposure condition, contrast, blur, and hand-shake status) of the photographic image is automatically evaluated. In case where the remaining capacity of a recording medium is equal to or less than capacity set in advance, candidates of images to be deleted from the recording medium are determined based on the evaluation result of the recorded photographic image, and images designated by a user from among the images of the deletion candidates are deleted. The frequency of the evaluation value of the deleted image is totaled, and an image having an evaluation value with a high cumulative frequency becomes a deletion candidate with priority.

JP2011-119874A discloses a camera unit which reliably acquires image recovery information corresponding to a combination of a lens unit and a camera unit. In this camera unit, in case where lens information of a lens mounted in a camera is not retained in the camera, a transmission request of image recovery information is output from the camera to the lens, and the camera receives corresponding information from the lens.

SUMMARY OF THE INVENTION

As described above, in the restoration process which acquires the restored/recovered image while removing the influence of the point spread phenomenon of an optical system, such as a lens, it is important to use an appropriate restoration filter. A restoration filter and a filter coefficient of the restoration filter fluctuate depending on various photographing conditions, such as an F value, as well as the type of a lens, that is, an optical system. For this reason, in order to appropriately perform a point image restoration process according to optical systems and photographing conditions, restoration filters according to the optical systems and the photographing conditions are required, and the data amount of all required restoration filters becomes huge.

A camera body cannot necessarily have a memory with enough capacity under various restrictions. Accordingly, in order to store and retain restoration filters relating to all optical systems likely to be used for photographing in the memory of the camera body, an expensive memory with great storage capacity and small size is required.

However, in a lens interchangeable camera body, practically, it is very difficult to retain restoration filters relating to all mountable lenses, that is, optical systems for each photographing condition. This is because, in the lens interchangeable system, while there are an infinite number of combinations of a replacement lens, that is, an optical system and a camera body, that is, a body taking into consideration a possibility in the future, the data amount storable in the memory of the camera body is limited.

A lens which hardly receives the benefit of the point image restoration process, that is, the effect of the point image restoration process may be included among replacement lenses, and an individual lens may hardly receive the benefit of the restoration process depending on the setting or the photographing condition. In regard to "a combination of a replacement lens and a camera body" as well as "a replacement lens" itself, there is a combination or a photographing condition setting which hardly receives the benefit of the restoration process.

In this way, in case where a restoration filter under the condition that the restoration effect by the point image restoration process is intrinsically small is retained in the memory the same as a restoration filter under the condition that the restoration effect by the point image restoration process is great, from the viewpoint of the restoration effect, it can be seen that the memory capacity is used wastefully.

Accordingly, in a situation in which the capacity of the camera body memory is limited, it is desirable to provide a technique for efficiently storing and retaining a restoration filter of a mounted lens (optical system) in the camera body memory. In particular, a situation in which it is difficult to store a new restoration filter in the camera body memory due to communication failure, a photographing mode, or the like may be encountered. It is desirable to provide a technique for preventing image data with conspicuous image quality deterioration due to the point spread phenomenon from being output to the outside as much as possible without image quality correction even if such a situation is encountered.

However, a technique which meets these demands has not been hitherto suggested.

For example, JP2011-10214A discloses a method which updates stored data according to a photographing mode in case where storing a plurality of recovery filters. According to this method, a recovery filter to be retained is determined based on "an estimated use frequency". For example, in a diaphragm priority mode, a recovery filter as data relating to the same diaphragm is retained, and data relating to other diaphragms is deleted. However, point image blur, called a point spread phenomenon, depends on optical image capture hardware, such as a mounted lens or an image capture element, or a photographing setting condition, such as a diaphragm or a zoom. For this reason, the correlation between "the degree of point image blur in output image data" and "the estimated use frequency or use history" is low. Accordingly, even if data to be deleted from the memory is determined based on the use frequency using the method of JP2011-10214A, data having a great restoration effect is not necessarily preserved in the memory on the camera body side, and appropriate data compression is not implemented. As the method of JP2011-10214A, if data to be deleted from the memory is determined based on the estimated use frequency, data necessary at the time of actual photographing may be deleted, and a restoration process may not be performed for photographic image data with high accuracy.

Similarly, in JP2010-35177A and JP2011-119874A, a technique for storing and retaining data, such as a restoration filter, which is effective to prevent image data with conspicuous image quality deterioration due to the point spread phenomenon from being output to the outside as much as possible, in the memory with limited capacity on the camera body side is neither disclosed nor suggested.

In this way, in the related art, it cannot be said that the memory on the camera body side is necessarily effectively utilized in connection with the point image restoration process. Accordingly, it is desirable to provide "a method which preserves data having a high restoration effect in the memory on the camera body side with priority, and for example, preserves data relating to a restoration recommendation condition on which a high restoration effect is estimated, such as both ends of the F value, the focal distance, or the like in the memory with priority" or "a method which preserves characteristic data having low correlation with characteristic data of other lenses out of characteristic data of a plurality of lenses stored and retained in the memory of the camera body side in the memory on the camera body side with priority".

The invention has been accomplished in consideration of the above-described situation, and one object of the invention is to provide a technique capable of efficiently storing and retaining characteristic data of an optical system used for a restoration process in a memory with limited storage capacity, that is, a storage unit, in consideration of the degree of image restoration.

Another object of the invention is to provide a technique capable of efficiently storing and retaining characteristic data of an optical system used for a restoration process in a storage unit with limited storage capacity in consideration of independence between process parameters stored in the storage unit.

An aspect of the invention relates to an image processing device including a characteristic data storage unit which is capable of storing characteristic data of a plurality of types of optical systems, a storage control unit which controls the characteristic data storage unit, and a restoration processing unit which subjects source image data to a restoration process using a restoration filter based on a point spread function of an optical system to acquire recovered image data. The restoration processing unit acquires the restoration filter based on the characteristic data stored in the characteristic data storage unit, and in case where storing the characteristic data in the characteristic data storage unit, the storage control unit controls the characteristic data stored in the characteristic data storage unit based on a restoration evaluation value which is allocated to the characteristic data according to the type of optical system and represents the degree of image restoration by the restoration process.

According to this aspect, the characteristic data which is stored in the characteristic data storage unit is controlled based on the restoration evaluation value representing the degree of image restoration by the restoration process. Therefore, it is possible to efficiently store and retain the process parameter of the restoration process, such as the restoration filter, in the characteristic data storage unit with limited storage capacity in consideration of the restoration evaluation value representing the degree of image restoration.

"The restoration evaluation value" used herein is an index representing the effect of the restoration process, that is, the degree of image restoration, and from an arbitrary viewpoint, the restoration evaluation value can be determined according to the type of optical system. For example, a value predictively representing the degree of change between images before and after the restoration process may be a restoration evaluation value.

Preferably, for storing the characteristic data in the characteristic data storage unit, in case where deleting the characteristic data already stored in the characteristic data storage unit from the characteristic data storage unit, the storage control unit deletes the characteristic data from the characteristic data storage unit based on the restoration evaluation value in an ascending order of the degree of image restoration by the restoration process.

According to this aspect, characteristic data having a relatively great degree of image restoration by the restoration process is stored and retained in the characteristic data storage unit with priority.

Preferably, for storing the characteristic data in the characteristic data storage unit, in case where storing new characteristic data in the storage area of the characteristic data already stored in the characteristic data storage unit, the storage control unit determines the storage area of the new characteristic data from among the storage areas of the characteristic data already stored in the characteristic data storage unit in an order of the storage areas of the characteristic data corresponding to smaller degrees of image restoration by the restoration process based on the restoration evaluation value.

According to this aspect, characteristic data having a relatively great degree of image restoration by the restoration process is stored and retained in the characteristic data storage unit with priority.

Preferably, the characteristic data stored in the characteristic data storage unit is determined according to the type of optical system, the restoration evaluation value is determined for each type of optical system, and for storing the characteristic data in the characteristic data storage unit, in case where deleting the characteristic data already stored in the characteristic data storage unit from the characteristic data storage unit, the storage control unit deletes the characteristic data from the characteristic data storage unit according to the type of optical system based on the restoration evaluation value.

According to this aspect, characteristic data can be deleted from the characteristic data storage unit in terms of "the type of optical system".

Preferably, the characteristic data stored in the characteristic data storage unit is determined according to the type of optical system, the restoration evaluation value is determined for each type of optical system, and for storing the characteristic data in the characteristic data storage unit, in case where storing new characteristic data in the storage area of the characteristic data already stored in the characteristic data storage unit, the storage control unit determines the storage area of the new characteristic data from among the storage areas of the characteristic data already stored in the characteristic data storage unit according to the type of optical system determined for the characteristic data based on the restoration evaluation value.

According to this aspect, characteristic data can be stored in the characteristic data storage unit in terms of "the type of optical system".

Preferably, the characteristic data stored in the characteristic data storage unit is determined according to the type of optical system and photographing conditions, the restoration evaluation value is determined according to the type of optical system and the photographing conditions, and for storing the characteristic data in the characteristic data storage unit, in case where deleting the characteristic data already stored in the characteristic data storage unit from the characteristic data storage unit, the storage control unit deletes the characteristic data from the characteristic data storage unit according to the type of optical system and the photographing conditions based on the restoration evaluation value.

According to this aspect, characteristic data can be deleted from the characteristic data storage unit in terms of a combination of "the type of optical system" and "the photographing conditions".

"The photographing conditions" used herein are various conditions for photographing and acquiring source image data, and may be responsible for image quality of source image data, for example, the degree of point spread phenomenon or the like. Accordingly, the conditions of a diaphragm, a focal distance, an object distance, and the like may be "photographing conditions".

Preferably, the characteristic data stored in the characteristic data storage unit is determined according to the type of optical system and photographing conditions, the restoration evaluation value is determined according to the type of optical system and the photographing conditions, and for storing the characteristic data in the characteristic data storage unit, in case where storing new characteristic data in the storage area of the characteristic data already stored in the characteristic data storage unit, the storage control unit determines the storage area of the new characteristic data from among the storage areas of the characteristic data already stored in the characteristic data storage unit according to the type of optical system and the photographing conditions determined for the characteristic data based on the restoration evaluation value.

According to this aspect, characteristic data can be stored in the characteristic data storage unit in terms of a combination of "the type of optical system" and "the photographing conditions".

Preferably, the characteristic data stored in the characteristic data storage unit is determined according to the type of optical system and photographing conditions, the restoration evaluation value is determined according to the type of optical system and the photographing conditions, and for storing the characteristic data in the characteristic data storage unit, in case where deleting the characteristic data already stored in the characteristic data storage unit from the characteristic data storage unit, the storage control unit deletes the characteristic data from the characteristic data storage unit according to the type of optical system based on a representative value calculated from the restoration evaluation value of each type of optical system.

According to this aspect, even when the restoration evaluation value of each type of optical system fluctuates greatly depending on the photographing conditions, for example, characteristic data of an optical system having a weak restoration effect can be accurately deleted based on the representative value calculated from the restoration evaluation value corresponding to each photographing condition for each type of optical system.

Preferably, the characteristic data stored in the characteristic data storage unit is determined according to the type of optical system and photographing conditions, the restoration evaluation value is determined according to the type of optical system and the photographing conditions, and for storing the characteristic data in the characteristic data storage unit, in case where storing new characteristic data in the storage area of the characteristic data already stored in the characteristic data storage unit, the storage control unit determines the storage area of the new characteristic data from among the storage areas of the characteristic data already stored in the characteristic data storage unit according to the type of optical system determined for the characteristic data based on a representative value calculated from the restoration evaluation value of each type of optical system.

According to this aspect, even when the restoration evaluation value of each type of optical system fluctuates greatly depending on the photographing conditions, for example, characteristic data of a new optical system can be accurately stored in an area, in which characteristic data of an optical system having a weak restoration effect is stored, based on the representative value calculated from the restoration evaluation value corresponding to each photographing condition for each type of optical system.

Preferably, the representative value is an average value, a maximum value, or a minimum value of the restoration evaluation value of each type of optical system.

According to this aspect, based on the average value, the maximum value, or the minimum value of the restoration evaluation value of each type of optical system, characteristic data can be accurately deleted from the characteristic data storage unit, and new characteristic data can be stored in the characteristic data storage unit.

Another aspect of the invention relates to an image processing device including a characteristic data storage unit which is capable of storing characteristic data of a plurality of types of optical systems, a storage control unit which controls the characteristic data storage unit, and a restoration processing unit which subjects source image data to a restoration process using a restoration filter based on a point spread function of an optical system to acquire recovered image data. The restoration processing unit acquires the restoration filter based on the characteristic data stored in the characteristic data storage unit, and in case where storing the characteristic data in the characteristic data storage unit, the storage control unit controls the characteristic data stored in the characteristic data storage unit based on an independence evaluation value which is allocated to the characteristic data according to the optical system and represents the degree of approximation between the characteristic data stored in the characteristic data storage unit.

According to this aspect, characteristic data which is stored in the characteristic data storage unit is controlled based on the independence evaluation value representing the degree of approximation between characteristic data stored in the characteristic data storage unit. Therefore, it is possible to efficiently store and retain the process parameter, such as the restoration filter, in the characteristic data storage unit with limited storage capacity in consideration of the degree of approximation between characteristic data stored in the characteristic data storage unit, that is, non-independence.

"The independence evaluation value" used herein is an index representing the degree of independence between characteristic data stored in the characteristic data storage unit, that is, the degree of non-approximation between characteristic data, and from an arbitrary viewpoint, the restoration evaluation value can be determined for each type of optical system.

Preferably, for storing the characteristic data in the characteristic data storage unit, in case where deleting the characteristic data already stored in the characteristic data storage unit from the characteristic data storage unit, the storage control unit deletes the characteristic data from the characteristic data storage unit in a descending order of the degree of approximation to other characteristic data stored in the characteristic data storage unit based on the independence evaluation value.

According to this aspect, characteristic data is deleted from the characteristic data storage unit in a descending order of the degree of approximation to other characteristic data stored in the characteristic data storage unit based on the independence evaluation value. Therefore, characteristic data having a relatively great degree of difference from other characteristic data stored in the characteristic data storage unit can be stored and retained in the characteristic data storage unit.

Preferably, for storing the characteristic data in the characteristic data storage unit, in case where storing new characteristic data in the storage area of the characteristic data already stored in the characteristic data storage unit, the storage control unit determines the storage area of the new characteristic data from among the storage areas of the characteristic data already stored in the characteristic data storage unit in an order of the storage areas of the characteristic data corresponding to higher degrees of approximation to other characteristic data stored in the characteristic data storage unit based on the independence evaluation value.

According to this aspect, the storage area of new characteristic data is determined from among the storage areas of characteristic data already stored in the characteristic data storage unit in an order of the storage areas of characteristic data corresponding to greater degrees of approximation to other characteristic data stored in the characteristic data storage unit based on the independence evaluation value. Therefore, characteristic data having a relatively great degree of difference from other characteristic data stored in the characteristic data storage unit is stored and retained in the characteristic data storage unit with priority.

Preferably, the independence evaluation value is determined based on the difference between the characteristic data stored in the characteristic data storage unit.

According to this aspect, the independence evaluation value can be simply calculated from the difference between characteristic data stored in the characteristic data storage unit.

Preferably, the characteristic data is data representing the physical characteristic of the optical system.

"The physical characteristic of the optical system" used herein is a characteristic of an optical system which may affect a restoration process, calculation of a restoration filter, or the like, and for example, a point spread function (PSF) of an optical system or an optical transfer function (OTF) may be "the physical characteristic of the optical system".

Preferably, the restoration processing unit calculates a process parameter used for the restoration process from the characteristic data.

According to this aspect, the process parameter used for the restoration process is calculated from "the physical characteristic of the optical system" described above by the restoration processing unit. For example, the process parameter used for the restoration process, such as the restoration filter or the filter coefficient, can be calculated from the point spread function (PSF) of the optical system or the optical transfer function (OTF).

Preferably, the characteristic data is a process parameter used for the restoration process.

According to this aspect, the processing speed of the entire restoration process can be improved without needing to calculate the process parameter used for the restoration process in the restoration processing unit.

Preferably, the storage control unit is capable of acquiring the characteristic data of the optical systems from a first data source and a second data source retaining the characteristic data of the optical systems and storing the characteristic data in the characteristic data storage unit, and the storage control unit calculates an estimated time required for acquiring the characteristic data of the optical systems from the first data source and storing the characteristic data in the characteristic data storage unit and an estimated time required for acquiring the characteristic data of the optical systems from the second data source and storing the characteristic data in the characteristic data storage unit, acquires the characteristic data of the optical systems from one of the first data source and the second data source with a shorter estimated time, and stores the characteristic data in the characteristic data storage unit.

According to this aspect, characteristic data of an optical system is acquired from one of the first data source and the second data source with a shorter estimated time required for acquiring characteristic data of an optical system and storing characteristic data in the characteristic data storage unit and is stored in the characteristic data storage unit. Therefore, it is possible to effectively prevent the time required for acquisition and storage of characteristic data from being extended, and to improve user's convenience.

Preferably, the storage control unit is capable of acquiring the characteristic data of the optical systems from a first data source and a second data source retaining the characteristic data of the optical systems and storing the characteristic data in the characteristic data storage unit, and in case where the first data source does not retain the characteristic data of the optical systems, the storage control unit acquires the characteristic data from the second data source and stores the characteristic data in the characteristic data storage unit.

According to this aspect, desired characteristic data can be appropriately acquired from one of the first data source and the second data source retaining characteristic data of an optical system.

Preferably, in case where storing the characteristic data in the characteristic data storage unit, the storage control unit stores the characteristic data in the characteristic data storage unit in an order of photographing conditions corresponding to greater degrees of image restoration by the restoration process.

According to this aspect, even in case where the storage process of characteristic data is stopped in the middle, it is possible to increase the probability that characteristic data on the photographing conditions with a great degree of image restoration is stored in the characteristic data storage unit before stopping. With this, even in case where the storage process of characteristic data is stopped in the middle, it is possible to increase the probability that the restoration process with a great degree of image restoration can be executed.

Preferably, the optical system has a lens unit which modulates a phase to extend a depth of field.

According to this aspect, in regard to source image data obtained through an extended depth of field (EDoF) optical system, characteristic data which is stored in the characteristic data storage unit can be appropriately controlled. An optical phase modulation method which is a method of modulating a phase in the lens unit is not particularly limited, and a phase modulation unit may be provided between lenses, or a lens itself, for example, an incidence surface or an output surface of a lens may have a phase modulation function.

Still another aspect of the invention relates to an image capture device capable of mounting a plurality of types of optical systems, the image capture device including an image capture element which photographs and acquires source image data through an optical system, and any image processing device described above.

According to this aspect, in the image capture device, it is possible to control characteristic data stored in the characteristic data storage unit and to perform the restoration process described above.

A case where the characteristic data already stored in the characteristic data storage unit is deleted from the characteristic data storage unit may be a case where characteristic data of a mounted optical system is not stored in the characteristic data storage unit.

A case where new characteristic data is stored in the storage area of the characteristic data already stored in the characteristic data storage unit may be a case where characteristic data of a mounted optical system is not stored in the characteristic data storage unit.

In this way, in case where characteristic data of the mounted optical system is not stored in the characteristic data storage unit, characteristic data needs to be deleted from the characteristic data storage unit, or new characteristic data needs to be stored in the storage area of characteristic data already stored in the characteristic data storage unit.

Preferably, the image capture device further includes a battery, and a battery detection unit which detects the power storage state of the battery, and the storage control unit controls the data amount of characteristic data stored in the characteristic data storage unit based on the power storage state of the battery detected by the battery detection unit.

According to this aspect, in case where the power storage state of the battery is low, remaining power of the battery can be used for a process with higher priority, such as a photographing process without performing the storage process of new characteristic data in the characteristic data storage unit.

Still another aspect of the invention relates to an image processing method including a step of storing characteristic data of an optical system in a characteristic data storage unit capable of storing characteristic data of a plurality of types of optical systems, and a step of subjecting source image data to a restoration process using a restoration filter acquired based on the characteristic data stored in the characteristic data storage unit to acquire recovered image data. In the step of storing the characteristic data in the characteristic data storage unit, the characteristic data stored in the characteristic data storage unit is controlled based on a restoration evaluation value which is allocated to the characteristic data according to the type of optical system and represents the degree of image restoration by the restoration process.

Still another aspect of the invention relates to an image processing method including a step of storing characteristic data of an optical system in a characteristic data storage unit capable of storing characteristic data of a plurality of types of optical systems, and a step of subjecting source image data to a restoration process using a restoration filter acquired based on the characteristic data stored in the characteristic data storage unit to acquire recovered image data. In the step of storing the characteristic data in the characteristic data storage unit, the characteristic data stored in the characteristic data storage unit is controlled based on an independence evaluation value which is allocated to the characteristic data according to the type of optical system and represents the degree of approximation between the characteristic data stored in the characteristic data storage unit.

Still another aspect of the invention relates to a program causing a computer to execute a procedure for storing characteristic data of an optical system in a characteristic data storage unit capable of storing characteristic data of a plurality of types of optical systems, and a procedure for subjecting source image data to a restoration process using a restoration filter acquired based on the characteristic data stored in the characteristic data storage unit to acquire recovered image data. In the procedure for storing the characteristic data in the characteristic data storage unit, the characteristic data stored in the characteristic data storage unit is controlled based on a restoration evaluation value which is allocated to the characteristic data according to the type of optical system and represents the degree of image restoration by the restoration process.

Still another aspect of the invention relates to a program causing a computer to execute a procedure for storing characteristic data of an optical system in a characteristic data storage unit capable of storing characteristic data of a plurality of types of optical systems, and a procedure for subjecting source image data to a restoration process using a restoration filter acquired based on the characteristic data stored in the characteristic data storage unit to acquire recovered image data. In the procedure for storing the characteristic data in the characteristic data storage unit, the characteristic data stored in the characteristic data storage unit is controlled based on an independence evaluation value which is allocated to the characteristic data according to the type of optical system and represents the degree of approximation between the characteristic data stored in the characteristic data storage unit.

According to the aspect of the invention, since characteristic data which is stored in the characteristic data storage unit is controlled based on the restoration evaluation value representing the degree of image restoration, it is possible to efficiently store and retain characteristic data directly or indirectly used for the restoration process in the characteristic data storage unit with limited storage capacity in consideration of the degree of image restoration.

According to another aspect of the invention, characteristic data which is stored in the characteristic data storage unit is controlled based on the independence evaluation value representing the degree of approximation between characteristic data stored in the characteristic data storage unit. Therefore, it is possible to efficiently store and retain characteristic data directly or indirectly used for the restoration process in the characteristic data storage unit (memory) with limited storage capacity in consideration of independence between the process parameters stored in the characteristic data storage unit.

BRIEF DESCRIPTION OF THE DRAWINGS

FIGS. 8A, 8B, 8C, 8D, 8E, and 8F are diagrams illustrating a lens unit which is mountable in a camera body.

FIGS. 11A and 11B are diagrams showing an example of storage data of a characteristic data storage unit, FIG. 11A shows a state before a storage area for characteristic data of a new lens unit is secured, and FIG. 11B shows a state after a storage area for characteristic data of a new lens unit is secured.

FIGS. 12A and 12B are diagrams showing another example of storage data of a characteristic data storage unit, FIG. 12A shows a state before a storage area for characteristic data of a new lens unit is secured, and FIG. 12B shows a state after a storage area for characteristic data of a new lens unit is secured.

FIGS. 18A to 18C are diagrams showing an example of storage data of a characteristic data storage unit, FIG. 18A shows a state before a storage area for characteristic data of a new lens unit is secured, FIG. 18B shows characteristic data to be deleted in order to secure a storage area for characteristic data of a new lens unit, and FIG. 18C shows a state after a storage area for characteristic data of a new lens unit is secured.

FIGS. 19A to 19C are diagrams showing another example of storage data of a characteristic data storage unit, FIG. 19A shows a state before a storage area for characteristic data of a new lens unit is secured, FIG. 19B shows characteristic data to be deleted in order to secure a storage area for characteristic data of a new lens unit, and FIG. 19C shows a state after a storage area for characteristic data of a new lens unit is secured.

FIG. 26A shows a blurred image before a restoration process, and FIG. 26B shows an image (point image) with blur eliminated after the restoration process.

DESCRIPTION OF THE PREFERRED EMBODIMENTS

An embodiment of the invention will be described referring to the accompanying drawings. In the following description, as an example, an example where the invention is applied to a digital camera (image capture device) which is connectable to a computer, such as a personal computer, will be described.

First Embodiment

Figure 1:
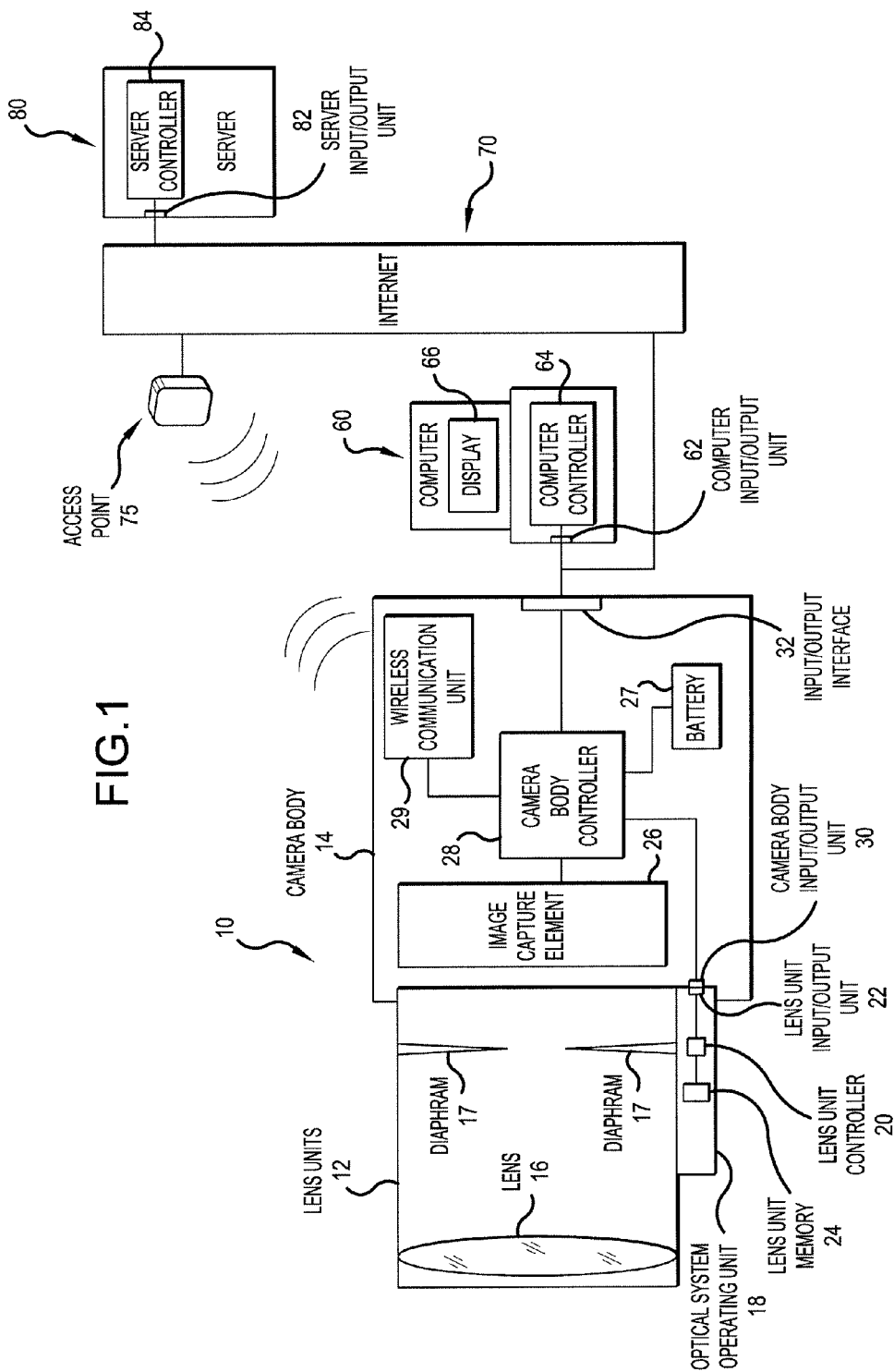
FIG. 1 is a block diagram showing the outline of a digital camera which is connected to a computer.

FIG. 1 is a block diagram showing the outline of a digital camera which is connected to a computer.

The digital camera 10 includes an interchangeable lens unit 12, and a camera body 14 including an image capture element 26, and the lens unit 12 and the camera body 14 are electrically connected through a lens unit input/output unit 22 of the lens unit 12 and a camera body input/output unit 30 of the camera body 14.

The lens unit 12 includes an optical system, such as a lens 16 or a diaphragm 17, and an optical system operating unit 18 which controls the optical system. The optical system operating unit 18 includes a lens unit controller 20 which is connected to the lens unit input/output unit 22, an actuator (not shown) which operates the optical system, and a lens unit memory 24 which stores and retains a restoration filter for use in a point image restoration process described below.

The lens unit controller 20 controls the optical system through an actuator based on a control signal sent from the camera body 14 through the lens unit input/output unit 22, and performs, for example, focus control or zoom control by lens movement, diaphragm amount control of the diaphragm 17, and the like. The lens unit controller 20 reads a restoration filter retained in the lens unit memory 24 based on a control signal sent from the camera body 14 through the lens unit input/output unit 22 and sends the restoration filter to a camera body controller 28 through the lens unit input/output unit 22 and the camera body input/output unit 30.

The lens unit memory 24 retains a restoration filter determined based on a point spread function of an optical system (in particular, the lens 16), and the restoration filter of the lens unit memory 24 is sent to the camera body controller 28 by the lens unit controller 20. The restoration filter may be a frequency space filter or an actual space filter (see FIG. 4 described below), or for example, the lens unit memory 24 may retain a frequency space filter and the camera body controller 28 may calculate an actual space filter from the frequency space filter.

Instead of a filter coefficient or a restoration filter, such as a process parameter, basic data used for calculating a restoration filter may be sent from the lens unit memory 24 to the camera body controller 28. That is, the camera body controller 28 may have a calculation algorithm of a restoration filter and may calculate a restoration filter based on basic data supplied from the lens unit memory 24. As basic data, a physical characteristic value of an optical system (lens 16) itself can be used, and for example, a "point spread function (PSF)" of the lens 16 or an "optical transfer function (OTF)" representing a blur characteristic of an optical system can be suitably used. At least one of an absolute value component of the OTF, that is, a "modulation transfer function (MTF)" representing an amplitude component and a "phase transfer function (PTF)" representing a phase shift as a function of a spatial frequency may be basic data used herein.

The camera body 14 includes a battery 27, a wireless communication unit 29, and an input/output interface 32, in addition to the image capture element 26, the camera body controller 28, and the camera body input/output unit 30.

The image capture element 26 has a condensing microlens, a color filter of RGB or the like, and an image sensor (a photodiode: complementary metal oxide semiconductor (CMOS), a charge coupled device (CCD), or the like), converts light of an object image emitted through the optical system (the lens 16, the diaphragm 17, or the like) of the lens unit 12 to an electrical signal, and sends an image signal (source image data) to the camera body controller 28. In this way, the image capture element 26 photographs and acquires source image data through the optical system, and source image data is transmitted to the image processing device of the camera body controller 28.

The battery 27 is a power supply of the entire digital camera 10, is controlled by the camera body controller 28, and supplies electricity to the respective units (the lens unit 12 and the camera body 14) of the digital camera 10.

The wireless communication unit 29 is controlled by the camera body controller 28, performs wireless transmission/reception (Wi-Fi communication or the like) with the outside (an access point 75 described below or the like), and performs transmission/reception of various kinds of data.

Figure 2:
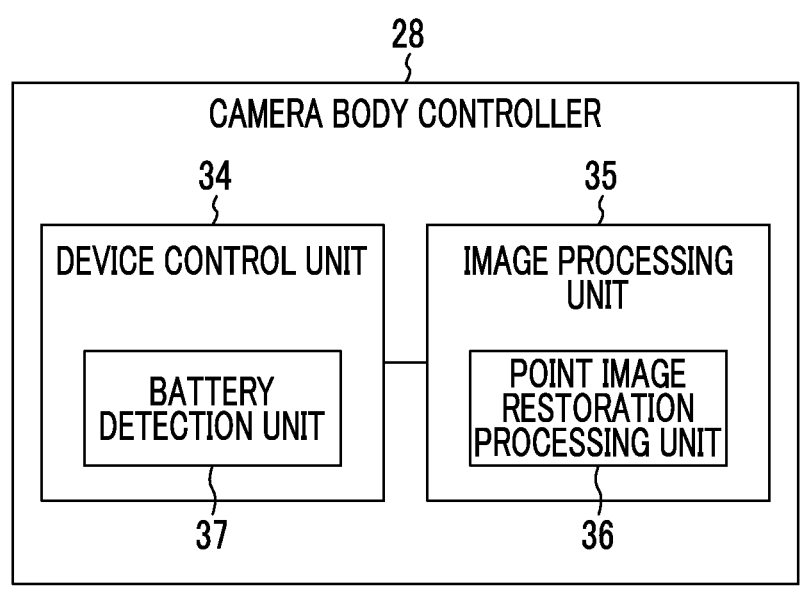
FIG. 2 is a block diagram showing a functional configuration example of a camera body controller.

The camera body controller 28 integrally controls the camera body 14, and as shown in FIG. 2, has a device control unit 34 and an image processing unit (image processing device) 35.

For example, the device control unit 34 can control the output of the image signal from the image capture element 26, can generate a control signal for controlling the lens unit 12 and transmitting the control signal to the lens unit 12 (the lens unit controller 20) through the camera body input/output unit 30, or can transmit image data (RAW data, JPEG data, and the like) before and after an image process to external devices (a computer 60 and the like) connected through the input/output interface 32 or the wireless communication unit 29. The device control unit 34 appropriately controls various devices in the digital camera 10, such as a display unit (not shown) (electronic viewfinder (EVF) or a rear liquid crystal display unit).

The device control unit 34 of this example has a battery detection unit 37 which detects the power storage state of the battery 27. Information (power storage information) of the power storage state of the battery 27 detected by the battery detection unit 37 is transmitted from the device control unit 34 to the image processing unit 35 as necessary.

The image processing unit 35 can subject an image signal from the image capture element 26 to an arbitrary image process as necessary. For example, various image processes, such as a sensor correction process, a demosaic (synchronization) process, a pixel interpolation process, a color correction process (an offset correction process, a white balance process, a color matrix process, and/or a gamma conversion process), an RGB image process (a sharpness process, a tone correction process, an exposure correction process, and/or a contour correction process), an RGB/YCrCb conversion process, and an image compression process, are appropriately performed in the image processing unit 35. In addition, the image processing unit 35 of this example includes a point image restoration processing unit 36 which applies a so-called point image restoration process to the image signal (source image data). The details of the point image restoration process will be described below.

As shown in FIG. 1, image data subjected to the image process in the camera body controller 28 is sent to the computer 60 and the like connected to the input/output interface 32. The format of image data sent from the digital camera 10 (camera body controller 28) to the computer 60 and the like is not particularly limited, and may be an arbitrary format, such as RAW, joint photographic coding experts group (JPEG), or TIFF. Accordingly, the camera body controller 28 may constitute a plurality of pieces of associated data, such as header information (photographing information, that is, photographing date and time, model, pixel number, diaphragm value, and the like), main image data, and thumbnail image data, as one image file in association with one another, like a so-called exchangeable image file format (Exif), and may transmit the image file to the computer 60.

The computer 60 is connected to the digital camera 10 through the input/output interface 32 of the camera body 14 and a computer input/output unit 62, and receives data, such as image data, sent from the camera body 14. A computer controller 64 integrally controls the computer 60, and subjects image data from the digital camera 10 to an image process or controls communication with a server 80 or the like connected to the computer input/output unit 62 through a network line, such as the Internet 70. The computer 60 has a display 66, and the process content in the computer controller 64 is displayed on the display 66 as necessary. The user operates input means (not shown), such as a keyboard, while confirming the display of the display 66, thereby inputting data or commands to the computer controller 64 and controlling the computer 60 or controlling the devices (the digital camera 10 and the server 80) connected to the computer 60.

The server 80 has a server input/output unit 82 and a server controller 84. The server input/output unit 82 constitutes a transmission/reception connection unit with the external devices, such as the computer 60 and the access point 75. Accordingly, the server controller 84 is connectable to, for example, the computer input/output unit 62 of the computer 60 or the access point 75 (the wireless communication unit 29 of the digital camera 10) through the server input/output unit 82 and the network line, such as the Internet 70. The server controller 84 can cooperate with the computer controller 64 in response to a control instruction signal from the computer 60, can perform transmission/reception of data with the computer controller 64 as necessary, and can download data to the computer 60 or can perform a calculation process and can transmit the calculation result to the computer 60. Similarly, the server controller 84 can cooperate with the camera body controller 28 of the digital camera 10 in response to a control instruction signal from the digital camera 10, can perform transmission/reception of data with the camera body controller 28 as necessary, and can download data to the camera body controller 28 or can perform a calculation process and can transmit the calculation result to the camera body controller 28.

Each controller (the lens unit controller 20, the camera body controller 28, the computer controller 64, and the server controller 84) includes circuits necessary for a control process. For example, each controller includes a calculation processing circuit (a CPU or the like), a memory, and the like. Communication among the digital camera 10, the computer 60, and the server 80 may be performed in a wired manner or in a wireless manner. The computer 60 and the server 80 may be constituted integrally, and the computer 60 and/or the server 80 may be omitted.

Next, a point image restoration process of captured data (image data) of an object image obtained through the image capture element 26 will be described.

In this example, although an example where the point image restoration process is carried out in the camera body 14 (camera body controller 28) will be described, the whole or a part of the point image restoration process can be carried out in another controller (the lens unit controller 20, the computer controller 64, the server controller 84, or the like).

The point image restoration process is a process which subjects source image data acquired from the image capture element 26 by photographing using the optical system (the lens 16, the diaphragm 17, or the like) to a point image restoration process using a restoration filter based on a point spread function of the optical system to acquire recovered image data.

Figure 3:
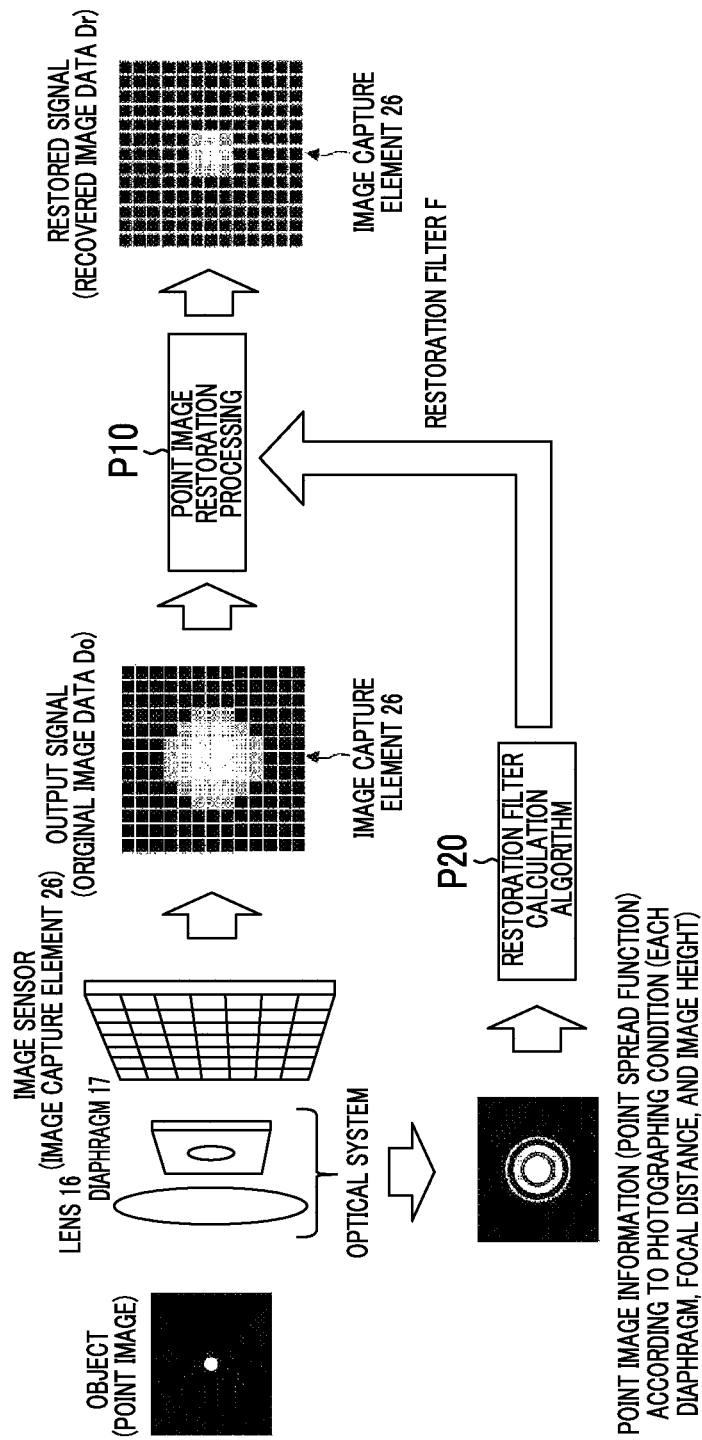
FIG. 3 is a diagram showing an outline from image photographing to a point image restoration process.

FIG. 3 is a diagram showing an outline from image photographing to the point image restoration process. When photographing is performed with a point image as an object, an object image is received by the image capture element 26 (image sensor) through the optical system (the lens 16, the diaphragm 17, or the like), and source image data Do is output from the image capture element 26. Source image data Do becomes image data, in which an original object image is in a blurred state, by a point spread phenomenon resulting from the characteristic of the optical system.

In order to restore the original object image (point image) from source image data Do of the blurred image, source image data Do is subjected to a point image restoration process P10 using a restoration filter F, whereby recovered image data Dr representing an image (recovered image) closer to the original object image (point image) is obtained.

The restoration filter F used for the point image restoration process P10 is obtained from point image information of the optical system according to the photographing conditions at the time of acquiring source image data Do, that is, from the point spread function, by a predetermined restoration filter calculation algorithm P20. The point image information of the optical system, that is, the point spread function, fluctuates depending on various photographing conditions, such as a diaphragm amount, a focal distance, a zoom amount, an image height, a recording pixel number, and a pixel pitch, as well as the type of lens 16; therefore, for calculating the restoration filter F, a part or all of the photographing conditions are acquired.

Figure 4:
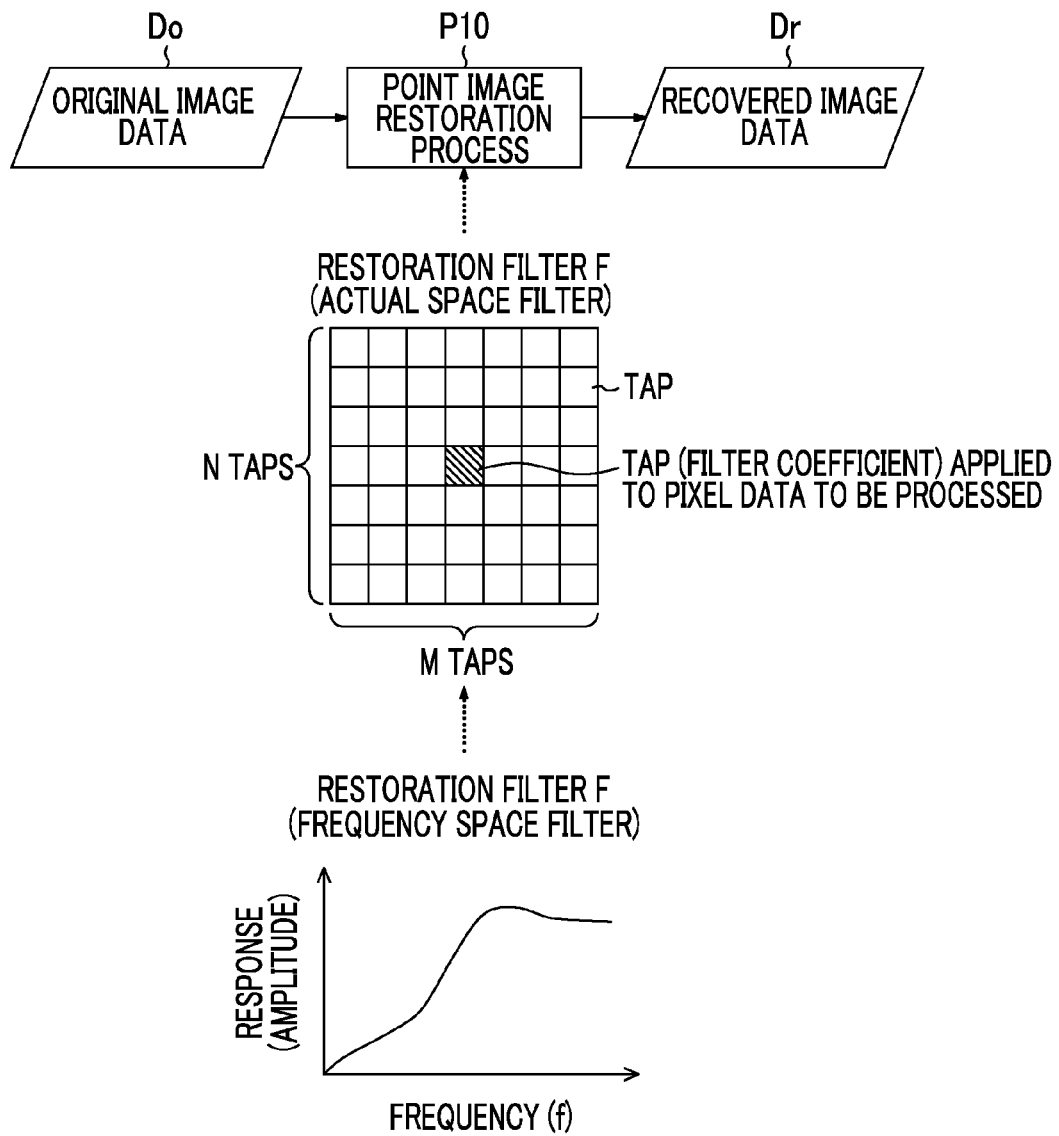
FIG. 4 is a block diagram showing the outline of an example of the point image restoration process.

FIG. 4 is a block diagram showing the outline of an example of the point image restoration process.

As described above, the point image restoration process P10 is a process which creates recovered image data Dr from source image data Do by a filtering process using the restoration filter F, and the restoration filter F on an actual space constituted of, for example, N×M (where N and M are integers equal to or greater than two) taps is applied to image data to be processed. With this, weighted average calculation (deconvolution calculation) of a filter coefficient allocated to each tap and corresponding pixel data (pixel data to be processed of source image data Do and adjacent pixel data) is performed, whereby pixel data (recovered image data Dr) after the point image restoration process can be calculated. The weighted average process using the restoration filter F is applied to all pixel data constituting image data while changing a target pixel in order, thereby performing the point image restoration process.

The restoration filter on the actual space constituted of the N×M taps can be derived by inverse Fourier transform of a restoration filter on a frequency space. Accordingly, the restoration filter on the actual space can be appropriately calculated by specifying a restoration filter on a frequency space as the basis and designating the number of taps constituting the restoration filter of the actual space.

As described above, source image data is subjected to the point image restoration process using the restoration filter, whereby an image (recovered image data) which has less blur than source image data and is close to the original object image can be restored. When the point image restoration process is performed in the camera body 14 (the camera body controller 28), data relating to the point spread function of the optical system (lens 16) is required to be retained in the camera body 14. In particular, in a lens interchangeable system, data of a plurality of types of optical systems is required to be stored and retained in the camera body 14. In addition, since data necessary for the point image restoration process changes depending on the photographing conditions, such as a lens, a diaphragm, and a focal distance, it is very difficult to store all data necessary for the point image restoration process in the camera body 14 from the beginning due to the restriction of memory capacity.

In the following example, a case where, in a situation in which remaining storable capacity enough to store characteristic data (characteristic data of an optical system) of a new lens unit 12 cannot be secured on the camera body 14 side, that is, in a situation in which there is no remaining storable capacity of the characteristic data storage unit 42, or storage capacity is small, when characteristic data of the new lens unit 12 needs to be stored on the camera body 14 side, data of a lens having a great restoration effect is preserved with priority will be described.

Figure 5:
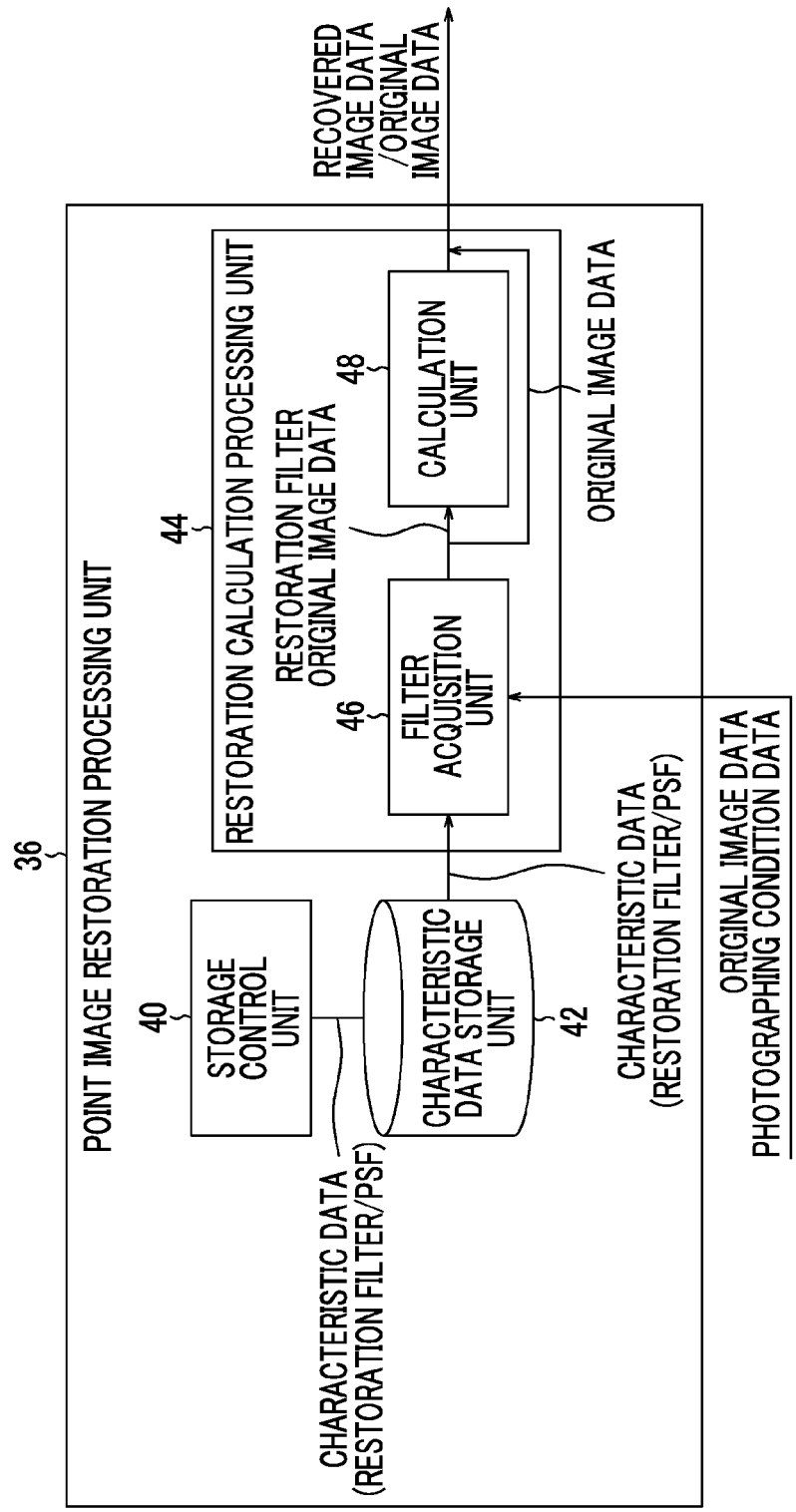
FIG. 5 is a block diagram showing an example of the functional configuration of a point image restoration processing unit (see FIG. 2).

FIG. 5 is a block diagram showing an example of the functional configuration of the point image restoration processing unit 36 (see FIG. 2).

The point image restoration processing unit 36 of this example has a characteristic data storage unit 42 which is capable of storing characteristic data of a plurality of types of optical systems, a storage control unit 40 which controls the characteristic data storage unit 42, and a restoration calculation processing unit 44 which subjects source image data to a point image restoration process.

Characteristic data which is stored in the characteristic data storage unit 42 may be data representing the physical characteristic of the optical system, that is, characteristic data representing the physical characteristic of the lens unit 12 (lens 16) itself, or may be a process parameter for use in the point image restoration process, that is, a parameter for an image process. For example, a restoration filter (process parameter) for use in the point image restoration process in the restoration calculation processing unit 44 described below, or data (data representing the physical characteristic of the optical system: PSF, OTF, or the like) as the basis of calculation of a restoration filter may be stored in the characteristic data storage unit 42 as characteristic data.

The restoration calculation processing unit 44 has a filter acquisition unit 46 and a calculation unit 48, and performs a point image restoration process using a restoration filter based on a point spread function of an optical system to acquire recovered image data.

Source image data, photographing condition data for photographing and acquiring source image data, and data information (storage information) retained in the characteristic data storage unit 42 are input to the filter acquisition unit 46 (the restoration calculation processing unit 44). The filter acquisition unit 46 determines the presence or absence of the execution of the point image restoration process based on input data (storage information of the characteristic data storage unit 42, source image data, and photographing condition data), and controls data transmission to a post stage.

For example, when characteristic data (restoration filter, PSF, or the like) corresponding to input source image data and photographing condition data is not stored in the characteristic data storage unit 42, the filter acquisition unit 46 skips a calculation process (point image restoration process) in the following calculation unit 48 and sends source image data to the post stage. In case where characteristic data corresponding to input source image data and photographing condition data is stored in the characteristic data storage unit 42, the filter acquisition unit 46 acquires a restoration filter corresponding to photographing condition data of source image data based on characteristic data stored in the characteristic data storage unit 42 and sends the corresponding restoration filter to the calculation unit 48 along with source image data.

In case where characteristic data retained in the characteristic data storage unit 42 is a "restoration filter", the filter acquisition unit 46 reads the corresponding restoration filter from the characteristic data storage unit 42 based on photographing condition data and sends the corresponding restoration filter to the calculation unit 48. In case where characteristic data retained in the characteristic data storage unit 42 is "data representing a physical characteristic of an optical system", the filter acquisition unit 46 calculates a restoration filter from corresponding "data representing the physical characteristic of the optical system" retained in the characteristic data storage unit 42 and sends the restoration filter acquired by calculation to the calculation unit 48.

The calculation unit 48 performs a point image restoration process by applying the restoration filter acquired by the filter acquisition unit 46 to source image data, and acquires and outputs recovered image data.

A supply method of source image data and photographing condition data to the restoration calculation processing unit 44 (the filter acquisition unit 46 and the calculation unit 48) is not particularly limited. For example, source image data from the image capture element 26 may be input directly to the restoration calculation processing unit 44, or source image data and photographing condition data temporarily stored in another memory (not shown) may be input to the restoration calculation processing unit 44. Data (for example, Exif data) in which photographing condition data is attached to source image data may be input to the restoration calculation processing unit 44, or photographing condition data and source image data may be input separately.

In case where storing new characteristic data (restoration filter, PSF, or the like) in the characteristic data storage unit 42, the storage control unit 40 controls characteristic data stored in the characteristic data storage unit 42 based on the restoration evaluation value which is allocated to characteristic data according to the type of optical system (lens 16) and represents the degree of image restoration by the point image restoration process.

Figure 6:
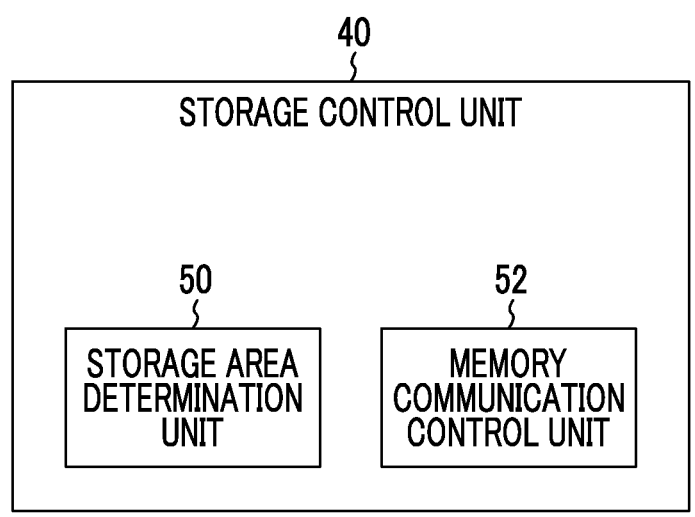
FIG. 6 is a block diagram showing an example of the functional configuration of a storage control unit.

FIG. 6 is a block diagram showing an example of the functional configuration of the storage control unit 40.

The storage control unit 40 has a storage area determination unit 50 which controls the storage area (memory address) of characteristic data in the characteristic data storage unit 42, and a memory communication control unit 52 which controls communication with the outside. With the cooperation of the storage area determination unit 50 and the memory communication control unit 52, even in case where characteristic data of the data amount exceeding the remaining storable capacity of the memory (characteristic data storage unit 42) on the camera body 14 side needs to be newly stored in the characteristic data storage unit 42, it is possible to efficiently utilize the storage area of the characteristic data storage unit 42.

Hereinafter, the action of the storage control unit 40 (the storage area determination unit 50 and the memory communication control unit 52) will be described with a specific example.

Figure 7A:
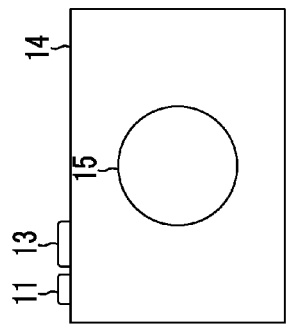
FIG. 7A is a perspective view of a lens unit.
Figure 7B:
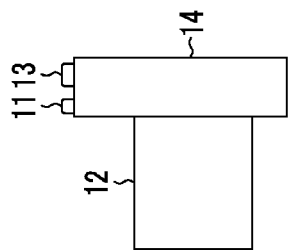
FIG. 7B is a front view of a camera body.
Figure 7C:
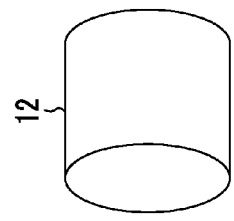
FIG. 7C is a side view of a state before mounting a lens unit and a camera body.
Figure 7D:
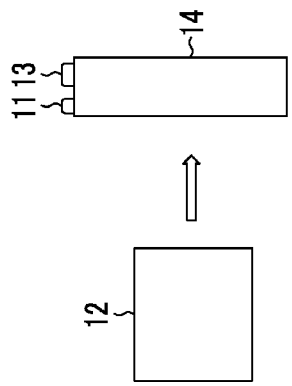
FIG. 7D is a side view of a state after mounting.

FIG. 7A is a perspective view of the lens unit 12, FIG. 7B is a front view of the camera body 14, FIG. 7C is a side view of a state before mounting the lens unit 12 and the camera body 14, and FIG. 7D is a side view of a state after mounting.

In this example, as shown in FIGS. 7A to 7D, the lens unit 12 is mounted on a mount 15 of the camera body 14. After mounting, it is confirmed whether or not characteristic data of lens unit 12 (lens 16) is stored in the characteristic data storage unit 42 (see FIGS. 2 and 5) of the point image restoration processing unit 36, and characteristic data is sent from the lens unit memory 24 (see FIG. 1) to the characteristic data storage unit 42 as necessary.

That is, the storage area determination unit 50 confirms whether or not characteristic data of the lens unit 12 mounted in the camera body 14 is retained in the characteristic data storage unit 42, and in case where characteristic data is not retained, newly writes and stores characteristic data of the lens unit 12 in the characteristic data storage unit 42. For example, in case where the user has a plurality of types of lens units 12, a case where a new lens unit 12 which has not been mounted in the camera body 14 is mounted in the camera body 14 or a case where characteristic data of a mounted lens unit 12 has been previously stored in the characteristic data storage unit 42 but is not retained currently may be assumed as "a case where characteristic data of the lens unit 12 mounted in the camera body 14 needs to be newly written in the characteristic data storage unit 42".

In such a case, when the data amount of characteristic data which needs to be newly stored exceeds the remaining storable capacity of the camera body 14 (characteristic data storage unit 42), new characteristic data is stored in the memory space where characteristic data having a relatively small point image restoration process effect out of characteristic data already retained in the characteristic data storage unit 42 is stored.

FIGS. 8A, 8B, 8C, 8D, 8E, and 8F show an example of the lens unit 12 mountable in the camera body 14.

Characteristic data which is stored in the characteristic data storage unit 42 is determined according to the type of optical system. Accordingly, for example, a case where the characteristic data storage unit 42 has storage capacity storable characteristic data of four types of lens units 12 and characteristic data of a lens unit A to a lens unit D (FIGS. 8A to 8D) is retained in the characteristic data storage unit 42 is assumed.

In this case, characteristic data of a lens unit E (see FIG. 8E) and a lens unit F (see FIG. 8F) among the lens units 12 mountable in the camera body 14 is not stored in the characteristic data storage unit 42. For the lens unit F, while corresponding characteristic data has been previously stored in the characteristic data storage unit 42, at present, corresponding characteristic data is not stored in the characteristic data storage unit 42. Since the lens unit F is not mounted in the lens unit 12 at present, characteristic data of the lens unit F does not need to be stored in the characteristic data storage unit 42.

Since the lens unit E is mounted in the lens unit 12, characteristic data of the lens unit E needs to be stored in the characteristic data storage unit 42. However, since the characteristic data storage unit 42 already retains characteristic data of the four types of lens units 12 (the lens unit A to the lens unit D), the remaining storable capacity of characteristic data of the new lens unit E is not enough. Accordingly, in order to secure the storage area for characteristic data of the lens unit E in the characteristic data storage unit 42, an area for storing characteristic data of the lens unit E from among the storage areas of characteristic data retained in the characteristic data storage unit 42 needs to be determined.

In this example, the storage area for characteristic data of the new lens unit E is determined based on the restoration evaluation value determined for each type of lens unit 12 (optical system) by the storage area determination unit 50. Specifically, in order to store characteristic data of the new lens unit E in the characteristic data storage unit 42, in case where characteristic data already stored in the characteristic data storage unit 42 needs to be deleted from the characteristic data storage unit 42, the storage control unit 40 (storage area determination unit 50; see FIG. 5) deletes characteristic data from the characteristic data storage unit 42 according to the type of optical system based on the restoration evaluation value. In order to store characteristic data of the new lens unit E in the characteristic data storage unit 42, in case where new characteristic data needs to be stored in the storage area of characteristic data already stored in the characteristic data storage unit 42, the storage control unit 40 (storage area determination unit 50) determines the storage area of new characteristic data from among the storage areas of characteristic data already stored in the characteristic data storage unit 42 according to the type of optical system determined for characteristic data based on the restoration evaluation value.

For example, as in this example, in the camera body 14 (image capture device) mountable a plurality of types of lens units 12 (optical systems), a case where characteristic data of an optical system actually mounted is not stored in the characteristic data storage unit 42 may be "a case where characteristic data already stored in the characteristic data storage unit 42 needs to be deleted from the characteristic data storage unit 42", or "a case where new characteristic data needs to be stored in the storage area of characteristic data already stored in the characteristic data storage unit 42".

The "restoration evaluation value" used herein represents the degree of the point image restoration process effect in the point image restoration processing unit 36, and from an arbitrary viewpoint, the restoration evaluation value can be determined for each type of optical system. For example, a value representing a change between the images before and after the point image restoration process, that is, the degree of change in image quality by a predicted value may be the restoration evaluation value. The restoration evaluation value may be allocated to corresponding characteristic data in advance, or may be allocated to corresponding characteristic data by the point image restoration processing unit 36 (the storage control unit 40, the filter acquisition unit 46, or the like).

Figure 9:
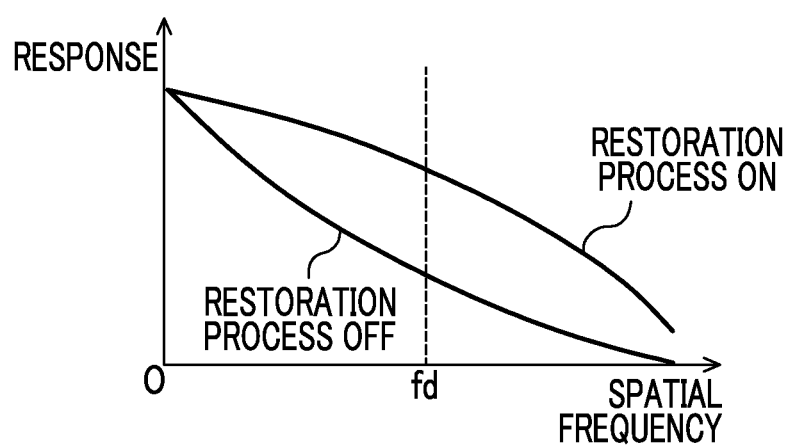
FIG. 9 is a diagram showing an example of a method of determining a restoration evaluation value.

FIG. 9 is a diagram showing an example of a method of determining a restoration evaluation value. In FIG. 9, the horizontal axis indicates a "spatial frequency", the vertical axis indicates a "response (image data)", image data before the point image restoration process, that is, source image data is indicated by "restoration process OFF", and image data after the point image restoration process, that is, recovered image data is indicated by "restoration process ON". In the example shown in FIG. 9, the "restoration evaluation value" is determined based on image data before and after the point image restoration process at a predetermined frequency $f_d$. Specifically, in regards to image data before the point image restoration process and image data after the point image restoration process, the "restoration evaluation value" can be determined based on a response ratio or difference at a certain frequency $f_d$. The predetermined frequency $f_d$ may be appropriately determined according to a visual characteristic or the like.

Figure 10:
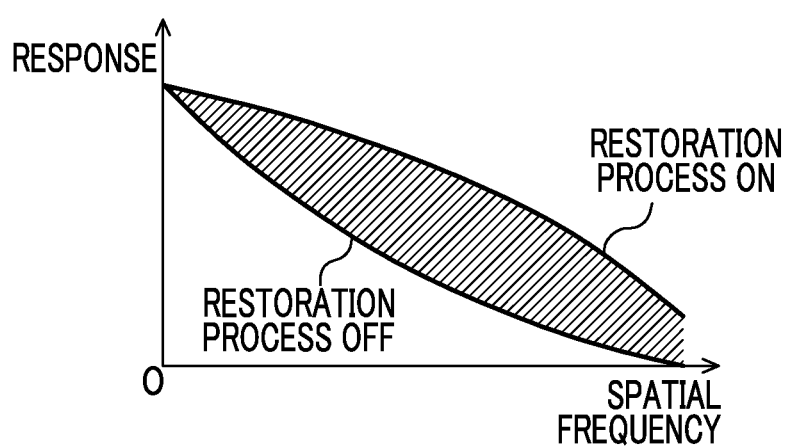
FIG. 10 is a diagram showing another example of a method of determining a restoration evaluation value.

FIG. 10 is a diagram showing another example of a method of determining a restoration evaluation value. While the notation in FIG. 10 has the same meaning as the notation in FIG. 9, in the example shown in FIG. 10, the "restoration evaluation value" is determined based on image data before and after the point image restoration process in a frequency band having a predetermined width. Specifically, in regards to image data before the point image restoration process and image data after the point image restoration process, the "restoration evaluation value" can be determined based on a cumulative value (see an inclined portion of FIG. 10) of a response difference in the entire frequency band having a certain bandwidth.

A method of determining the "restoration evaluation value" is not limited to the example shown in FIG. 9 or 10, and for example, the "restoration evaluation value" may be determined based on the degree of suppression of noise (for example, the degree of suppression of chromatic aberration or the like) in image data before and after the point image restoration process. In case where there are a plurality of types of indexes (basic data) constituting the basis of the restoration evaluation value, an overall value obtained by weight-adding the indexes can be used as the restoration evaluation value representing the degree of the point image restoration process effect.

FIGS. 11A and 11B are diagrams showing an example of storage data of the characteristic data storage unit 42, FIG. 11A shows a state before the storage area for characteristic data of the new lens unit E is secured, and FIG. 11B shows a state after the storage area for characteristic data of the new lens unit E is secured.

In the example shown in FIGS. 11A and 11B, the restoration evaluation value of the lens unit A is "100", the restoration evaluation value of the lens unit B is "80", the restoration evaluation value of the lens unit C is "60", the restoration evaluation value of the lens unit D is "50", and the restoration evaluation value of the lens unit E is "40". In this example, characteristic data of the lens unit 12 having a great restoration evaluation value has a great point image restoration process effect.

While the restoration evaluation value of the lens unit E is the lowest and the effect of the point image restoration process is the smallest, since the lens unit E is mounted in the camera body 14, characteristic data of the lens unit E is stored in the characteristic data storage unit 42 with priority over characteristic data of other lens units. Accordingly, the storage area of characteristic data relating to one type of lens unit 12 out of characteristic data stored in the characteristic data storage unit 42 needs to be determined as the storage area of characteristic data of the lens unit E. In this example, the storage area of characteristic data stored in the characteristic data storage unit 42 is determined as the storage area for characteristic data of the new lens unit E in an ascending order of the restoration evaluation value. For example, in the example shown in FIGS. 11A and 11B, the storage area of characteristic data relating to the lens unit D having the lowest restoration evaluation value out of characteristic data stored in the characteristic data storage unit 42 is utilized as the storage area for characteristic data of the new lens unit E. Accordingly, in the example shown in FIGS. 11A and 11B, if the new lens unit E is mounted in the camera body 14, characteristic data of the lens unit A, the lens unit B, the lens unit C, and the lens unit E is stored and retained in the characteristic data storage unit 42 (see FIG. 11B).

FIGS. 12A and 12B are diagrams showing another example of storage data of the characteristic data storage unit 42, FIG. 12A shows a state before the storage area for characteristic data of the new lens unit E is secured, and FIG. 12B shows a state after the storage area for characteristic data of the new lens unit E is secured. In the example shown in FIGS. 12A and 12B, while the restoration evaluation value of the lens unit E is "90", as in the example shown in FIGS. 11A and 11B, characteristic data of the lens unit E mounted in the camera body 14 is stored in the characteristic data storage unit 42 with priority. The storage area of characteristic data relating to the lens unit D having the lowest restoration evaluation value out of characteristic data stored in the characteristic data storage unit 42 is utilized as the storage area for characteristic data of the new lens unit E. Accordingly, even in the example shown in FIGS. 12A and 12B, if the new lens unit E is mounted in the camera body 14, characteristic data of the lens unit A, the lens unit B, the lens unit C, and the lens unit E is stored and retained in the characteristic data storage unit 42 (see FIG. 12B).

Characteristic data of the new lens unit E is read from the lens unit memory 24 (see FIG. 1) while the lens unit E is mounted in the camera body 14, is supplied to the storage control unit 40 (camera body controller 28) through the lens unit controller 20, the lens unit input/output unit 22, and the camera body input/output unit 30, and is stored in the characteristic data storage unit 42 under the control of the storage control unit 40. Characteristic data of the new lens unit E may be acquired from devices other than the lens unit memory 24, or may be acquired from arbitrary devices connected to the camera body controller 28 (storage control unit 40) in a wired manner or in a wireless manner. Accordingly, for example, characteristic data of the new lens unit E may be acquired from the server 80 (server controller 84) through the wireless communication unit 29 and the access point 75 (see FIG. 1) and stored in the characteristic data storage unit 42. Furthermore, characteristic data of the new lens unit E may be acquired from the computer 60 (computer controller 64) through the input/output interface 32 and the computer input/output unit 62 (see FIG. 1) and stored in the characteristic data storage unit 42.

As described above, in case where characteristic data of the lens unit 12 currently attached to the camera body 14 is not present on the camera body 14 side (characteristic data storage unit 42), characteristic data of the lens unit 12 needs to be loaded into the characteristic data storage unit 42. If there is a margin for the free storage capacity on the camera body 14 side (characteristic data storage unit 42), characteristic data of the new lens unit 12 can be loaded into the free storage area. However, in case where there is no margin for the free storage capacity, that is, in case where characteristic data of the new lens unit 12 cannot be covered with the free storage capacity, a part of characteristic data already retained in the characteristic data storage unit 42 needs to be deleted. The restoration evaluation value which represents the degree of the point image restoration process effect in case where used in the point image restoration process is allocated to characteristic data. In case where the new lens unit 12 is attached to the camera body 14, characteristic data is deleted in an ascending order of the effect from among characteristic data already retained in the characteristic data storage unit 42 based on the restoration evaluation value, and characteristic data of the new lens unit 12 is loaded into the characteristic data storage unit 42. Since the lens unit 12 newly attached to the camera body 14 is used for immediate photographing, corresponding characteristic data is loaded into the characteristic data storage unit 42 regardless of the magnitude of the point image restoration process effect.

Figure 13:
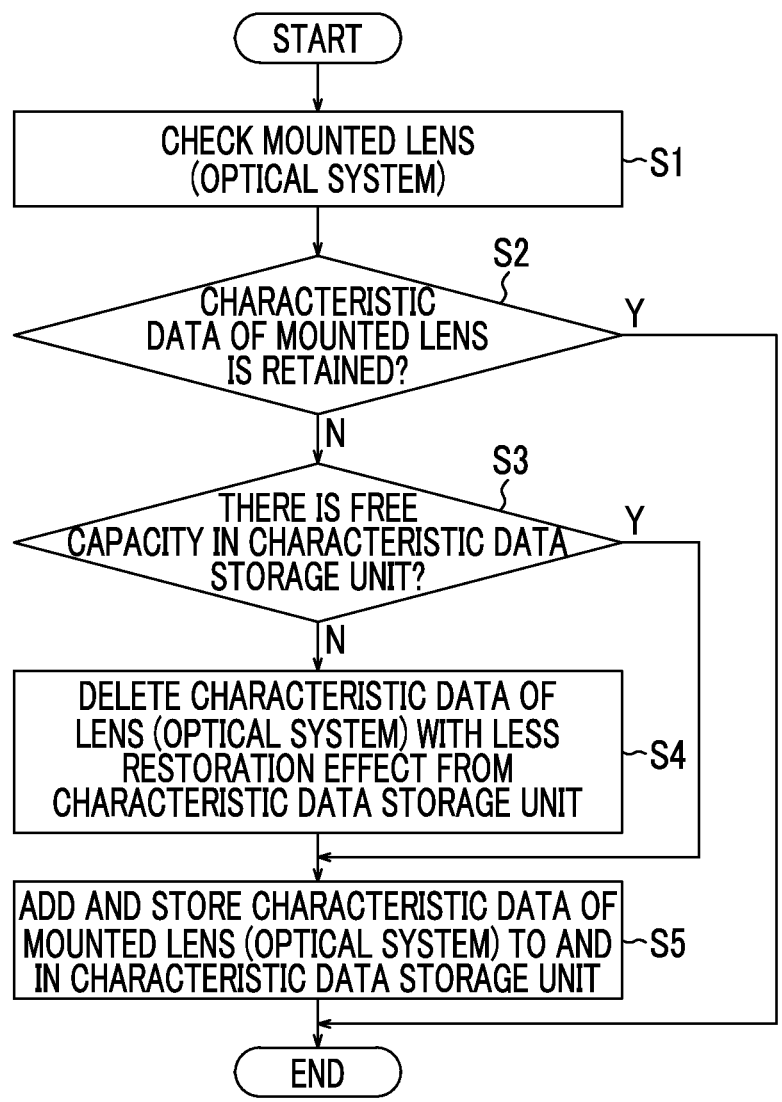
FIG. 13 shows an example of a storage necessity determination flow of characteristic data of a new lens unit to a characteristic data storage unit in a first embodiment.

FIG. 13 shows an example of a storage necessity determination flow of characteristic data of the new lens unit E to the characteristic data storage unit 42 in the first embodiment.

First, information of the type of lens unit 12 (mounted lens: optical system) mounted in the camera body 14 is acquired by the storage control unit 40 (S1 of FIG. 13), and it is determined by the storage control unit 40 whether or not characteristic data corresponding to the mounted lens unit 12 is stored and retained in the characteristic data storage unit 42 (S2). In case where it is determined that characteristic data corresponding to the mounted lens unit 12 is stored and retained in the characteristic data storage unit 42 (Y in S2), since corresponding characteristic data does not need to be stored in the characteristic data storage unit 42, this process flow ends.

In case where it is determined that characteristic data corresponding to the mounted lens unit 12 is not stored and retained in the characteristic data storage unit 42 (N in S2), it is determined by the storage control unit 40 whether or not the characteristic data storage unit 42 has a free capacity (remaining storable capacity) enough to store characteristic data of the new lens unit E (S3).

In case where it is determined that the characteristic data storage unit 42 does not have enough free capacity (N in S3), characteristic data of the lens unit 12 is deleted from the characteristic data storage unit 42 in an ascending order of the restoration effect under the control of the storage control unit 40 (storage area determination unit 50) (S4). That is, for storing new characteristic data in the characteristic data storage unit 42, in case where characteristic data already stored in the characteristic data storage unit 42 needs to be deleted from the characteristic data storage unit 42, the storage control unit 40 deletes characteristic data from the characteristic data storage unit 42 in an ascending order of the degree of image restoration by the point image restoration process based on the restoration evaluation value. With this, the space (storage capacity) for storing characteristic data of the new lens unit E is secured in the characteristic data storage unit 42. The data amount of characteristic data which is deleted from the characteristic data storage unit 42 corresponds to the data amount of characteristic data which is newly stored in the characteristic data storage unit 42.

After a part of characteristic data stored in the characteristic data storage unit 42 is deleted, characteristic data of the new lens unit E is stored in the free space of the characteristic data storage unit 42 under the control of the storage control unit 40 (storage area determination unit 50) (S5). That is, for storing new characteristic data in the characteristic data storage unit 42, in case where new characteristic data need to be stored in the storage area of characteristic data already stored in the characteristic data storage unit 42, the storage control unit 40 of this example determines the storage area of new characteristic data from among the storage areas of characteristic data already stored in the characteristic data storage unit 42 in an order of the storage areas of characteristic data corresponding to smaller degrees of restoration effect based on the restoration evaluation value.

In case where it is determined that the characteristic data storage unit 42 has enough free capacity (Y in S3), characteristic data of the new lens unit E is stored in the free capacity (free memory space) of the characteristic data storage unit 42 under the control of the storage control unit 40 (S5).

In this way, after it is determined whether or not to load characteristic data of the new lens unit E into the characteristic data storage unit 42, characteristic data of the new lens unit E can be stored and retained in the characteristic data storage unit 42. In FIG. 13, although an example where characteristic data is deleted from the characteristic data storage unit 42 (S4), and thereafter, new characteristic data is stored (S5) has been shown, characteristic data may not be deleted, that is, Step S4 may be skipped, and new characteristic data may be overwritten and stored in the corresponding storage area of the characteristic data storage unit 42.

In this example, for loading characteristic data of the new lens unit E into the characteristic data storage unit 42, a system for loading characteristic data is changed depending on whether or not a mode in which photographing of an object image is given priority is executed.

Figure 14:
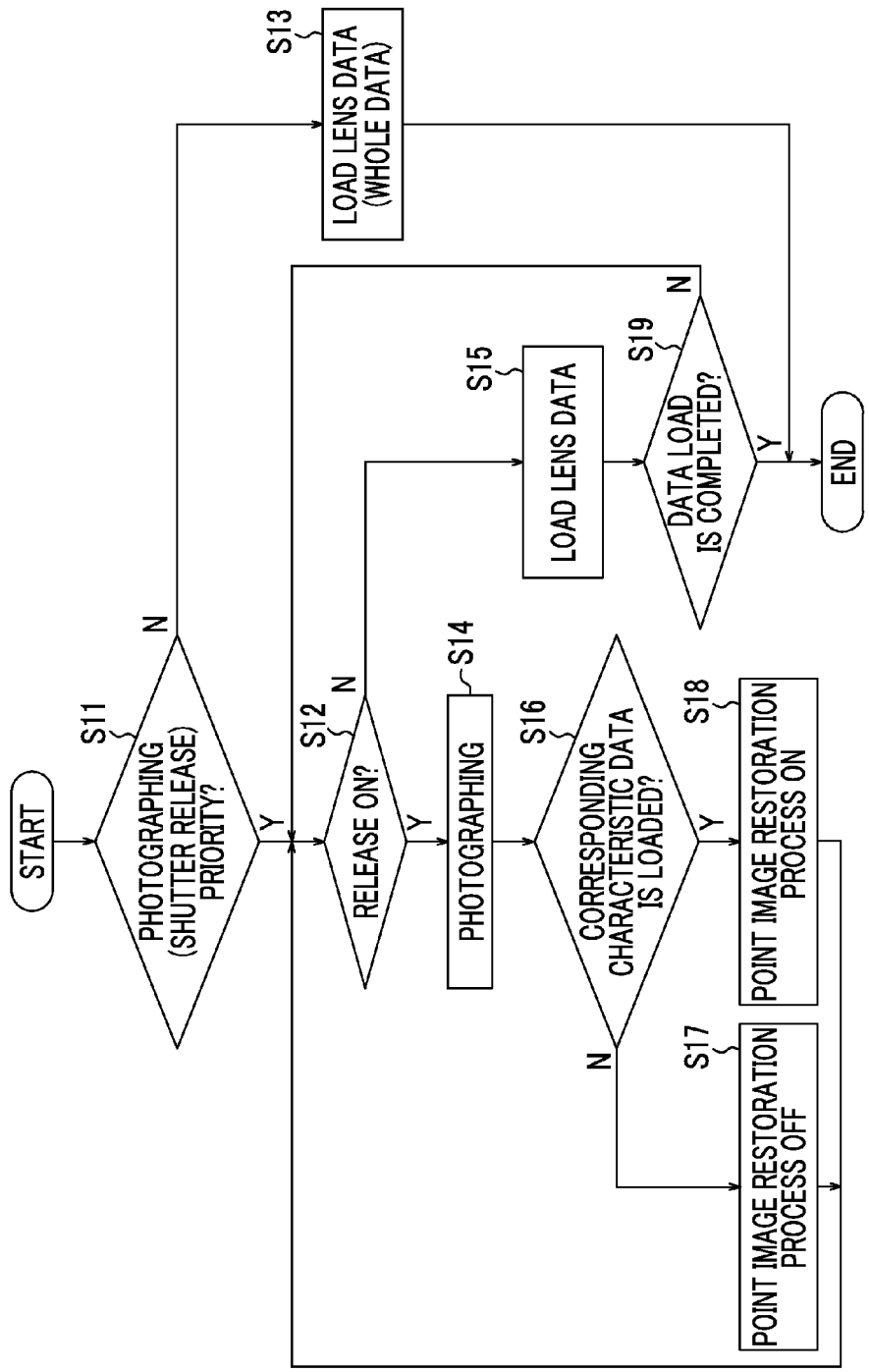
FIG. 14 is a diagram showing an example of a storage process flow for loading characteristic data of a new lens unit into a camera body.

FIG. 14 is a diagram showing an example of a storage process flow for loading characteristic data of the new lens unit 12 into the camera body 14.

In the example shown in FIG. 14, in a photographing priority mode, when photographing is instructed from the user before all characteristic data is loaded into the characteristic data storage unit 42, if characteristic data of the corresponding photographing condition is already loaded into the characteristic data storage unit 42, a signal process in which the point image restoration process is ON, that is, an image process is performed. In case where characteristic data of the corresponding photographing condition is not yet loaded into the characteristic data storage unit 42, a signal process in which the point image restoration process is OFF and the point image restoration process is not performed, that is, an image process is performed.

Specifically, first, a photographing mode in the digital camera 10 is confirmed by the memory communication control unit 52 (storage control unit 40; see FIG. 6), and it is determined by the memory communication control unit 52 whether or not the photographing mode is a photographing (shutter release) priority mode (S11 of FIG. 14). The photographing mode can be appropriately set by the user through a photographing mode selection dial (photographing condition setting operating unit) 13 (see FIG. 7) or the like. The mode setting by the user is detected by the device control unit 34 (see FIG. 2), and the memory communication control unit 52 can determine whether or not the photographing mode is the photographing priority mode based on the detection result.

The "photographing priority mode" used herein is a mode in which photographing of an object image is given priority, and is a mode in which "loading of characteristic data relating to a new lens unit into the characteristic data storage unit 42" is given priority over "photographing of an object image". Accordingly, when the photographing mode is not the "photographing priority mode" (N in S11), the storage area of characteristic data of the new lens unit E is determined under the control of the storage control unit 40 (storage area determination unit 50), all data of characteristic data of the new lens unit E is stored in the characteristic data storage unit 42 (S13), and the storage process ends. In case where the photographing mode is not the "photographing priority mode", even if a photographing instruction is issued from the user in the middle of the storage process of characteristic data in the characteristic data storage unit 42, the storage process of characteristic data in the characteristic data storage unit 42 is continued.

In case where the photographing mode is the "photographing priority mode" (Y in S11), the presence or absence of the photographing instruction from the user is determined by the memory communication control unit 52, specifically, it is determined whether or not a release is operated by the user (S12). The release is operable by the user through the shutter button (photographing instruction operating unit) 11 or the like. The presence or absence of operation of the shutter button 11 is detected by the device control unit 34 (see FIG. 2), and the memory communication control unit 52 can determine whether or not the release is operated by the user based on the detection result.

In case where the release operation is not performed by the user (N in S12), characteristic data of the new lens unit E is stored in the characteristic data storage unit 42 under the control of the storage control unit 40 (storage area determination unit 50) (S15). The data amount (storage data amount D0) of characteristic data stored in the characteristic data storage unit 42 in this step is arbitrary, and may be a data amount determined in advance or a variable data amount according to the situation. For example, the storage data amount D0 of this step may be determined in consideration of the time from the photographing instruction by the user to actual photographing. For example, in case where the photographing instruction is issued by the release operation from the user during the execution of this step, the characteristic data storage amount in this step is set within the time from the photographing instruction to the end of this step, that is, a photographing standby time without causing stress to the user, and the storage data amount D0 of this step can be determined to a data amount not excessively inhibiting photographing of an object image. Furthermore, the storage data amount D0 of this step may be determined according to the progress states of other processes.

In Step S15, if characteristic data is stored in the characteristic data storage unit 42 completely, it is determined by the storage control unit 40 (storage area determination unit 50) whether or not all characteristic data of the new lens unit E is stored in the characteristic data storage unit 42 (S19). In case where all characteristic data of the new lens unit E is stored in the characteristic data storage unit 42 completely (Y in S19), this process flow ends. In case where all characteristic data of the new lens unit E is not stored in the characteristic data storage unit 42 completely (N in S19), the process returns to Step S12 described above, and the presence or absence of the release operation is determined.

In case where the release operation is performed by the user (Y in S12), photographing of an object image is performed according to the release operation, and source image data is acquired (S14). Then, it is determined by the filter acquisition unit 46 (see FIG. 5) whether or not characteristic data corresponding to the photographing conditions of acquired source image data is stored in the characteristic data storage unit 42 (S16). For the photographing conditions used herein, specifically, the conditions of a diaphragm, a focal distance, an object distance, and the like are assumed as the photographing conditions, and it is determined whether or not corresponding characteristic data is stored in the characteristic data storage unit 42 based on each of the conditions.

In case where it is determined that corresponding characteristic data is stored in the characteristic data storage unit 42 (Y in S16), source image data and the restoration filter are sent from the filter acquisition unit 46 to the calculation unit 48, and source image data is subjected to the point image restoration process in the calculation unit 48 (S18). In case where it is determined that corresponding characteristic data is not stored in the characteristic data storage unit 42 (N in S16), the calculation unit 48 is skipped, the point image restoration process is not performed, and source image data is sent from the filter acquisition unit 46 to the post stage of the calculation unit 48 (S17). After recovered image data and source image data are sent to the post stage of the point image restoration processing unit 36, the process returns to Step S12 described above, and the storage process of characteristic data relating to the new lens unit E in the characteristic data storage unit 42 is advanced.

In the example described above, in case where it is determined that corresponding characteristic data is not stored in the characteristic data storage unit 42 (N in S16), the point image restoration process is not performed (S17); however, in this case, the point image restoration process may be performed based on characteristic data already stored in the characteristic data storage unit 42 in the calculation unit 48. That is, in case where it is determined that corresponding characteristic data is not stored in the characteristic data storage unit 42 (N in S16), for example, the filter acquisition unit 46 may select characteristic data relating to a substitutable restoration filter from among characteristic data stored in the characteristic data storage unit 42, may acquire a substitutable restoration filter from selected characteristic data, and may send the restoration filter and source image data to the calculation unit 48 to subject source image data to the point image restoration process.

A method of determining a substitutable restoration filter is not particularly limited, and an arbitrary method can be used. For example, the filter acquisition unit 46 may determine the "substitutable restoration filter" described above from characteristic data of the lens unit 12 having a characteristic closest to the characteristic of the lens unit 12 derived from photographing condition data of source image data out of characteristic data retained in the characteristic data storage unit 42. As such a characteristic, for example, a point spread function (PSF, OTF, or the like) may be given, and the filter acquisition unit 46 may determine a restoration filter corresponding to a point spread function most approximate to a point spread function (PSF, OTF, or the like) derived from photographing condition data of source image data as a "substitutable restoration filter". Furthermore, a "substitutable restoration filter" may be acquired based on characteristic data indicating a characteristic closest to the characteristic of the lens unit 12 derived from photographing condition data of source image data based on the type of lens unit 12 (lens 16) or the photographing conditions. Furthermore, a "substitutable restoration filter" based on characteristic data indicating the closest characteristic described above may be determined in advance. That is, the point image restoration process of source image data using a "substitutable restoration filter" determined in advance or a "restoration filter derived from substitutable characteristic data" may be executed in a case indicated by N in Step S16 described above without depending on photographing condition data of source image data.

As described above, according to this embodiment, characteristic data of the lens unit 12 having a comparatively great effect point image restoration process effect can be preserved on the camera body 14 side (characteristic data storage unit 42) with priority. That is, characteristic data of the lens unit 12 having a comparatively small point image restoration process effect is deleted from the camera body 14 side (characteristic data storage unit 42) with priority, and characteristic data of the lens unit 12 attached to the camera body 14 is written to the memory space where characteristic data of the lens unit 12 having a comparatively small point image restoration process effect is stored. With this, it is possible to reduce an output ratio of deteriorated image data in a scene with deteriorated image quality, that is, in a scene where the point image restoration process is not performed and image quality deterioration is conspicuous, to reduce time or power consumption of the entire system, and to reduce the time or frequency of waiting for photographing on the user side.

Although it is considered that an operation to load characteristic data relating to the new lens unit 12 is carried out at various timings, such as before photographing or before image data recording, the load operation at any timing is required to be carried out without obstructing a photo opportunity of the user. Accordingly, from a viewpoint of preventing interference with the shutter chance, the photographing priority mode (for example, a mode in which, in case where a photographing instruction by a release operation or the like is performed by the user, the process for loading characteristic data is stopped or the point image restoration process is skipped and image data is output) tends to increase in use frequency more than a mode (for example, a mode in which the shutter release is suspended during the storage process of characteristic data and it stands by for photographing) in which processing for loading characteristic data is performed with priority over other processes.

In case where the storage area of characteristic data on the camera body 14 side (characteristic data storage unit 42), that is, a data deletion area is determined according to the "use frequency", output probability of image data with comparatively great image quality deterioration increases. That is, in case where the storage area of characteristic data as the data deletion area is determined according to the "use frequency", since characteristic data retained in the characteristic data storage unit 42 is determined regardless of the point image restoration process effect, characteristic data having a great point image restoration process effect is not necessarily retained in the characteristic data storage unit 42. Accordingly, in case where the photographing instruction from the user is performed in the photographing priority mode, it is assumed that characteristic data having a great point image restoration process effect is not always retained in the characteristic data storage unit 42, and there are many situations in which image data with great image quality deterioration has to be output.

However, according to this embodiment, characteristic data of the lens unit 12 which is previously stored on the camera body 14 side (characteristic data storage unit 42) and is capable of expecting a high point image restoration process effect is highly likely to be preserved on the camera body 14 side (characteristic data storage unit 42). For this reason, even in the photographing priority mode, it is possible to reduce the frequency of output of an image (source image data) with a great degree of image quality deterioration without performing the point image restoration process. Even in a mode in which the process for loading characteristic data is given priority, it is possible to reduce the frequency of "making the user stand by while characteristic data for the lens unit 12 capable of expecting a comparatively high point image restoration process effect is loaded on the camera body 14 side (characteristic data storage unit 42)".

For characteristic data of the lens unit 12 having a comparatively small point image restoration process effect, in case where comparing with characteristic data of the lens unit 12 having a comparatively great point image restoration process effect, the frequency of the operation to load data on the camera body 14 side (characteristic data storage unit 42) is likely to increase. However, even if loading of characteristic data of the lens unit 12 having a comparatively small point image restoration process effect is stopped, corresponding characteristic data is not retained in the characteristic data storage unit 42, and an image (source image data) not subjected to the point image restoration process is output, image quality deterioration is minimal. In this way, characteristic data of the lens unit 12 having a great point image restoration process effect is preserved on the camera body 14 side (characteristic data storage unit 42) with priority, whereby it is possible to achieve system optimization.

Second Embodiment

In this embodiment, the same components as those in the first embodiment described above are represented by the same reference numerals, and detailed description thereof will be omitted.

Although in the first embodiment, an example where the storage area of characteristic data of the lens unit 12 is determined by the restoration evaluation value for each "lens unit 12" has been described, in this embodiment, the storage area of characteristic data is determined by a restoration evaluation value determined based on "the type of lens unit 12 and the photographing conditions". Accordingly, in this embodiment, characteristic data of photographing condition having a great point image restoration process effect is preserved in the characteristic data storage unit 42 (see FIG. 5) with priority.

Figure 15:
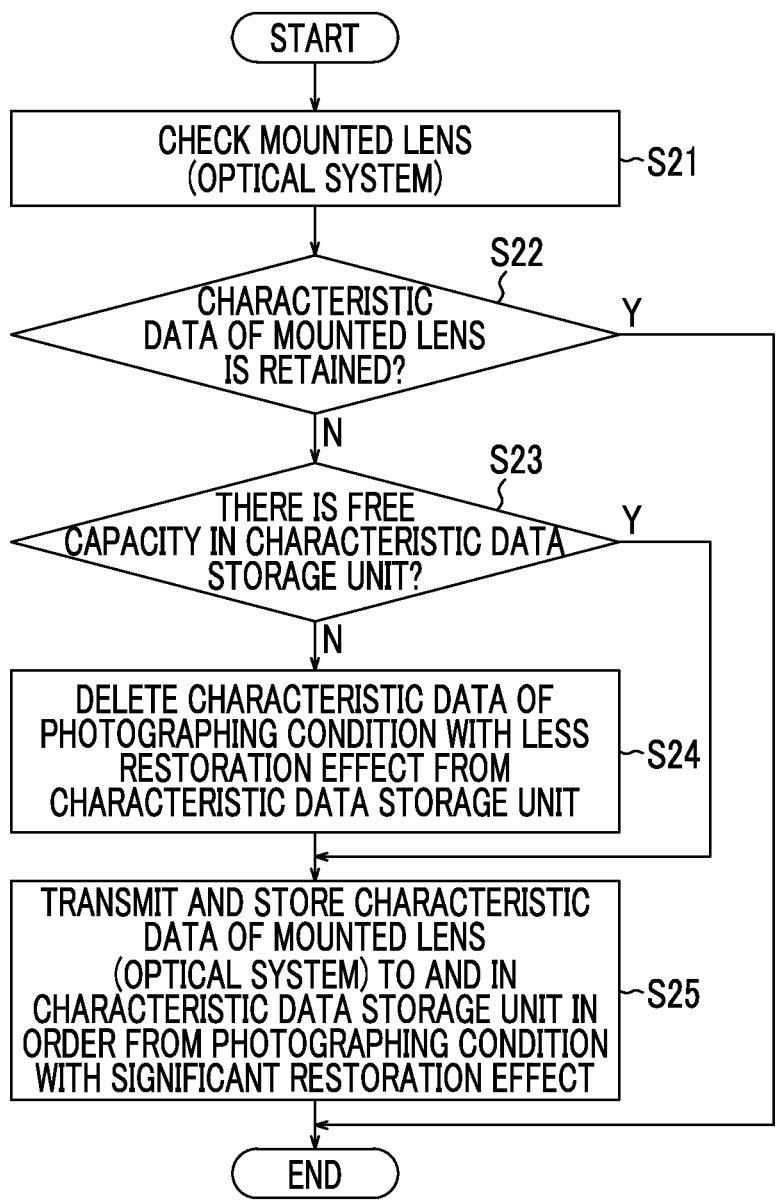
FIG. 15 shows an example of a storage necessity determination flow of characteristic data of a new lens unit to a characteristic data storage unit in a second embodiment.

FIG. 15 shows an example of a storage necessity determination flow of characteristic data of the new lens unit 12 to the characteristic data storage unit 42 in the second embodiment.

Even in this example, as in the first embodiment (S1 to S3 of FIG. 13) described above, the type of lens unit 12 mounted in the camera body 14 is acquired by the storage control unit 40 (S21 of FIG. 15), and it is determined by the storage control unit 40 whether or not characteristic data corresponding to the mounted lens unit 12 is stored and retained in the characteristic data storage unit 42 (S22). In case where it is determined that characteristic data corresponding to the mounted lens unit 12 is not stored and retained in the characteristic data storage unit 42 (N in S2), it is determined by the storage control unit 40 whether or not the characteristic data storage unit 42 has free capacity (remaining storable capacity) enough to store characteristic data of a new lens unit (S23).

In case where the free capacity of the characteristic data storage unit 42 is not enough (N in S23), in this embodiment, characteristic data of the photographing condition having a relatively small point image restoration process effect is deleted from the characteristic data storage unit 42 based on the restoration evaluation value determined by the type of lens unit 12 and the photographing conditions under the control of the storage control unit 40 (storage area determination unit 50) (S24).

As in the first embodiment described above, the "restoration evaluation value" in this embodiment represents the degree of the point image restoration process effect in the point image restoration processing unit 36 (see FIGS. 2 and 5), and from an arbitrary viewpoint, a restoration evaluation value can be determined for each type of optical system.

Figure 16:
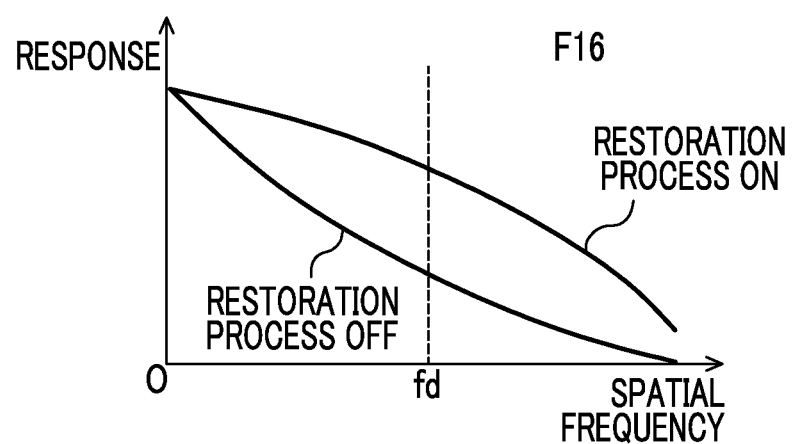
FIG. 16 shows an example of a "spatial frequency-response" relationship in case where an F value is "F16".
Figure 17:
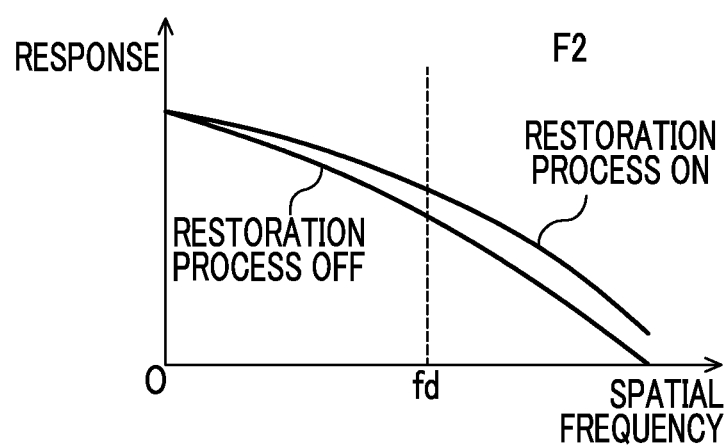
FIG. 17 shows an example of a "spatial frequency-response" relationship in case where an F value is "F2".

FIGS. 16 and 17 are diagrams showing an example of determining a restoration evaluation value, FIG. 16 shows an example of a "spatial frequency-response" relationship in case where the F value is "F16", and FIG. 17 shows an example of a "spatial frequency-response" relationship in case where the F value is "F2". The notation in FIGS. 16 and 17 has the same meaning as the notation in FIG. 9.

In this example, the "restoration evaluation value" is determined for each F value based on image data before and after the point image restoration process at a predetermined frequency $f_d$, and the "restoration evaluation value" for each F value can be determined based on a response ratio or difference at a certain frequency $f_d$. For example, in the examples shown in FIGS. 16 and 17, the difference or ratio of image data before and after the point image restoration process is greater in F16 (FIG. 16) than in F2 (FIG. 17). Accordingly, a restoration evaluation value indicating that the "point image restoration process effect is greater than in F16 than in F2" is allocated to each photographing condition (F value).

In this example, although the restoration evaluation value is determined based on "the type of lens unit 12 and the F value", the restoration evaluation value may be determined based on one or a plurality of conditions out of photographing condition data (for example, a diaphragm amount, a focal distance, a zoom amount, an image height, a recording pixel number, a pixel pitch, and the like) other than the F value. Furthermore, the "restoration evaluation value" may be determined based on the degree of suppression of noise (for example, the degree of suppression of chromatic aberration or the like) in image data before and after the point image restoration process, or an overall value obtained by weight-adding a plurality of indexes (basic data) may be used as the "restoration evaluation value".

After Step S24 of FIG. 15, characteristic data of the new lens unit 12 is written to the storage area of the characteristic data storage unit 42 where "characteristic data of the photographing condition having a relatively small point image restoration process effect" is stored under the control of the storage control unit 40 (storage area determination unit 50) (S25).

In case where storing characteristic data in the characteristic data storage unit 42, the storage control unit 40 of this example stores characteristic data in the characteristic data storage unit 42 in an order of the photographing conditions corresponding to greater degrees of image restoration by the point image restoration process based on the restoration evaluation value. That is, characteristic data relating to the new lens unit 12 is written to the characteristic data storage unit 42 in order from characteristic data of the photographing condition having a relatively great point image restoration process effect based on the restoration evaluation value. Accordingly, in the examples shown in FIGS. 16 and 17, characteristic data of F16 is written to the characteristic data storage unit 42 earlier than characteristic data of F2.

In this way, characteristic data is sent from the lens unit 12 (lens unit memory 24) to the camera body 14 (camera body controller 28) in order from characteristic data of the photographing condition having a great point image restoration process effect. With this, for example, even if writing (communication) of characteristic data relating to the new lens unit 12 to the characteristic data storage unit 42 is stopped in the middle, the probability that characteristic data of the photographing condition having a relatively great point image restoration process effect is written to the characteristic data storage unit 42 before stopping increases. As a result, it is possible to increase the probability that source image data photographed and acquired by "the photographing condition on which relatively great image quality improvement is estimated by the point image restoration process" can be subjected to the point image restoration process.

In this way, in this example, characteristic data which is stored in the characteristic data storage unit 42 is determined according to the type of lens unit 12 (optical system) and the photographing conditions. The restoration evaluation value is also determined according to the type of lens unit 12 (optical system) and the photographing conditions. For storing characteristic data in the characteristic data storage unit 42, in case where characteristic data already stored in the characteristic data storage unit 42 needs to be deleted from the characteristic data storage unit 42, the storage control unit 40 deletes characteristic data from the characteristic data storage unit 42 according to the type of optical system and the photographing conditions based on the restoration evaluation value. For storing characteristic data in the characteristic data storage unit 42, in case where new characteristic data needs to be stored in the storage area of the characteristic data already stored in the characteristic data storage unit 42, the storage control unit 40 determines the storage area of new characteristic data from among the storage areas of characteristic data already stored in the characteristic data storage unit 42 according to the type of optical system and the photographing conditions determined for characteristic data based on the restoration evaluation value.

Figure 18A:
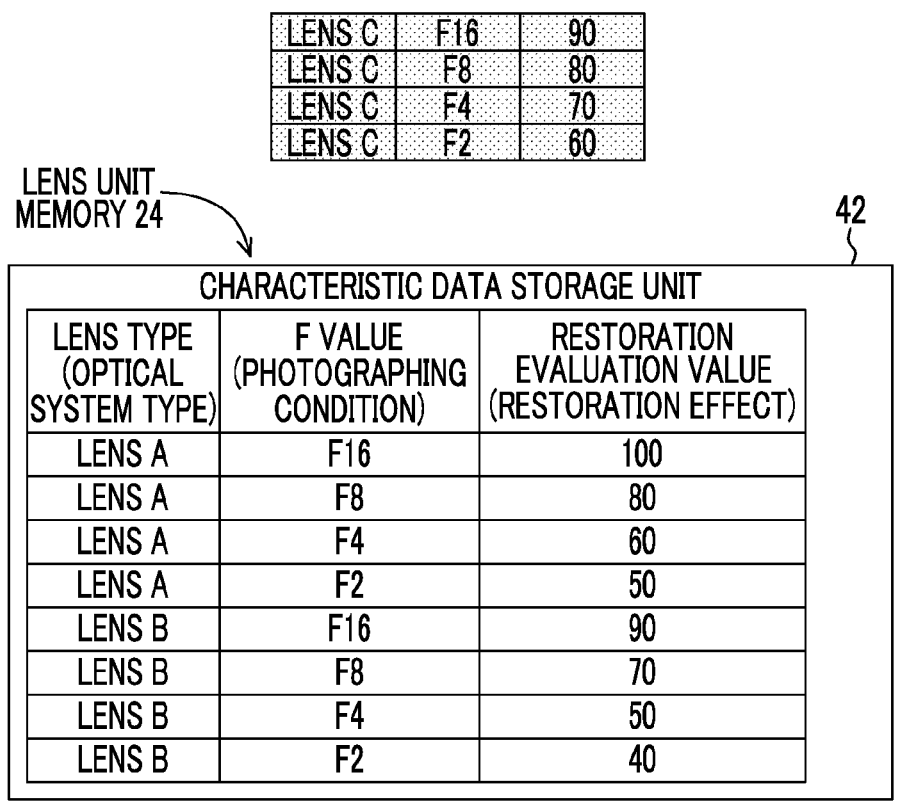

FIGS. 18A to 18C are diagrams showing an example of storage data of the characteristic data storage unit 42, FIG. 18A shows a state before a storage area for characteristic data of a new lens unit is secured, FIG. 18B shows characteristic data to be deleted in order to secure a storage area for characteristic data of a new lens unit, and FIG. 18C shows a state after a storage area for characteristic data of a new lens unit is secured.

In the example shown in FIGS. 18A to 18C, characteristic data of the lens unit A (see "lens A" of FIGS. 18A to 18C) and the lens unit B ("lens B" of FIGS. 18A to 18C) is stored in the characteristic data storage unit 42, and the restoration evaluation value is allocated to each F value (F16, F8, F4, F2). In this situation, a case where the lens unit C (see "lens C" of FIGS. 18A to 18C) is newly mounted in the camera body 14, and characteristic data of the lens unit C needs to be stored in the characteristic data storage unit 42 is assumed. In this case, "the storage area of characteristic data of the lens unit C" in the characteristic data storage unit 42 is determined based on the restoration evaluation value. Specifically, "characteristic data having a relatively small restoration evaluation value (a relatively small point image restoration process effect)" corresponding to the data amount of characteristic data of the lens unit C is deleted from the characteristic data storage unit 42, and characteristic data of the lens unit C is written to the storage area where characteristic data is deleted. In the example of FIGS. 18A to 18C, characteristic data of "lens unit A, F4", "lens unit A, F2", "lens unit B, F4", and "lens unit B, F2" is characteristic data to be deleted (see FIG. 18B).

A method of determining the storage area for characteristic data of the new lens unit C is not particularly limited. For example, as shown in FIG. 18B, characteristic data may be sorted based on the restoration evaluation value, and the storage area corresponding to characteristic data of the new lens unit C after sorting may be determined. In this case, characteristic data which is stored in the characteristic data storage unit 42 is sorted based on the magnitude of the point image restoration process effect of each photographing condition regardless of the type of lens unit 12 (optical system), whereby it is possible to simply determine the storage area of characteristic data of the lens unit C.

Characteristic data of the new lens unit C is written to the storage area of characteristic data storage unit 42 determined in this way, whereby characteristic data of the new lens unit C can be stored in the characteristic data storage unit 42 while preserving characteristic data of "the lens unit and the photographing condition (F value)" having a high point image restoration process effect in the characteristic data storage unit 42 (see FIG. 18C). In this way, characteristic data of "the lens unit and the photographing condition" having a great point image restoration process effect is preserved in the characteristic data storage unit 42 with priority. For loading characteristic data of the new lens unit 12 into the characteristic data storage unit 42, characteristic data is loaded in order from characteristic data of the photographing condition having a great point image restoration process effect based on the restoration evaluation value. Accordingly, in the example shown in FIGS. 18A to 18C, characteristic data of the lens unit C is written to the characteristic data storage unit 42 in an order of "characteristic data of F16", "characteristic data of F8", "characteristic data of F4", and "characteristic data of F2".

As described above, in the example shown in FIGS. 18A to 18C, for determining the storage area for characteristic data of the new lens unit 12, "the type of lens unit" and "photographing condition data (F value)" are handled equivalently. A method of determining the storage area of characteristic data of the new lens unit 12 is not limited to the example of FIGS. 18A to 18C, the storage area of characteristic data of the new lens unit 12 may be determined by assigning the relative merits between "the type of lens unit" and "photographing condition data (F value)".

FIGS. 19A to 19C are diagrams showing another example of storage data of the characteristic data storage unit 42, FIG. 19A shows a state before a storage area for characteristic data of a new lens unit is secured, FIG. 19B shows characteristic data to be deleted in order to secure a storage area for characteristic data of a new lens unit, and FIG. 19C shows a state after a storage area for characteristic data of a new lens unit is secured.

In the example shown in FIGS. 19A to 19C, for storing characteristic data in the characteristic data storage unit 42, in case where characteristic data already stored in the characteristic data storage unit 42 needs to be deleted from the characteristic data storage unit 42, the storage control unit 40 deletes characteristic data from the characteristic data storage unit according to the type of optical system based on a representative value calculated from the restoration evaluation value of each type of lens unit 12 (optical system). For storing characteristic data in the characteristic data storage unit 42, in case where new characteristic data needs to be stored in the storage area of characteristic data already stored in the characteristic data storage unit 42, the storage control unit 40 determines the storage area of new characteristic data from among the storage areas of characteristic data already stored in the characteristic data storage unit 42 according to the type of lens unit 12 (optical system) determined for characteristic data based on a representative value calculated from the restoration evaluation value of each type of lens unit 12 (optical system).

Specifically, sorting of characteristic data stored in the characteristic data storage unit 42 by "lens unit 12" is performed, and thereafter, sorting of characteristic data stored in the characteristic data storage unit 42 by "photographing condition (F value)" is performed. Sorting by "lens unit 12" is performed with a representative value of the restoration evaluation value determined by one or a plurality of photographing conditions relating to each lens unit 12 as a key. The "representative value" is an evaluation value of the point image restoration process effect of each type of lens unit 12 (optical system), and for example, an average value, a maximum value, a minimum value, or the like of the restoration evaluation value of each type of lens unit 12 (optical system) can be used as the "representative value". Sorting of characteristic data or calculation of the representative value is appropriately performed in the storage control unit 40 (storage area determination unit 50).

As described above, the representative value of the restoration evaluation value of each type of lens unit 12 is determined with regard to characteristic data stored in the characteristic data storage unit 42 for determining the storage area of characteristic data of the new lens unit C. In the example shown in FIG. 19B, the average value and the maximum value of the restoration evaluation values of the lens unit A and the lens unit B are determined, characteristic data is sorted by lens unit 12, and in regard to each of the lens unit A and the lens unit B, sorting of characteristic data by photographing condition (F value) is performed. Then, "characteristic data having a relatively small restoration evaluation value, that is, a relatively small point image restoration process effect" (in the example shown in FIGS. 19A to 19C, characteristic data of "lens unit B, F8", "lens unit B, F4", and "lens unit B, F2") corresponding to the data amount of characteristic data of the new lens unit C is determined. Determined characteristic data is deleted from the characteristic data storage unit 42, and characteristic data of the lens unit C is written to the storage area where characteristic data is deleted.

As described above, according to this embodiment, since characteristic data of the photographing condition having a great point image restoration process effect is preserved in the characteristic data storage unit 42 (camera body 14) with priority, it is possible to reduce problems, such as an output ratio of a scene with deteriorated image quality, time or power consumption, and user's waiting for photographing.

Third Embodiment

In this embodiment, the same components as those in the embodiments described above are represented by the same reference numerals, and detailed description thereof will be omitted.

Even in this embodiment, as in the first embodiment and the second embodiment described above, in case where characteristic data of the lens unit 12 newly mounted in the camera body 14 is not retained in the camera body 14 (characteristic data storage unit 42), characteristic data of the new lens unit 12 needs to be loaded into the characteristic data storage unit 42. If there is a margin for the free memory capacity of the camera body 14 (characteristic data storage unit 42), characteristic data of the new lens unit 12 can be written to the free storage area; however, in case where there is no margin for the free memory capacity (the free memory capacity corresponding to the data amount of characteristic data of the new lens unit 12 cannot be secured), characteristic data of the new lens unit 12 needs to be written to the storage area of characteristic data already retained in the characteristic data storage unit 42. In this case, in this embodiment, characteristic data with great independence out of characteristic data retained in the characteristic data storage unit 42 is preserved in the characteristic data storage unit 42 with priority, and characteristic data with small independence is deleted from the characteristic data storage unit 42 with priority. Characteristic data of the lens unit 12 mounted in the camera body 14 is used for the point image restoration process of the latest photographic image (source image data), and is thus stored in the camera body 14 (characteristic data storage unit 42) regardless of the magnitude of independence.

That is, although in the first embodiment and the second embodiment, an example where the storage area of characteristic data of the lens unit 12 is determined based on the "point image restoration process effect (restoration evaluation value)" has been described, in this embodiment, the storage area of characteristic data of the lens unit 12 is determined based on "independence (independence evaluation value)" between characteristic data stored and retained in the characteristic data storage unit 42. Specifically, in case where storing characteristic data in the characteristic data storage unit 42, the storage control unit 40 (see FIG. 5) controls characteristic data stored in the characteristic data storage unit 42 based on the independence evaluation value which is allocated to characteristic data according to the type of lens unit 12 (optical system) and represents the degree of approximation between characteristic data stored in the characteristic data storage unit 42.

Figure 20:
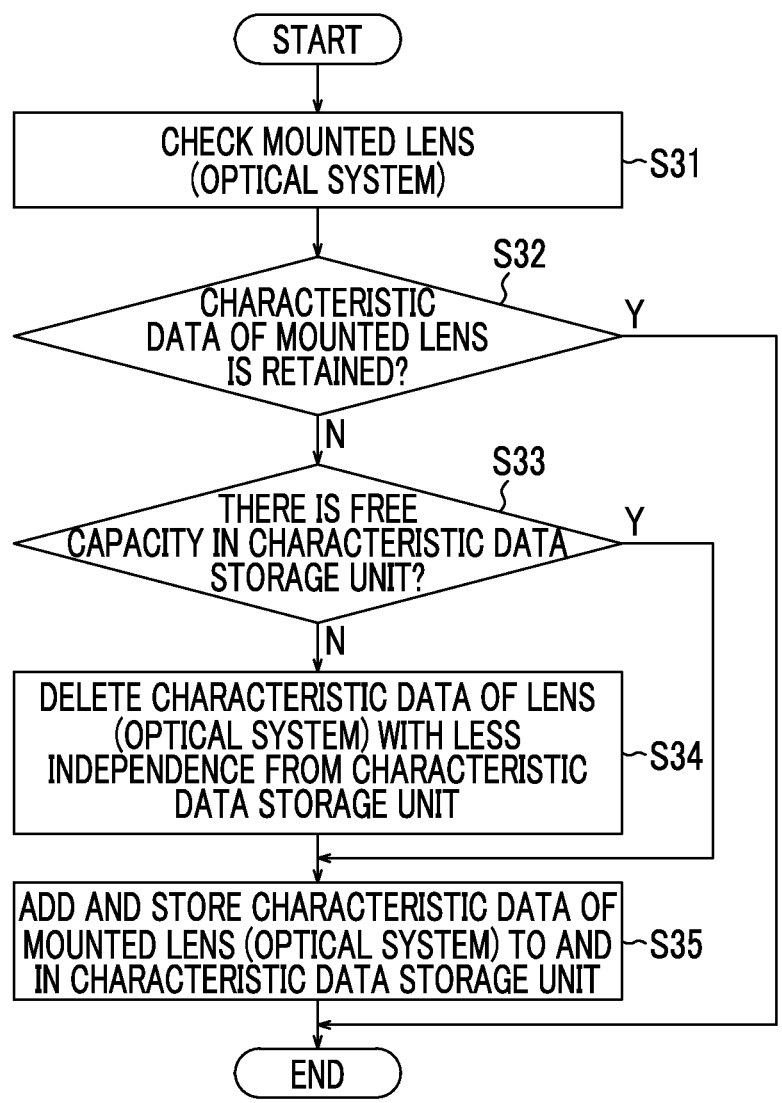
FIG. 20 shows an example of a storage necessity determination flow of characteristic data of a new lens unit to a characteristic data storage unit in a third embodiment.

FIG. 20 shows an example of a storage necessity determination flow of characteristic data of the new lens unit 12 to the characteristic data storage unit 42 in the third embodiment.

Even in this example, as in the first embodiment (S1 to S3 of FIG. 13) described above, the type of lens unit 12 mounted in the camera body 14 is acquired by the storage control unit 40 (S31 of FIG. 20), and it is determined by the storage control unit 40 whether or not characteristic data corresponding to the mounted lens unit 12 is stored and retained in the characteristic data storage unit 42 (S32). In case where it is determined that characteristic data corresponding to the mounted lens unit 12 is not stored and retained in the characteristic data storage unit 42 (N in S32), it is determined by the storage control unit 40 whether or not the characteristic data storage unit 42 has remaining storable capacity which is free capacity enough to store characteristic data of a new lens unit (S33).

In case where the free capacity of the characteristic data storage unit 42 is not enough (N in S33), in this embodiment, characteristic data of the lens unit 12 (optical system) having relatively small independence is deleted from the characteristic data storage unit 42 based on the independence evaluation value determined according to the type of lens unit 12 under the control of the storage control unit 40 (storage area determination unit 50) (S34).

The "independence evaluation value" in this embodiment represents independence between characteristic data retained in the characteristic data storage unit 42.

Figure 21:
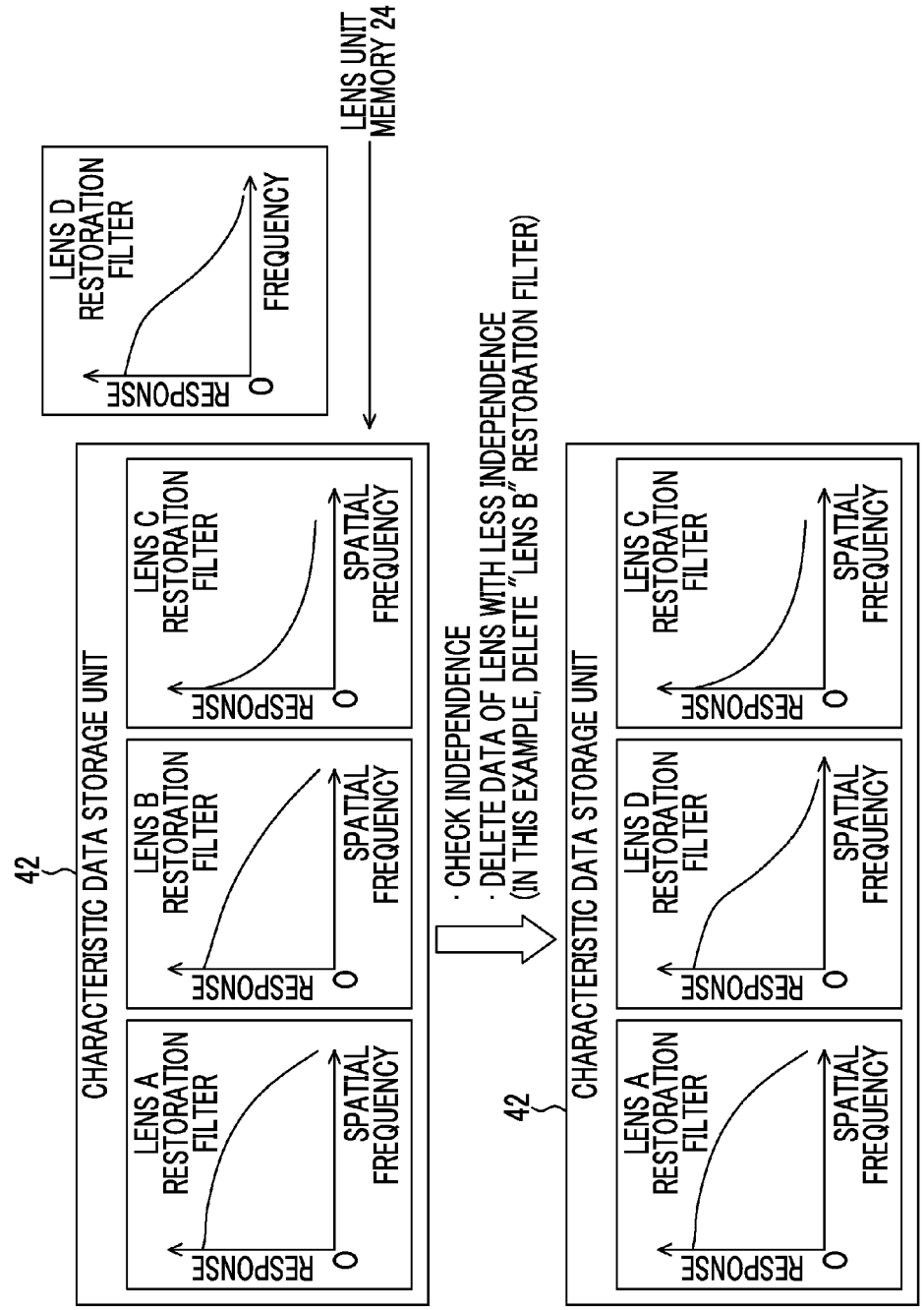
FIG. 21 is a diagram showing an example of a method of determining an independence evaluation value, and shows an image of characteristic data retained in a characteristic data storage unit.

FIG. 21 is a diagram showing a method of determining an independence evaluation value, and shows an image of characteristic data retained in the characteristic data storage unit 42. In the example shown in FIG. 21, a case where, in a state where characteristic data of the lens unit A (see "lens A" of FIG. 21), the lens unit B (see "lens B" of FIG. 21), and the lens unit C (see "lens C" of FIG. 21) is stored in the characteristic data storage unit 42, a new lens unit D (see "lens D" of FIG. 21) is mounted in the camera body 14, and characteristic data of the lens unit D needs to be stored in the characteristic data storage unit 42 is assumed. The notation in FIG. 21 has the same meaning as the notation in FIG. 9 or the like.

In this case, independence among the lens unit A, the lens unit B, and the lens unit C stored in the characteristic data storage unit 42 is checked by the storage control unit 40 based on the independence evaluation value allocated to each lens unit 12. Specifically, the independence evaluation value of each lens unit 12 can be determined based on the difference (response difference) between characteristic data stored in the characteristic data storage unit 42.

For example, in case where a representative response (image data) of the lens unit A is represented by "Ra", a representative response of the lens unit B is represented by "Rb", and a representative response (image data) of the lens unit C is "Rc", an independence evaluation value Da of the lens unit A can be determined by "Da=(Rb−Ra)$^2$+(Rc−Ra)$^2$". Similarly, an independence evaluation value Db of the lens unit B and an independence evaluation value Dc of the lens unit C can be determined by "Db=(Ra−Rb)$^2$+(Rc−Rb)$^2$" and "Dc=(Rc−Ra)$^2$+(Rc−Rb)$^2$". The independence evaluation values Da, Db, and Dc determined in this way indicate that, in case where the value is great, a deviation from other characteristic data retained in the characteristic data storage unit 42 is great. Accordingly, independence of characteristic data of the lens unit 12 is smaller in an ascending order of the independence evaluation values Da, Db, and Dc. For example, in case where "Db<Da" and "Db<Dc" are established, since independence of characteristic data of the lens unit B is the smallest, characteristic data of the lens unit B is deleted from the characteristic data storage unit 42 in order to store characteristic data of the lens unit D.

The independence evaluation value may be determined by a method other than the method described above, and the independence evaluation value can be determined from an arbitrary viewpoint capable of representing independence (degree of non-approximation) between characteristic data stored in the characteristic data storage unit 42. For example, basic data of the independence evaluation value is not particularly limited. Accordingly, the "independence evaluation value" is determined based on image data before and after the point image restoration process at a predetermined frequency $f_d$, and the "independence evaluation value" can be determined based on a response ratio or difference at a certain frequency $f_d$. Furthermore, the "independence evaluation value" may be determined based on image data before and after the point image restoration process in a frequency band having a predetermined width. Specifically, in regards to image data before the point image restoration process and image data after the point image restoration process, the "independence evaluation value" can be determined based on a cumulative value of a response difference in the entire frequency band having a certain bandwidth. Furthermore, the "independence evaluation value" may be determined based on the degree of suppression of noise (for example, the degree of suppression of chromatic aberration or the like) in image data before and after the point image restoration process, or an overall value obtained by weight-adding a plurality of indexes (basic data) may be used as the "independence evaluation value".

After Step S34 of FIG. 20, characteristic data of the new lens unit 12 is written to the storage area of the characteristic data storage unit 42 where "characteristic data of the lens unit 12 having relatively small independence" is stored under the control of the storage control unit 40 (storage area determination unit 50) (S35).

In this way, in this example, characteristic data stored in the characteristic data storage unit 42 is determined according to independence between characteristic data stored in the characteristic data storage unit 42. For storing characteristic data in the characteristic data storage unit 42, in case where characteristic data already stored in the characteristic data storage unit 42 needs to be deleted from the characteristic data storage unit 42, the storage control unit 40 deletes characteristic data from the characteristic data storage unit 42 in a descending order of the degree of approximation to other characteristic data stored in the characteristic data storage unit 42 based on the independence evaluation value. Furthermore, for storing characteristic data in the characteristic data storage unit 42, in case where new characteristic data needs to be stored in the storage area of characteristic data already stored in the characteristic data storage unit 42, the storage control unit 40 determines the storage area of new characteristic data among the storage areas of characteristic data already stored in the characteristic data storage unit 42 in an order of the storage areas of characteristic data corresponding to higher degrees of approximation to other characteristic data stored in the characteristic data storage unit 42 based on the independence evaluation value.

In this example, in case where it is determined that corresponding characteristic data is not stored in the characteristic data storage unit 42 at the time of the point image restoration process of source image data, the point image restoration process is performed based on characteristic data stored in the characteristic data storage unit 42. That is, in case where it is determined that characteristic data corresponding to source image data to be processed is not stored in the characteristic data storage unit 42, the filter acquisition unit 46 (see FIG. 5) determines a substitutable restoration filter based on characteristic data retained in the characteristic data storage unit 42 and sends the determined restoration filter and source image data to the calculation unit 48. With this, the point image restoration process of source image data is performed in the calculation unit 48.

A method of determining a substitutable restoration filter is not particularly limited, and an arbitrary method can be used. For example, the filter acquisition unit 46 may determine the "substitutable restoration filter" described above from characteristic data of the lens unit 12 having a characteristic closest to the characteristic of the lens unit 12 derived from photographing condition data of source image data out of characteristic data in the characteristic data storage unit 42. As such a characteristic, for example, a point spread function (PSF, OTF, or the like) is given, and the filter acquisition unit 46 may determine a restoration filter corresponding to a point spread function most approximate to a point spread function (PSF, OTF, or the like) derived from photographing condition data of source image data as a "substitutable restoration filter". Furthermore, a "substitutable restoration filter" may be acquired based on characteristic data indicating a characteristic closest to the characteristic of the lens unit 12 derived from photographing condition data of source image data based on the type of lens unit 12 (lens 16) or the photographing conditions. Furthermore, a "substitutable restoration filter" based on characteristic data indicating the closest characteristic may be determined in advance. That is, the point image restoration process of source image data using a "substitutable restoration filter" determined in advance or a "restoration filter derived from substitutable characteristic data" may be executed without depending on photographing condition data of source image data.

As described above, according to this embodiment, data relating to the point image restoration process, that is, characteristic data of the lens unit 12 having great independence is preserved in the camera body 14 (characteristic data storage unit 42) with priority, and characteristic data of the lens unit 12 having small independence is deleted from the camera body 14 (characteristic data storage unit 42) with priority, whereby it is possible to reduce an output ratio of a scene with deteriorated image quality. Although in the embodiments described above, the independence evaluation value allocated to each lens unit 12 has been described, as in the second embodiment described above, the independence evaluation value may be allocated according to the lens unit 12 and the photographing conditions, and characteristic data may be deleted from or added (stored) in the characteristic data storage unit 42.

Fourth Embodiment

In this embodiment, the same components as those in the embodiments described above are represented by the same reference numerals, and detailed description thereof will be omitted.

In this embodiment, in a situation in which characteristic data of the lens unit 12 (optical system) can be acquired from a plurality of data sources, a data source with a shorter estimated time until completion of acquisition of characteristic data is selected, and characteristic data is acquired from the selected data source.

For example, in the example shown in FIG. 1, a case where characteristic data of the lens unit 12 is acquired from the lens unit 12 (lens unit memory 24) and a case where characteristic data of the lens unit 12 is acquired from the server 80 (server controller 84) can be assumed. That is, the storage control unit 40 can acquire characteristic data of the lens unit 12 from a plurality of data sources (lens unit memory 24 (first data source) and server controller 84 (second data source)) retaining characteristic data of the lens unit 12 (optical system) and can store characteristic data of the lens unit 12 in the characteristic data storage unit 42.

If communication (wireless communication through the wireless communication unit 29 and the access point 75) between the camera body controller 28 (storage control unit 40) and the server 80 (server controller 84) can be performed, characteristic data is acquired from a data source with a short estimated time required for acquiring characteristic data from both data sources. That is, the storage control unit 40 calculates the estimated time required for acquiring characteristic data of the lens unit 12 from the lens unit memory 24 and storing characteristic data of the lens unit 12 in the characteristic data storage unit 42 and the estimated time required for acquiring characteristic data of the lens unit 12 from the server controller 84 and storing characteristic data of the lens unit 12 in the characteristic data storage unit 42. The storage control unit 40 acquires characteristic data of the lens unit 12 from one of the lens unit memory 24 and the characteristic data storage unit 42 with a shorter estimated time and stores characteristic data of the lens unit 12 in the characteristic data storage unit 42.

Accordingly, in case where wireless communication between the camera body controller 28 (storage control unit 40) and the server 80 (server controller 84) can be performed, in a case where the estimated time required for acquiring characteristic data from the server controller 84 is shorter than the estimated time required for acquiring characteristic data from the lens unit memory 24, the storage control unit 40 acquires characteristic data of the new lens unit 12 from the server controller 84.

Figure 22:
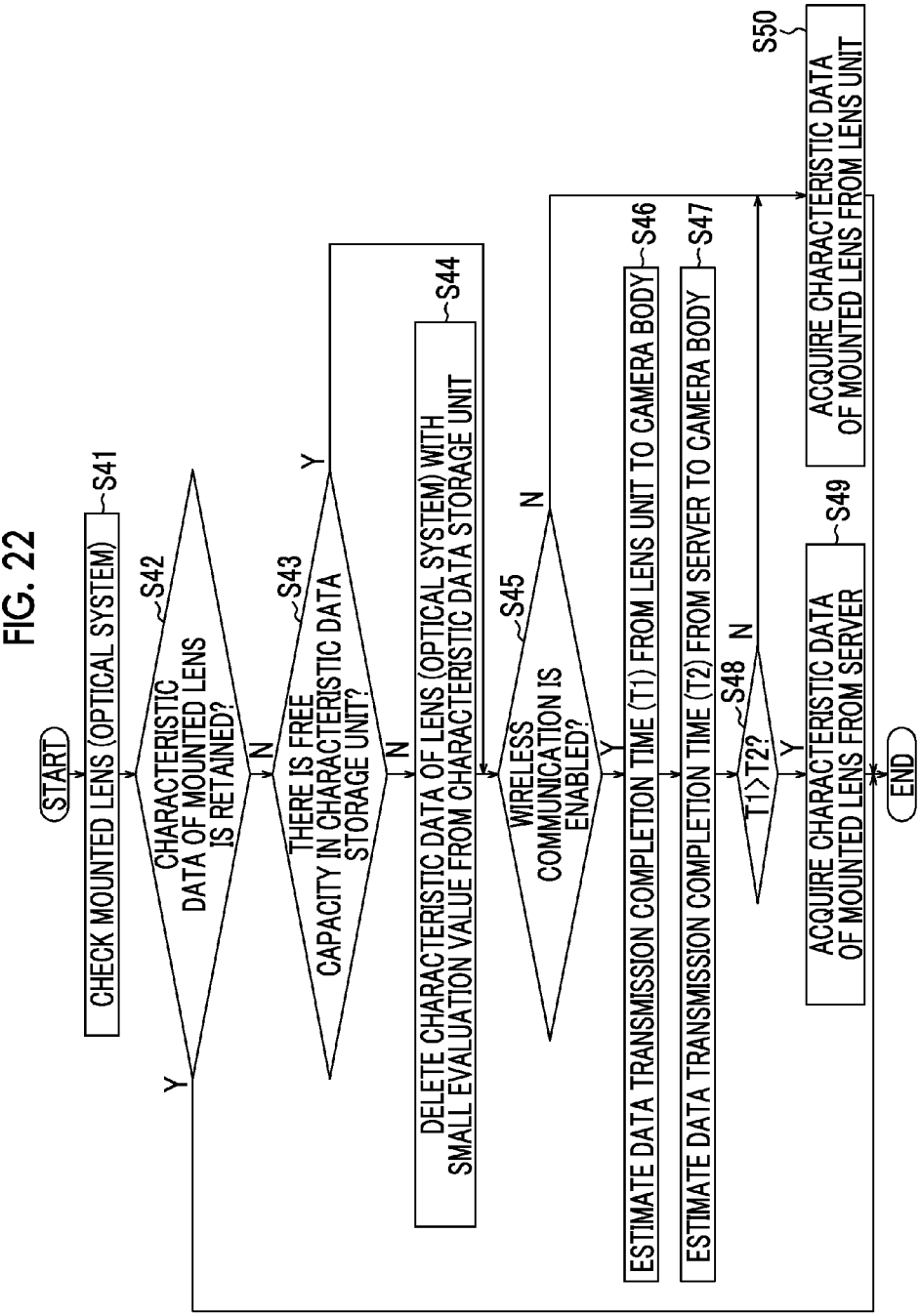
FIG. 22 shows an example of a storage necessity determination flow of characteristic data of a new lens unit to a characteristic data storage unit in a fourth embodiment.

FIG. 22 shows an example of a storage necessity determination flow of characteristic data of the new lens unit 12 to the characteristic data storage unit 42 in the fourth embodiment.

Even in this example, as in the first embodiment (S1 to S3 of FIG. 13) described above, the type of lens unit 12 mounted in the camera body 14 is acquired by the storage control unit 40 (S41 of FIG. 22), and it is determined by the storage control unit 40 whether or not characteristic data corresponding to the mounted lens unit 12 is stored and retained in the characteristic data storage unit 42 (S42). When it is determined that characteristic data corresponding to the mounted lens unit 12 is not stored and retained in the characteristic data storage unit 42 (N in S42), it is determined by the storage control unit 40 whether or not the characteristic data storage unit 42 has remaining storable capacity which is free capacity enough to store characteristic data of the new lens unit 12 (S43).

In case where the free capacity of the characteristic data storage unit 42 is not enough (N in S43), in order to secure the storage area of characteristic data of the new lens unit 12, characteristic data of a predetermined data amount, that is, at least the data amount of characteristic data of the new lens unit 12 is deleted from the characteristic data storage unit 42 under the control of the storage control unit 40 (storage area determination unit 50) (S44). A method of deleting characteristic data in Step S44 is not particularly limited, and for example, in the same manner as in the first embodiment (see Step S4 of FIG. 13), the second embodiment (see Step S24 of FIG. 15), or the third embodiment (see Step S34 of FIG. 20), characteristic data of a predetermined data amount can be deleted from the characteristic data storage unit 42.

In case where it is determined that the characteristic data storage unit 42 has enough free capacity (Y in S43), or in case where characteristic data of a predetermined amount is deleted from the characteristic data storage unit 42 (S44), it is detected by the storage control unit 40 (memory communication control unit 52) whether or not wireless communication with the server 80 (server controller 84) can be performed (S45).

In case where it is determined that wireless communication between the storage control unit 40 and the server 80 can be performed (Y in S45), the time (data transmission completion time T1) required for transmitting characteristic data from the lens unit 12 (lens unit memory 24) to the camera body 14 (storage control unit 40) is estimated by the storage control unit 40 (memory communication control unit 52) (S46). Also, the time (data transmission completion time T2) required for transmitting characteristic data from the server 80 (server controller 84) to the camera body 14 (storage control unit 40) is estimated by the storage control unit 40 (memory communication control unit 52) (S47).

The storage control unit 40 (memory communication control unit 52) determines the magnitude relationships of both estimated times T1 and T2. For example, in case where it is determined that the data transmission completion time T1 from the lens unit 12 (lens unit memory 24) is longer than the data transmission completion time T2 from the server 80 (server controller 84) (T1>T2; Y in S48), the storage control unit 40 acquires characteristic data of the new lens unit 12 from the server 80 (server controller 84) and stores characteristic data of the new lens unit 12 in the characteristic data storage unit 42 (S49).

In case where it is determined that wireless communication between the storage control unit 40 and the server 80 cannot be performed (N in S45), or in case where it is determined that the data transmission completion time T1 from the lens unit 12 (lens unit memory 24) is equal to or less than the data transmission completion time T2 from the server 80 (server controller 84) (T1≤T2; N in S48), the storage control unit 40 acquires characteristic data of the new lens unit 12 from the lens unit memory 24 and stores characteristic data of the new lens unit 12 in the characteristic data storage unit 42 (S50).

As described above, according to this embodiment, desired characteristic data can be acquired from a data source with a short acquisition completion time of characteristic data of the lens unit 12, and consumption of time or power required for acquiring characteristic data of the new lens unit 12 can be reduced, thereby improving user's convenience. Although in the example described above, a case where a data source of characteristic data of the lens unit 12 is the lens unit 12 (lens unit memory 24) and the server 80 (server controller 84) which can perform communication with the camera body 14 (camera body controller 28) has been described, the invention is not limited thereto. For example, "a plurality of data sources" described above may be constituted of an arbitrary data source (lens unit memory 24, computer controller 64, or the like) which is connected to the camera body 14 (camera body controller 28) in a wired manner and/or an arbitrary data source (server controller 84 or the like) is connected to the camera body 14 (camera body controller 28) in a wireless manner.

Other Modification Examples

A photographing processing system of the digital camera 10 described above is only for illustration, and the invention can be applied to other configurations.

For example, a process for loading characteristic data of the new lens unit 12 may be controlled according to the battery residual capacity. The storage control unit 40 can control the data amount of the restoration filter or characteristic data stored in the characteristic data storage unit 42 based on the power storage state of the battery 27 detected by the battery detection unit 37 (see FIG. 2) and can change the amount of data to be loaded according to the battery residual capacity. Accordingly, for example, in case where the residual capacity of storage power of the battery 27 is not enough (the residual capacity of storage power is equal to or less than a predetermined threshold value), a process for loading and storing characteristic data relating to the new lens unit 12 in the characteristic data storage unit 42 may be stopped. That is, in a situation in which a "photographing process" should be given priority over "loading and storing characteristic data of the new lens unit 12", when the residual capacity of storage power of the battery 27 is not enough, if "loading and storing characteristic data of the new lens unit 12" is performed, the "photographing process" with high priority is likely to be insufficient. Accordingly, in case where the residual capacity of storage power of the battery 27 is not enough, the process for "loading and storing characteristic data of the new lens unit 12" is avoided, whereby limited power of the battery 27 can be efficiently used for a process with higher priority.

Even if the process for "loading and storing characteristic data of the new lens unit 12" is performed, in case where the residual capacity of storage power of the battery 27 is not reduced more than necessary, the process for "loading and storing characteristic data of the new lens unit 12" can be performed. As such as case, for example, a case where the residual capacity of storage power of the battery 27 is enough, a case where the camera body 14 (battery 27) is connected to an external power supply (electrical outlet or the like), or the like is assumed. The power storage state of the battery 27 (the residual capacity of storage power, the presence or absence of connection to the external power supply, or the like) may be detected by the battery detection unit 37 (see FIG. 2), the detection result may be sent to the point image restoration processing unit 36 (storage control unit 40), and it may be determined by the storage control unit 40 (memory communication control unit 52) whether or not the process for "loading and storing characteristic data of the new lens unit 12" is possible.

In the fourth embodiment (see FIG. 22) described above, in case where characteristic data of the lens unit 12 (optical system) used at the time of photographing and acquiring source image data is not retained in the first data source (for example, lens unit memory 24), the point image restoration processing unit 36 (storage control unit 40) may acquire characteristic data from the second data source (for example, server controller 84) storing and retaining characteristic data and may store characteristic data in the characteristic data storage unit. Accordingly, in case where all of a plurality of data sources retain characteristic data of a desired lens unit 12, characteristic data can be acquired from a data source with the shortest acquisition completion time (estimated time) of characteristic data. In case where a plurality of data sources include "a data source retaining no characteristic data of a desired lens unit 12", characteristic data may be acquired from a data source with the shortest acquisition completion time of characteristic data among the data sources other than "the data source retaining no characteristic data of the desired lens unit 12". With this, for example, even in case where there is no characteristic data corresponding to the photographing condition selected by the user as the photographing condition of source image data on the lens unit 12 side (lens unit memory 24), corresponding characteristic data is downloaded from the server 80 (server controller 84) and stored in the characteristic data storage unit 42, whereby source image data can be subjected to an appropriate point image restoration process.

Each functional configuration described above can be appropriately implemented by arbitrary hardware, software, or a combination thereof. Accordingly, for example, the invention can be applied to a program which causes a computer to execute an image processing method (image processing procedure) in each device and processing unit (camera body controller 28, device control unit 34 (battery detection unit 37), image processing unit 35 (point image restoration processing unit 36), or the like), a computer-readable recording medium (non-transitory recording medium) having the program recorded thereon, or a computer on which the program can be installed.

<Application Example to EDoF System>

Although the restoration process in the embodiments described above is an image process for recovering and correcting point spread (point image blur) according to a specific photographing condition (for example, a diaphragm value, an F value, a focal distance, a lens type, or the like) to restore an original object image, an image restoration process to which the invention can be applied is not limited to the restoration process in the embodiments described above. For example, the restoration process according to the invention can also be applied to a restoration process on image data photographed and acquired by an optical system, such as a photographing lens having an extended field, that is, an extended depth of field (focus) (EDoF). Image data of a blurred image photographed and acquired in a state where the depth of field (depth of focus) is extended by the EDoF optical system is subjected to the restoration process, whereby image data of high resolution in a focused state over a wide range can be restored and generated. In this case, the restoration process is performed using a restoration filter based on a point spread function (PSF, OTF, MTF, PTF, or the like) of the EDoF optical system and having a filter coefficient set such that satisfactory image restoration can be performed within a range of an extended depth of field, that is, an extended depth of focus.

Hereinafter, an example of a system (EDoF system) relating to restoration of image data photographed and acquired through the EDoF optical system will be described. In an example described below, an example where Y data which is obtained from RGB data representing image data after a demosaic process and represents a luminance signal is subjected to a restoration process will be described. In the example described below, the timing of the restoration process is not particularly limited, and for example, "image data (mosaic image data) before a demosaic process" or "image data (demosaic image data) after a demosaic process and before a luminance signal conversion process" may be subjected to the restoration process.

Figure 23:
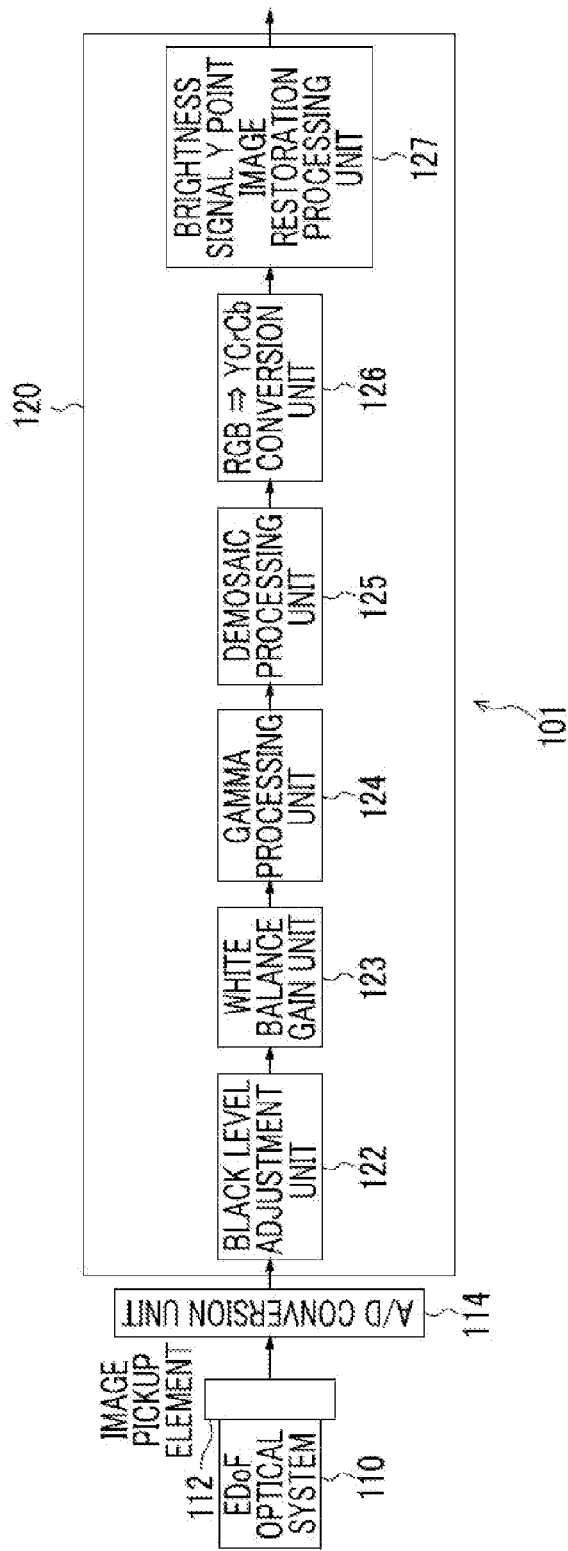
FIG. 23 is a block diagram showing a form of an image capture module including an EDoF optical system.

FIG. 23 is a block diagram showing a form of an image capture module 101 including an EDoF optical system. The image capture module 101 of a digital camera or the like in this example includes an lens unit 110 of an EDoF optical system, an image capture element 112, an AD conversion unit 114, and a restoration processing block (image processing unit) 120.

Figure 24:
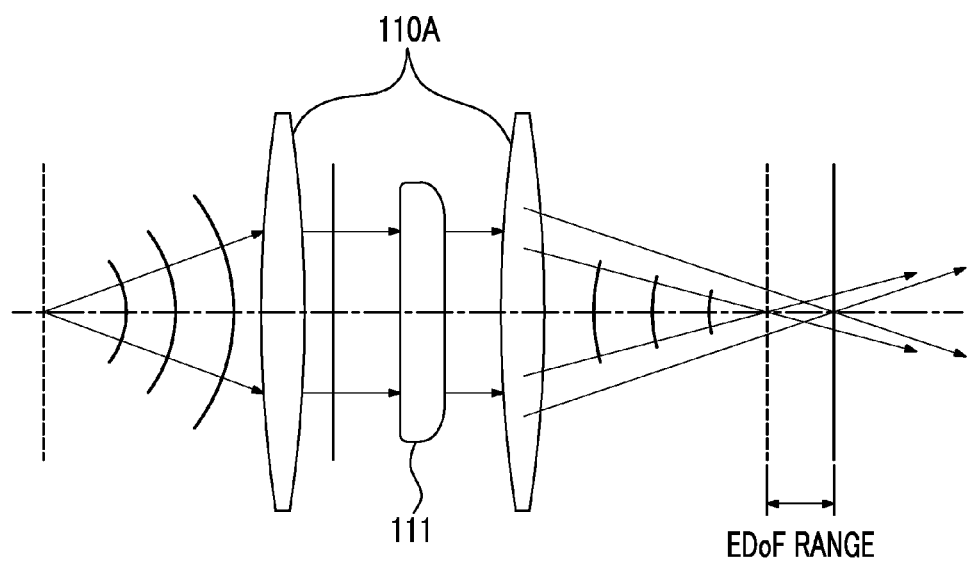
FIG. 24 is a diagram showing an example of the EDoF optical system.

FIG. 24 is a diagram showing an example of an EDoF optical system 110. The EDoF optical system 110 of this example has a single-focus fixed photographing lens 110A, and an optical filter 111 which is arranged at a pupil position. The optical filter 111 modulates a phase, and makes the photographing lens 110A constituting the EDoF optical system 110 have an extended depth of field such that an extended depth of field, that is, an extended depth of focus is obtained. In this way, the photographing lens 110A and the optical filter 111 constitute a lens unit which modulates a phase to extend a depth of field.

The EDoF optical system 110 includes other components as necessary, and for example, a diaphragm (not shown) is provided near the optical filter 111. The optical filter 111 may be one sheet or may be constituted by combining a plurality of sheets. The optical filter 111 is only an example of optical phase modulation means, and the EDoF of the photographing lens 110A constituting the EDoF optical system 110 may be implemented by other means. For example, instead of providing the optical filter 111, the EDoF of the EDoF optical system 110 may be implemented by the photographing lens 110A designed to have the same function as the optical filter 111 of this example.

That is, the EDoF of the EDoF optical system 110 can be implemented by various means for changing the wavefront of imaging on the light receiving surface of the image capture element 112. For example, "an optical element with a variable thickness", "an optical element with a variable refractive index (for example, a refractive index distribution type wavefront modulation lens or the like)", "an optical element with a variable thickness or refractive index coating on the lens surface or the like (for example, a wavefront modulation hybrid lens, an optical element formed on the lens surface as a phase plane, or the like)", or "a liquid crystal element capable of modulating a phase distribution of light (for example, a liquid crystal spatial phase modulation element or the like)" may be used as EDoF means of the EDoF optical system 110. In this way, the invention can be applied to not only a case where image formation can be performed to be regularly dispersed by the optical filter 111 (phase plate) as an optical wavefront modulation element, but also a case where the same dispersed images as the case of using the optical wavefront modulation element can be formed by the photographing lens 110A itself without using the optical wavefront modulation element.

The EDoF optical system 110 shown in FIG. 24 can be reduced in size since a focus adjustment mechanism which performs focus adjustment mechanically can be omitted, and can be suitably mounted in a camera-equipped mobile phone or a mobile information terminal portable.

An optical image after passing through the EDoF optical system 110 having the EDoF is formed on the image capture element 112 shown in FIG. 23 and is converted to an electrical signal here.

The image capture element 112 is constituted of a plurality of pixels arranged in a matrix in a predetermined pattern array (Bayer array, G stripe R/G full checkered pattern, X-Trans array, honeycomb array, or the like), and each pixel includes a microlens, a color filter (in this example, an RGB color filter), and a photodiode. An optical image incident on the light receiving surface of the image capture element 112 through the EDoF optical system 110 is converted to a signal charge in the amount according to the amount of incident light by each photodiode arranged on the light receiving surface. The signal charge of R, and B accumulated in each photodiode is sequentially output as a voltage signal for each pixel, that is, an image signal.

The AD conversion unit 114 converts the analog R, and B image signals output from the image capture element 112 for each pixel to digital RGB image signals. The digital image signals converted to the digital image signals by the AD conversion unit 114 are applied to the restoration processing block 120.

The restoration processing block 120 includes, for example, a black level adjustment unit 122, a white balance gain unit 123, a gamma processing unit 124, a demosaic processing unit 125, an RGB/YCrCb conversion unit 126, and a Y signal restoration processing unit 127.

The black level adjustment unit 122 subjects the digital image signals output from the AD conversion unit 114 to black level adjustment. For the black level adjustment, a known method may be used. For example, in case where focusing on a certain effective photoelectric conversion element, the average of signals for dark current amount acquisition corresponding to a plurality of OB photoelectric conversion elements included in a photoelectric conversion element line including the effective photoelectric conversion element is determined, and the black level adjustment is performed by subtracting the average from the signal for dark current amount acquisition corresponding to the effective photoelectric conversion element.

The white balance gain unit 123 performs gain adjustment according to a white balance gain of each of the color signals of RGB included in the digital image signals with adjusted black level data.

The gamma processing unit 124 performs gamma correction to perform gradation correction, such as halftone, such that the R, G, and B image signals subjected to the white balance adjustment have desired gamma characteristics.

The demosaic processing unit 125 subjects the R, G and B image signals after gamma correction to a demosaic process. Specifically, the demosaic processing unit 125 subjects the R, G, and B image signals to a color interpolation process to generate a set of image signals (R signal, G signal, and B signal) output from the respective light receiving pixels of the image capture element 112. That is, although a pixel signal from each light receiving pixel is one of the R, G and B image signals before color demosaic process, a set of three pixel signals of R, G, and B signals corresponding to each light receiving pixel is output after color demosaic process.

The RGB/YCrCb conversion unit 126 converts the R, G, and B signals of each pixel subjected to the demosaic process to a luminance signal Y and color difference signals Cr and Cb and outputs the luminance signal Y and the color difference signals Cr and Cb of each pixel.

The Y signal restoration processing unit 127 subjects the luminance signal Y output from the RGB/YCrCb conversion unit 126 to a restoration process based on a restoration filter stored in advance. The restoration filter is constituted of, for example, a deconvolution kernel (corresponding to the number of taps of M=7 and N=7) having a kernel size of 7×7, and a calculation coefficient (corresponding to restoration gain data, filter coefficient) corresponding to the deconvolution kernel, and is used for a deconvolution process (reverse convolution calculation process) of phase modulation of the optical filter 111. For the restoration filter, one corresponding to the optical filter 111 is stored in a memory (not shown) (for example, a memory incidentally attached with the Y signal restoration processing unit 127). The kernel size of the deconvolution kernel is not limited to 7×7.

Figure 25:
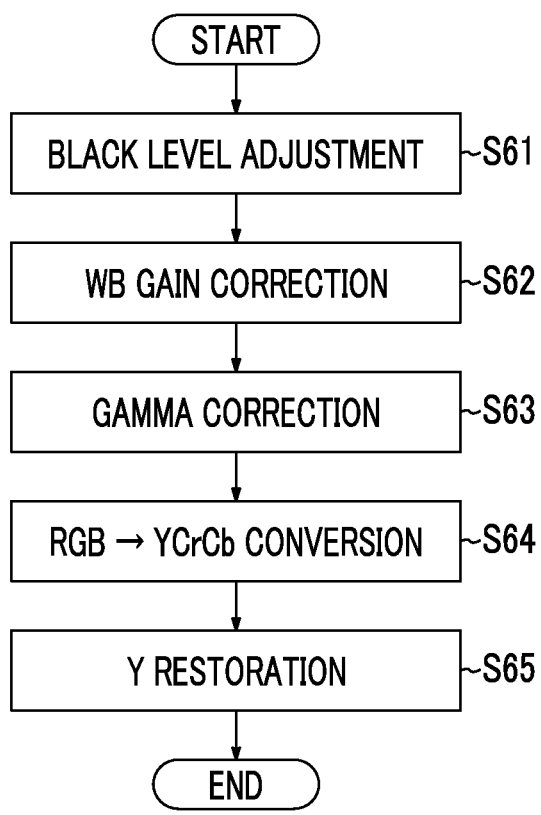
FIG. 25 is a diagram showing an example of a restoration process flow by a restoration processing block shown in FIG. 23.

Next, the restoration process by the restoration processing block 120 will be described. FIG. 25 is a diagram showing an example of a restoration process flow by the restoration processing block 120 shown in FIG. 23.

The digital image signal is applied from the AD conversion unit 114 to one input of the black level adjustment unit 122, black level data is applied to the other input of the black level adjustment unit 122, and the black level adjustment unit 122 subtracts black level data from the digital image signal and outputs the digital image signal black level data subtracted to the white balance gain unit 123 (S61). With this, no black level component is included in the digital image signal, and a digital image signal indicating a black level becomes 0.

Image data after the black level adjustment is sequentially subjected to the processes by the white balance gain unit 123 and the gamma processing unit 124 (S62 and S63).

The R, G, and B signals subjected to gamma correction are subjected to the demosaic process in the demosaic processing unit 125 and are then converted to the luminance signal Y and the color difference signals Cr and Cb in the RGB/YCrCb conversion unit 126 (S64).

The Y signal restoration processing unit 127 subjects the luminance signal Y to the restoration process to apply the deconvolution process of phase modulation of the optical filter 111 of the EDoF optical system 110 (S65). That is, the Y signal restoration processing unit 127 performs the deconvolution process (reverse convolution calculation process) of a luminance signal (in this case, a luminance signal of 7×7 pixels) corresponding to a pixel group of a predetermined unit centering on an arbitrary pixel to be processed and the restoration filter (the 7×7 deconvolution kernel and the calculation coefficient) stored in the memory or the like in advance. The Y signal restoration processing unit 127 performs the restoration process for removing image blur of the entire image by repeating the deconvolution process of each pixel group of the predetermined unit so as to cover the entire area of the image capture surface. The restoration filter is determined according to the position of the center of the pixel group subjected to the deconvolution process. That is, the common restoration filter is applied to adjacent pixel groups. In addition, in order to simplify the restoration process, it is preferable to apply the common restoration filter to all pixel groups.

Figure 26:
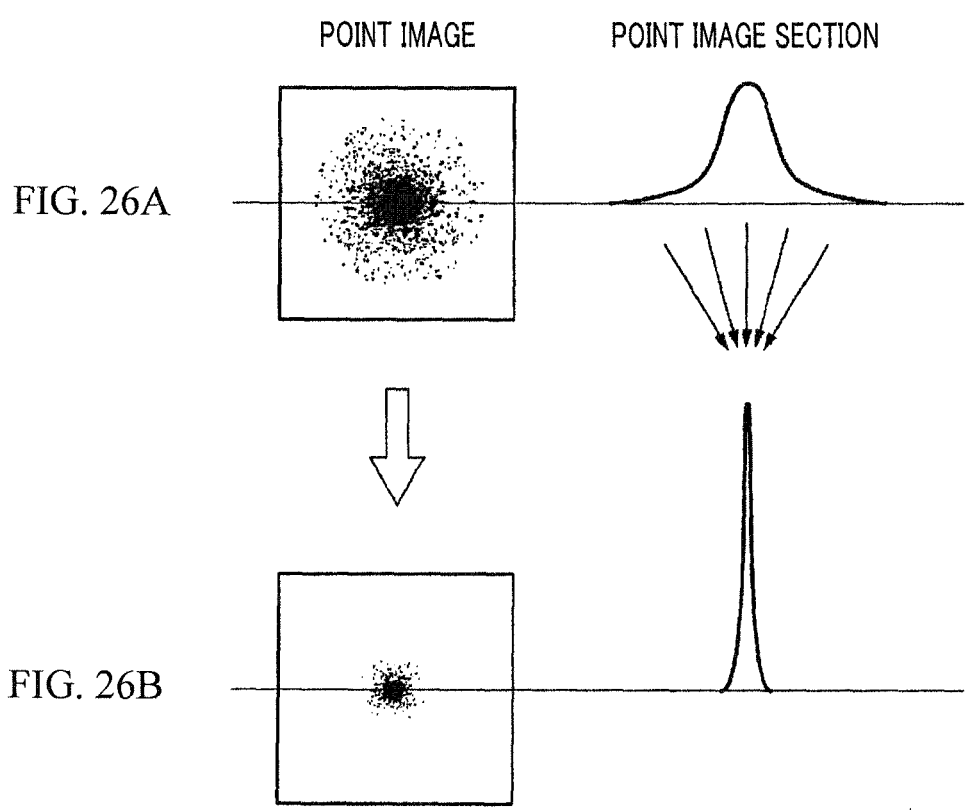
FIGS. 26A and 26B are diagrams showing a restoration example of an image acquired through the EDoF optical system.

As shown in FIG. 26A, a point image (optical image) of the luminance signal after passing through the EDoF optical system 110 is formed on the image capture element 112 as a great point image (blurred image), but is restored to a small point image (image of high resolution) by the deconvolution process in the Y signal restoration processing unit 127 as shown in FIG. 26B.

As described above, the restoration process is applied to the luminance signal after the demosaic process, whereby it is not necessary to separately provide the parameters of the restoration process for RGB, and it is possible to accelerate the restoration process. Furthermore, instead of putting together the R, and B image signals corresponding to the R, and B pixels at discrete positions in one unit and performing the deconvolution process, the luminance signals of adjacent pixels are put together in a predetermined unit and the common restoration filter is applied to this unit and the deconvolution process is performed; therefore, the accuracy of the restoration process is improved. In regards to the color difference signals Cr and Cb, resolution does not need to be increased by the restoration process in terms of image quality because of the visual characteristic of human eyes. Furthermore, in case where recording an image in a compression format, such as JPEG, the color difference signals are compressed at a higher compression rate than the luminance signal; therefore, there is less necessity to increase resolution by the restoration process. Consequently, it is possible to achieve improvement of restoration accuracy and simplification and acceleration of the process.

The point image restoration process according to the embodiments described above can be applied to the restoration process of the EDoF system described above. Accordingly, the restoration filter used for the restoration process in the Y signal restoration processing unit 127 can be stored in the memory on the camera body side in the same manner as in the respective embodiments described above.

In the respective embodiments described above, although an aspect in which the point image restoration processing unit 36 is provided in the camera body 14 (camera body controller 28) of the digital camera 10 has been described, the point image restoration processing unit 36 may be provided in other devices, such as the lens unit 12, the computer 60, or the server 80.

For example, for processing image data in the computer 60, image data may be subjected to the point image restoration process by the point image restoration processing unit provided in the computer 60. Furthermore, in case where the server 80 includes a point image restoration processing unit, for example, image data may be transmitted from the digital camera 10 or the computer 60 to the server 80, image data may be subjected to the point image restoration process in the point image restoration processing unit of the server 80, and image data (recovered image data) after the point image restoration process may be transmitted and supplied to the transmission source.

An aspect to which the invention can be applied is not limited to the digital camera 10, the computer 60, and the server 80, and the invention can be applied to mobile devices having an image capture function and functions (call handling function, communication function, and other computer functions) other than image capturing, in addition to cameras having image capturing as a major function. As another aspect to which the invention can be applied, for example, mobile phones having a camera function, smartphones, personal digital assistants (PDAs), and portable game machines are given. Hereinafter, an example of a smartphone to which the invention can be applied will be described.

<Configuration of Smartphone>

Figure 27:
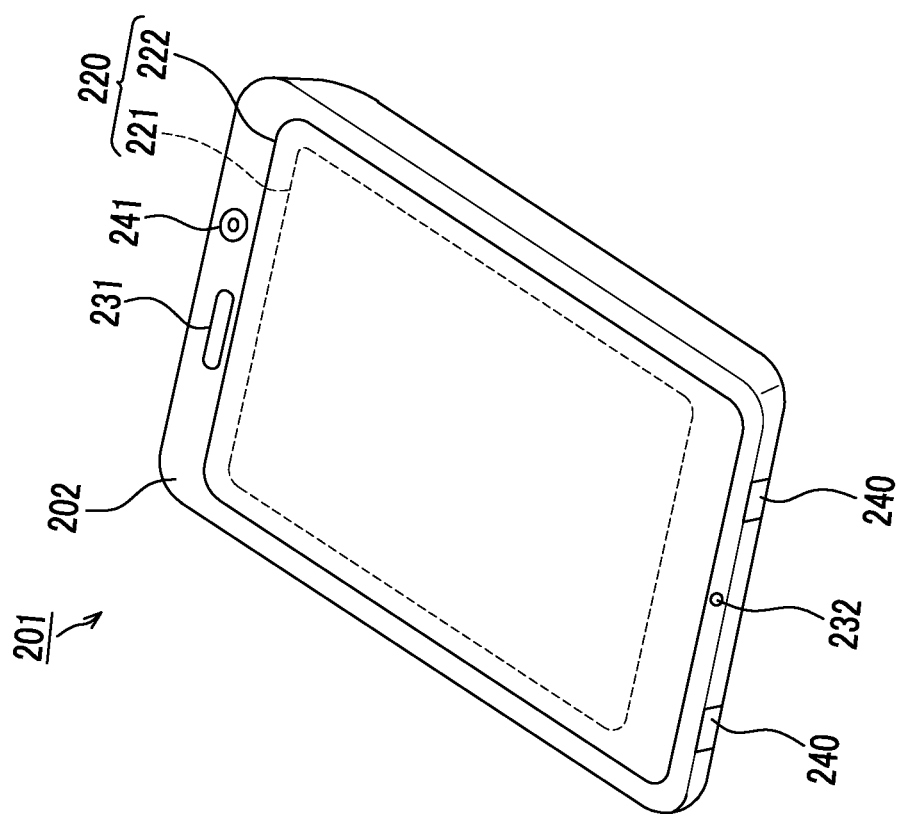
FIG. 27 shows the appearance of a smartphone which is an embodiment of an image capture device of the invention.

FIG. 27 shows the appearance of a smartphone 201 which is an embodiment of an image capture device of the invention. The smartphone 201 shown in FIG. 27 has a flat plate-like housing 202, and includes, on one surface of the housing 202, a display input unit 220 in which a display panel 221 as a display unit and an operation panel 222 as an input unit are integrated. The housing 202 includes a speaker 231, a microphone 232, an operating unit 240, and a camera unit 241. The configuration of the housing 202 is not limited thereto, and for example, a configuration in which a display unit and an input unit are separated can be used, or a configuration in which a folding structure or a slide mechanism is provided.

Figure 28:
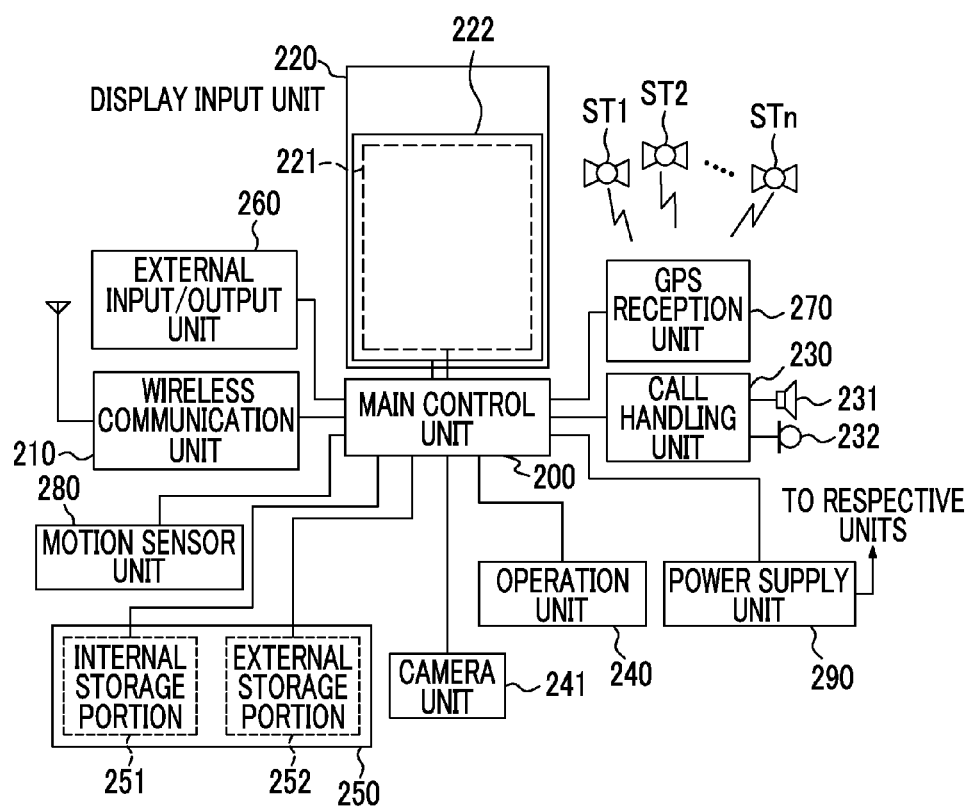
FIG. 28 is a block diagram showing the configuration of the smartphone shown in FIG. 27.

FIG. 28 is a block diagram showing the configuration of the smartphone 201 shown in FIG. 27. As shown in FIG. 28, the smartphone includes, as major components, a wireless communication unit 210, a display input unit 220, a call handling unit 230, an operating unit 240, a camera unit 241, a storage unit 250, an external input/output unit 260, a global positioning system (GPS) reception unit 270, a motion sensor unit 280, a power supply unit 290, and a main control unit 200. The smartphone 201 has, as a major function, a wireless communication function of performing mobile wireless communication through a base station device BS and a mobile communication network NW.

The wireless communication unit 210 performs wireless communication with the base station device BS in the mobile communication network NW according to an instruction of the main control unit 200. Transmission/reception of various kinds of file data, such as speech data or image data, electronic mail data, and the like, or reception of Web data, streaming data, or the like is performed using wireless communication.

The display input unit 220 is a so-called touch panel which displays images (still image and moving image), character information, or the like under the control of the main control unit 200 to visually transfer information to the user and detects a user's operation on the displayed information, and includes the display panel 221 and the operation panel 222.

The display panel 221 uses, for example, a liquid crystal display (LCD) or an organic electro-luminescence display (OELD), as a display device. The operation panel 222 is a device which is placed such that an image displayed on the display surface of the display panel 221 is visible, and detects one or a plurality of coordinates operated with the finger of the user or a stylus. If the device is operated with the finger of the user or the stylus, a detection signal generated due to the operation is output to the main control unit 200. Next, the main control unit 200 detects the operation position (coordinates) on the display panel 221 based on the received detection signal.

As shown in FIG. 27, the display panel 221 and the operation panel 222 of the smartphone 201 illustrated as an embodiment of an image capture device of the invention are integrated to constitute the display input unit 220, and the operation panel 222 is arranged so as to completely cover the display panel 221. In case where this arrangement is used, the operation panel 222 may have a function of detecting a user's operation in an area outside the display panel 221. In other words, the operation panel 222 may include a detection area (hereinafter, referred to as a display area) for a superimposed portion overlapping the display panel 221 and a detection area (hereinafter, referred to as a non-display area) for an outer edge portion not overlapping the display panel 221.

Although the size of the display area may completely match the size of the display panel 221, both do not necessarily match each other. The operation panel 222 may include two sensitive areas of an outer edge portion and an inside portion. In addition, the width of the outer edge portion is appropriately designed according to the size of the housing 202 or the like. Furthermore, as a position detection system which is used in the operation panel 222, a matrix switch system, a resistive film system, a surface acoustic wave system, an infrared system, an electromagnetic induction system, an electrostatic capacitance system, or the like is given, and any system can be used.

The call handling unit 230 includes a speaker 231 and a microphone 232, converts speech of the user input through the microphone 232 to speech data processable in the main control unit 200 and outputs speech data to the main control unit 200, or decodes speech data received by the wireless communication unit 210 or the external input/output unit 260 and outputs speech from the speaker 231. As shown in FIG. 27, for example, the speaker 231 can be mounted on the same surface as the surface on which the display input unit 220 is provided, and the microphone 232 may be mounted on the side surface of the housing 202.

The operating unit 240 is a hardware key, such as a key switch, and receives an instruction from the user. For example, as shown in FIG. 27, the operating unit 240 is a push button-type switch which is mounted on the side surface of the housing 202 of the smartphone 201, and is turned on when pressed with a finger or the like and is turned off by a restoration force of the panel or the like if the finger is released.

The storage unit 250 stores a control program or control data of the main control unit 200, application software, address data in association with the name, telephone number, and the like of a communication partner, data of transmitted and received electronic mail, Web data downloaded by Web browsing, downloaded content data, or temporarily stores streaming data or the like. The storage unit 250 is constituted of an internal storage unit 251 embedded in the smartphone and an external storage unit 252 which has a detachable external memory slot. The internal storage unit 251 and the external storage unit 252 constituting the storage unit 250 are implemented using a memory (for example, MicroSD™ memory or the like) of a flash memory type, a hard disk type, a multimedia card micro type, or a card type, or a storage medium, such as a random access memory (RAM) or a read only memory (ROM).

The external input/output unit 260 plays a role of an interface with all external devices connected to the smartphone 201, and is provided for direct or indirect connection to other external devices by communication or the like (for example, universal serial bus (USB), IEEE1394 or the like), or a network (for example, Internet, wireless LAN, Bluetooth™, radio frequency identification (RFID), infrared data association (IrDA)™, ultra wideband (UWB)™, ZigBee™, or the like).

The external device connected to the smartphone 201 is, for example, a wired or wireless headset, a wired or wireless external charger, a wired or wireless data port, a memory card connected through a card socket, a subscriber identity module card (SIM)/user identity module card (UIM) card, an external audio-video device connected through an audio-video input/output (I/O) terminal, an external external audio-video device connected in a wireless manner, a smartphone connected in a wired or wireless manner, a personal computer connected in a wired or wireless manner, a PDA connected in a wired or wireless manner, an earphone, or the like. The external input/output unit can transfer data transmitted from the external devices to the respective components in the smartphone 201, or can transmit data in the smartphone 201 to the external devices.

The GPS reception unit 270 receives GPS signals transmitted from GPS satellites ST1 to STn according to an instruction of the main control unit 200, executes a positioning calculation process based on a plurality of received GPS signals, and detects the position of the smartphone 201 having latitude, longitude, and altitude. In case where positional information can be acquired from, for example, a wireless LAN which is the wireless communication unit 210 or the external input/output unit 260, the GPS reception unit 270 may detect the position using the positional information.

The motion sensor unit 280 includes, for example, a three-axis acceleration sensor or the like, and detects physical motion of the smartphone 201 according to an instruction of the main control unit 200. The moving direction or acceleration of the smartphone 201 can be detected by detecting physical motion of the smartphone 201. The detection result is output to the main control unit 200.

The power supply unit 290 supplies power stored in a battery (not shown) to the respective units of the smartphone 201 according to an instruction of the main control unit 200.

The main control unit 200 includes a microprocessor, operates according to the control program or control data stored in the storage unit 250, and integrally controls the respective units of the smartphone 201. The main control unit 200 has a mobile communication control function of controlling the respective units of a communication system in order to perform speech communication or data communication through the wireless communication unit 210, and an application processing function.

The application processing function is implemented by the main control unit 200 operating according to application software stored in the storage unit 250. The application processing function is, for example, an infrared communication function of controlling the external input/output unit 260 to perform data communication with a device facing the smartphone 201, an electronic mail function of transmitting and receiving electronic mail, a Web browsing function of browsing Web pages, or the like.

The main control unit 200 has an image processing function of displaying video on the display input unit 220, or the like based on image data (still image or moving image data), such as received data or downloaded streaming data. The image processing function refers to a function of the main control unit 200 decoding image data, subjecting the decoding result to an image process, and displaying an image on the display input unit 220.

The main control unit 200 executes display control on the display panel 221, and operation detection control for detecting a user's operation through the operating unit 240 and the operation panel 222.

With the execution of the display control, the main control unit 200 displays an icon for activating application software or a software key, such as a scroll bar, or displays a window for creating electronic mail. The scroll bar refers to a software key for receiving an instruction to move a display portion of an image which is too large to fit into the display area of the display panel 221.

With the execution of the operation detection control, the main control unit 200 detects a user's operation through the operating unit 240, receives an operation on the icon or an input of a character string in an entry column of the window through the operation panel 222, or receives a scroll request of a display image through the scroll bar.

Furthermore, with the execution of the operation detection control, the main control unit 200 has a touch panel control function of determining whether an operation position on the operation panel 222 is the superimposed portion (display area) overlapping the display panel 221 or the outer edge portion (non-display area) not overlapping the display panel 221, and controlling the sensitive area of the operation panel 222 or the display position of the software key.

The main control unit 200 may detect a gesture operation on the operation panel 222 and may execute a function set in advance according to the detected gesture operation. The gesture operation is not a conventional simple touch operation, but means an operation to render a track with a finger or the like, an operation to simultaneously designate a plurality of positions, or an operation to render a track for at least one of a plurality of positions by combining the operations.

The camera unit 241 is a digital camera which electronically captures an image using an image capture element, such as a CMOS or a CCD. The camera unit 241 can convert image data obtained by image capturing to compressed image data, such as JPEG and can record image data in the storage unit 250 under the control of the main control unit 200. Furthermore, the camera unit 241 can output image data through the external input/output unit 260 or the wireless communication unit 210. As shown in FIG. 27, in the smartphone 201, the camera unit 241 is mounted on the same surface of the display input unit 220; however, the mounting position of the camera unit 241 is not limited thereto, and the camera unit 241 may be mounted on the rear surface of the display input unit 220, or a plurality of camera units 241 may be mounted. In case where a plurality of camera units 241 are mounted, the camera unit 241 which is used to capture an image is switched from one to another and captures an image alone, or a plurality of camera units 241 are simultaneously used to capture images.

The camera unit 241 is used for various functions of the smartphone 201. For example, an image acquired by the camera unit 241 can be displayed on the display panel 221, or an image in the camera unit 241 can be used as one operation input on the operation panel 222. When the GPS reception unit 270 detects the position, the position may be detected with reference to an image from the camera unit 241. In addition, the optical axis direction of the camera unit 241 of the smartphone 201 may be determined or the current use environment can be determined with reference to an image from the camera unit 241 without using the three-axis acceleration sensor, or using the three-axis acceleration sensor. Of course, an image from the camera unit 241 may be used in application software.

In addition, image data of a still image or a moving image can be attached with positional information acquired by the GPS reception unit 270, speech information acquired by the microphone 232, speech information to be text information through speech-text conversion in the main control unit or the like, posture information acquired by the motion sensor unit 280, or the like and can be recorded in the storage unit 250. Image data may be output through the external input/output unit 260 or the wireless communication unit 210.

In the smartphone 201 described above, the respective processing units described above in connection with the point image restoration process can be appropriately implemented by, for example, the main control unit 200, the storage unit 250, and the like.

The invention is not limited to the embodiments described above, and various modifications can be made without departing from the spirit of the invention.

EXPLANATION OF REFERENCES

10: digital camera, 11: shutter button, 12: lens unit, 14: camera body, 15: mount, 16: lens, 17: diaphragm, 18: optical system operating unit, 20: lens unit controller, 22: lens unit input/output unit, 24: lens unit memory, 26: image capture element, 27: battery, 28: camera body controller, 29: wireless communication unit, 30: camera body input/output unit, 32: input/output interface, 34: device control unit, 35: image processing unit, 36: point image restoration processing unit, 37: battery detection unit, 40: storage control unit, 42: characteristic data storage unit, 44: restoration calculation processing unit, 46: filter acquisition unit, 48: calculation unit, 50: storage area determination unit, 52: memory communication control unit, 60: computer, 62: computer input/output unit, 64: computer controller, 66: display, 70: Internet, 75: access point, 80: server, 82: server input/output unit, 84: server controller, 101: image capture module, 110: EDoF optical system, 110A: photographing lens, 111: optical filter, 112: image capture element, 114: AD conversion unit, 120: restoration processing block, 122: black level adjustment unit, 123: white balance gain unit, 124: gamma processing unit, 125: demosaic processing unit, 126: RGB/YCrCb conversion unit, 127: Y signal restoration processing unit, 200: main control unit, 201: smartphone, 202: housing, 210: wireless communication unit, 220: display input unit, 221: display panel, 222: operation panel, 230: call handling unit, 231: speaker, 232: microphone, 240: operating unit, 241: camera unit, 250: storage unit, 251: internal storage unit, 252: external storage unit, 260: external input/output unit, 270: GPS reception unit, 280: motion sensor unit, 290: power supply unit.

What is claimed is:

1. An image processing device comprising:
a characteristic data storage which is capable of storing characteristic data of a plurality of types of optical systems;
a storage control circuit which controls the characteristic data storage; and
a restoration processing circuit which subjects the source image data to a restoration process using a restoration filter based on a point spread function of an optical system to acquire recovered image data,
wherein the restoration processing circuit acquires the restoration filter based on the characteristic data stored in the characteristic data storage, and
in case where storing the characteristic data in the characteristic data storage, the storage control circuit controls the characteristic data stored in the characteristic data storage based on a restoration evaluation value which is allocated to the characteristic data according to the type of optical system and represents the degree of effect regarding image restoration by the restoration process.

2. The image processing device according to claim 1, wherein, for storing the characteristic data in the characteristic data storage, in case where deleting the characteristic data already stored in the characteristic data storage from the characteristic data storage, the storage control circuit deletes the characteristic data from the characteristic data storage based on the restoration evaluation value in an ascending order of the degree of image restoration by the restoration process.

3. The image processing device according to claim 1, wherein, for storing the characteristic data in the characteristic data storage, in case where storing new characteristic data in the storage area of the characteristic data already stored in the characteristic data storage, the storage control circuit determines the storage area of the new characteristic data from among the storage areas of the characteristic data already stored in the characteristic data storage in an order of the storage areas of the characteristic data corresponding to smaller restoration evaluation value.

4. The image processing device according to claim 1, wherein the characteristic data stored in the characteristic data storage is determined according to the type of optical system,
the restoration evaluation value is determined for each type of optical system, and
for storing the characteristic data in the characteristic data storage, in case where deleting the characteristic data already stored in the characteristic data storage from the characteristic data storage, the storage control circuit deletes the characteristic data from the characteristic data storage according to the type of optical system based on the restoration evaluation value.

5. The image processing device according to claim 1,
wherein the characteristic data stored in the characteristic data storage is determined according to the type of optical system,
the restoration evaluation value is determined for each type of optical system, and
for storing the characteristic data in the characteristic data storage, in case where storing new characteristic data in the storage area of the characteristic data already stored in the characteristic data storage, the storage control circuit determines the storage area of the new characteristic data from among the storage areas of the characteristic data already stored in the characteristic data storage according to the type of optical system determined for the characteristic data based on the restoration evaluation value.

6. The image processing device according to claim 1,
wherein the characteristic data stored in the characteristic data storage is determined according to the type of optical system and photographing conditions,
the restoration evaluation value is determined according to the type of optical system and the photographing conditions, and
for storing the characteristic data in the characteristic data storage, in case where deleting the characteristic data already stored in the characteristic data storage from the characteristic data storage, the storage control circuit deletes the characteristic data from the characteristic data storage according to the type of optical system and the photographing conditions based on the restoration evaluation value.

7. The image processing device according to claim 1,
wherein the characteristic data stored in the characteristic data storage is determined according to the type of optical system and photographing conditions,
the restoration evaluation value is determined according to the type of optical system and the photographing conditions, and
for storing the characteristic data in the characteristic data storage, in case where storing new characteristic data in the storage area of the characteristic data already stored in the characteristic data storage, the storage control circuit determines the storage area of the new characteristic data from among the storage areas of the characteristic data already stored in the characteristic data storage according to the type of optical system and the photographing conditions determined for the characteristic data based on the restoration evaluation value.

8. The image processing device according to claim 1,
wherein the characteristic data stored in the characteristic data storage is determined according to the type of optical system and photographing conditions,
the restoration evaluation value is determined according to the type of optical system and the photographing conditions, and
for storing the characteristic data in the characteristic data storage, in case where deleting the characteristic data already stored in the characteristic data storage from the characteristic data storage, the storage control circuit deletes the characteristic data from the characteristic data storage according to the type of optical system based on a representative value calculated from the restoration evaluation value of each type of optical system.

9. The image processing device according to claim 1,
wherein the characteristic data stored in the characteristic data storage is determined according to the type of optical system and photographing conditions,
the restoration evaluation value is determined according to the type of optical system and the photographing conditions, and
for storing the characteristic data in the characteristic data storage, in case where storing new characteristic data in the storage area of the characteristic data already stored in the characteristic data storage, the storage control circuit determines the storage area of the new characteristic data from among the storage areas of the characteristic data already stored in the characteristic data storage according to the type of optical system determined for the characteristic data based on a representative value calculated from the restoration evaluation value of each type of optical system.

10. The image processing device according to claim 8,
wherein the representative value is an average value, a maximum value, or a minimum value of the restoration evaluation value of each type of optical system.

11. An image processing device comprising:
a characteristic data storage which is capable of storing characteristic data of a plurality of types of optical systems;
a storage control circuit which controls the characteristic data storage; and
a restoration processing circuit which subjects source image data to a restoration process using a restoration filter based on a point spread function of an optical system to acquire recovered image data,
wherein the restoration processing circuit acquires the restoration filter based on the characteristic data stored in the characteristic data storage,
in case where storing the characteristic data in the characteristic data storage, the storage control circuit controls the characteristic data stored in the characteristic data storage based on an independence evaluation value which is allocated to the characteristic data according to the optical system and represents the degree of approximation between the characteristic data stored in the characteristic data storage,
wherein the storage control circuit is capable of acquiring the characteristic data of the optical systems from a first data source and a second data source retaining the characteristic data of the optical systems and storing the characteristic data in the characteristic data storage,
wherein in case where the first data source does not retain the characteristic data of the optical systems, the storage control circuit acquires the characteristic data from the second data source and stores the characteristic data in the characteristic data storage,
wherein the storage control circuit is capable of acquiring the characteristic data of the optical systems from a first data source and a second data source retaining the characteristic data of the optical systems and storing the characteristic data in the characteristic data storage, and
wherein the storage control circuit calculates an estimated time required for acquiring the characteristic data of the optical systems from the first data source and storing the characteristic data in the characteristic data storage and an estimated time required for acquiring the characteristic data of the optical systems from the second data source and storing the characteristic data in the characteristic data storage, acquires the characteristic data of the optical systems from one of the first data source and the second data source with a shorter estimated time, and stores the characteristic data in the characteristic data storage.

12. The image processing device according to claim 11, wherein, for storing the characteristic data in the characteristic data storage, in case where deleting the characteristic data already stored in the characteristic data storage from the characteristic data storage, the storage control circuit deletes the characteristic data from the characteristic data storage in a descending order of the degree of approximation to other characteristic data stored in the characteristic data storage based on the independence evaluation value.

13. The image processing device according to claim 11, wherein the independence evaluation value is determined based on the difference between the characteristic data stored in the characteristic data storage.

14. The image processing device according to claim 1, wherein the characteristic data is data representing the physical characteristic of the optical system.

15. The image processing device according to claim 14, wherein the restoration processing circuit calculates a process parameter used for the restoration process from the characteristic data.

16. The image processing device according to claim 1, wherein the characteristic data is a process parameter used for the restoration process.

17. The image processing device according to claim 1, wherein the storage control circuit is capable of acquiring the characteristic data of the optical systems from a first data source and a second data source retaining the characteristic data of the optical systems and storing the characteristic data in the characteristic data storage, and
the storage control circuit calculates an estimated time required for acquiring the characteristic data of the optical systems from the first data source and storing the characteristic data in the characteristic data storage and an estimated time required for acquiring the characteristic data of the optical systems from the second data source and storing the characteristic data in the characteristic data storage, acquires the characteristic data of the optical systems from one of the first data source and the second data source with a shorter estimated time, and stores the characteristic data in the characteristic data storage.

18. The image processing device according to claim 1, wherein the storage control circuit is capable of acquiring the characteristic data of the optical systems from a first data source and a second data source retaining the characteristic data of the optical systems and storing the characteristic data in the characteristic data storage, and
in case where the first data source does not retain the characteristic data of the optical systems, the storage control circuit acquires the characteristic data from the second data source and stores the characteristic data in the characteristic data storage.

19. The image processing device according to claim 1, wherein, in case where storing the characteristic data in the characteristic data storage, the storage control circuit stores the characteristic data in the characteristic data storage in an order of photographing conditions corresponding to greater restoration evaluation value.

20. The image processing device according to claim 11, wherein, in case where storing the characteristic data in the characteristic data storage, the storage control circuit stores the characteristic data in the characteristic data storage in an order of photographing conditions corresponding to greater restoration evaluation value.

21. The image processing device according to claim 1, wherein the optical system has a lens which modulates a phase to extend a depth of field.

22. An image capture device capable of mounting a plurality of types of optical systems, the image capture device comprising:
an image capture element which photographs and acquires source image data through an optical system; and
the image processing device according to claim 1.

23. The image capture device according to claim 22, wherein a case where the characteristic data already stored in the characteristic data storage is deleted from the characteristic data storage is a case where characteristic data of a mounted optical system is not stored in the characteristic data storage.

24. The image capture device according to claim 22, wherein a case where new characteristic data is stored in the storage area of the characteristic data already stored in the characteristic data storage is a case where characteristic data of a mounted optical system is not stored in the characteristic data storage.

25. The image capture device according to claim 22, further comprising:
a battery; and
a battery detection which detects the power storage state of the battery,
wherein the storage control circuit controls the amount of the characteristic data stored in the characteristic data storage based on the power storage state of the battery detected by the battery detection.

26. An image processing method comprising:
a step of storing characteristic data of an optical system in a characteristic data storage capable of storing characteristic data of a plurality of types of optical systems; and
a step of subjecting source image data to a restoration process using a restoration filter acquired based on the characteristic data stored in the characteristic data storage to acquire recovered image data,
wherein, in the step of storing the characteristic data in the characteristic data storage, the characteristic data stored in the characteristic data storage is controlled based on a restoration evaluation value which is allocated to the characteristic data according to the type of optical system and represents the degree of effect regarding image restoration by the restoration process.

27. An image processing method comprising:
a step of storing characteristic data of an optical system in a characteristic data storage capable of storing characteristic data of a plurality of types of optical systems; and
a step of subjecting source image data to a restoration process using a restoration filter acquired based on the characteristic data stored in the characteristic data storage to acquire recovered image data,
wherein, in the step of storing the characteristic data in the characteristic data storage, the characteristic data stored in the characteristic data storage is controlled based on an independence evaluation value which is allocated to the characteristic data according to the type of optical system and represents the degree of approximation between the characteristic data stored in the characteristic data storage, wherein, the step of storing the characteristic data in the characteristic data storage is capable of acquiring the characteristic data of the optical systems from a first data source and a second data source retaining the characteristic data of the optical systems and storing the characteristic data in the characteristic data storage, wherein in case where the first data source does not retain the characteristic data of the optical systems, the storage control circuit acquires the characteristic data from the second data source and stores the characteristic data in the characteristic data storage, wherein the characteristic data of the optical system is acquired from a first data source and a second data source retaining the characteristic data of the optical system and the characteristic data is stored in the characteristic data storage, and wherein an estimated time required for acquiring the characteristic data of the optical systems from the first data source and storing the characteristic data in the characteristic data storage and an estimated time required for acquiring the characteristic data of the optical system from the second data source and storing the characteristic data in the characteristic data storage is calculated, the characteristic data of the optical system from one of the first data source and the second data source with a shorter estimated time is acquired, and the characteristic data is stored in the characteristic data storage.

28. A non-transitory computer readable medium storing a program which causes a computer to execute:
   a procedure for storing characteristic data of an optical system in a characteristic data storage capable of storing characteristic data of a plurality of types of optical systems; and
   a procedure for subjecting source image data to a restoration process using a restoration filter acquired based on the characteristic data stored in the characteristic data storage to acquire recovered image data,
   wherein, in the procedure for storing the characteristic data in the characteristic data storage, the characteristic data stored in the characteristic data storage is controlled based on a restoration evaluation value which is allocated to the characteristic data according to the type of optical system and represents the degree of effect regarding image restoration by the restoration process.

29. A non-transitory computer readable medium storing a program which causes a computer to execute:
   a procedure for storing characteristic data of an optical system in a characteristic data storage capable of storing characteristic data of a plurality of types of optical systems; and
   a procedure for subjecting source image data to a restoration process using a restoration filter acquired based on the characteristic data stored in the characteristic data storage to acquire recovered image data,
   wherein, in the procedure for storing the characteristic data in the characteristic data storage, the characteristic data stored in the characteristic data storage is controlled based on an independence evaluation value which is allocated to the characteristic data according to the type of optical system and represents the degree of approximation between the characteristic data stored in the characteristic data storage,
   wherein, the step of storing the characteristic data in the characteristic data storage is capable of acquiring the characteristic data of the optical systems from a first data source and a second data source retaining the characteristic data of the optical systems and storing the characteristic data in the characteristic data storage,
   wherein in case where the first data source does not retain the characteristic data of the optical systems, the storage control circuit acquires the characteristic data from the second data source and stores the characteristic data in the characteristic data storage,
   wherein the characteristic data of the optical system is acquired from a first data source and a second data source retaining the characteristic data of the optical system and the characteristic data is stored in the characteristic data storage, and
   wherein an estimated time required for acquiring the characteristic data of the optical systems from the first data source and storing the characteristic data in the characteristic data storage and an estimated time required for acquiring the characteristic data of the optical system from the second data source and storing the characteristic data in the characteristic data storage is calculated, the characteristic data of the optical system from one of the first data source and the second data source with a shorter estimated time is acquired, and the characteristic data is stored in the characteristic data storage.

* * * * *